US011840593B2

(12) United States Patent
Descroix et al.

(10) Patent No.: US 11,840,593 B2
(45) Date of Patent: Dec. 12, 2023

(54) COMPOSITION COMPRISING THERMOASSOCIATIVE AND EXCHANGEABLE COPOLYMERS

(71) Applicants: TOTAL MARKETING SERVICES, Puteaux (FR); CENTRE NATIONAL DE LA RECHERCHE SCIENTIFIQUE, Paris (FR); ECOLE SUPERIEURE DE PHYSIQUE ET DE CHIMIE INDUSTRIELLES DE LA VILLE DE PARIS, Paris (FR)

(72) Inventors: Grégory Descroix, Brindas (FR); Fanny Briand, Lyons (FR); Renaud Nicolay, Verrieres le Buisson (FR); Thibault Derouineau, Coudrecieux (FR)

(73) Assignees: TOTAL MARKETING SERVICES, Puteaux (FR); CENTRE NATIONAL DE LA CHERCHE SCENTIFIQUE, Paris (FR); ECOLE SUPERIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 718 days.

(21) Appl. No.: 16/979,133

(22) PCT Filed: Mar. 7, 2019

(86) PCT No.: PCT/FR2019/050509
§ 371 (c)(1),
(2) Date: Sep. 8, 2020

(87) PCT Pub. No.: WO2019/171006
PCT Pub. Date: Sep. 12, 2019

(65) Prior Publication Data
US 2020/0399415 A1 Dec. 24, 2020

(30) Foreign Application Priority Data

Mar. 7, 2018 (FR) .................................... 1851968

(51) Int. Cl.
*C08F 8/42* (2006.01)
*C08F 230/06* (2006.01)
(Continued)

(52) U.S. Cl.
CPC ............ *C08F 293/005* (2013.01); *C08F 8/42* (2013.01); *C08F 212/02* (2013.01);
(Continued)

(58) Field of Classification Search
None
See application file for complete search history.

(56) References Cited

U.S. PATENT DOCUMENTS

| 2011/0319305 | A1 | 12/2011 | Eisenberg et al. |
| 2017/0008989 | A1* | 1/2017 | Nguyen ................ C08F 220/20 |
| 2018/0023028 | A1* | 1/2018 | Nicolay ............... C10M 161/00 508/199 |

FOREIGN PATENT DOCUMENTS

| EP | 0 570 073 A1 | 11/1993 |
| WO | 2015/110642 A1 | 7/2015 |

OTHER PUBLICATIONS

Jun. 18, 2019 International Search Report issued in International Patent Application No. PCT/FR2019/050509.
(Continued)

*Primary Examiner* — Richard A Huhn
(74) *Attorney, Agent, or Firm* — Oliff PLC

(57) ABSTRACT

Compositions resulting from the mixing of at least: a comb polydiol copolymer A1 and a compound A2 including at least two boronic ester functional groups, the comb polydiol copolymer A1 including a main chain and side chains, at least a portion of the side chains of the copolymer A1 being
(Continued)

composed of oligomers. They exhibit very varied rheological properties depending on the proportion of the compounds A1 and A2 used. Composition resulting from the mixing of at least one lubricating oil with such a composition of associative and exchangeable polymers and use of this composition for lubricating a mechanical part.

20 Claims, 9 Drawing Sheets

(51) Int. Cl.
    *C08F 293/00*     (2006.01)
    *C08F 220/18*     (2006.01)
    *C08F 212/02*     (2006.01)
    *C08K 5/55*     (2006.01)
    *C10M 155/04*     (2006.01)

(52) U.S. Cl.
    CPC .. *C08F 220/1804* (2020.02); *C08F 220/1812* (2020.02); *C08K 5/55* (2013.01); *C10M 155/04* (2013.01); *C08F 230/06* (2013.01); *C08F 2438/03* (2013.01); *C10M 2227/062* (2013.01)

(56) References Cited

OTHER PUBLICATIONS

Jun. 18, 2019 Written Opinion of the International Searching Authority issued in International Patent Application No. PCT/FR2019/050509.

* cited by examiner

COMPOSITION COMPRISING THERMOASSOCIATIVE AND EXCHANGEABLE COPOLYMERS

TECHNICAL FIELD

The invention relates to a composition resulting from the mixing of at least one comb polydiol copolymer A1 and of at least one compound A2 comprising at least two boronic ester functional groups. Such compositions exhibit very varied rheological properties depending on the proportion of the compounds A1 and A2 used. The invention also relates to a composition resulting from the mixing of at least one lubricating oil with such a polymer composition and to the use of this composition for lubricating a mechanical part.

The field of the invention is that of associative and exchangeable polymers and that of lubricants.

STATE OF THE PRIOR ART

Polymers of high molar masses are widely used to increase the viscosity of solutions in many fields, such as the oil, paper, water treatment, mining, cosmetics and textile industries and generally in all industrial techniques using thickened solutions.

In point of fact, these polymers of high molecular weights exhibit the disadvantage of exhibiting a significant irreversible degradation under mechanical stress, in comparison with the same polymers of smaller sizes. These shear stresses on polymers of high molar masses result in cleavages at the macromolecular chains. The polymer, thus degraded, experiences a decline in or disappearance of its thickening properties, and the viscosity of the solutions containing it drops irreversibly. This low shear strength results in a deterioration in the properties of the solutions based on polymers of high molar masses.

Applications WO2015/110642, WO2015/110643 and WO2016113229 disclose a composition resulting from the mixing of at least one copolymer A1 resulting from the copolymerization of at least one monomer functionalized by diol functional groups and of at least one compound A2 comprising at least two boronic ester functional groups. These compounds can associate, to possibly form a gel, and exchange chemical bonds in a thermoreversible way. These additives exhibit the advantage of reducing the drop 35 in viscosity of the solution comprising them when the temperature increases. These polymer compositions exhibit very varied rheological properties depending on the proportion of the compounds A1 and A2 used. They can additionally comprise an exogenous compound which makes it possible to better control the association of the two compounds.

In particular, these polymer compositions can be added to a lubricating oil in order to lubricate a mechanical part. These copolymers make it possible to formulate lubricating compositions, the viscosity of which is better controlled in comparison with the lubricating compositions of the prior art. In particular, these copolymers, when they are introduced into a base oil, tend to reduce the drop in viscosity of the mixture when the temperature increases.

Lubricating compositions are compositions applied between the surfaces, notably metal surfaces, of moving parts. They make it possible to reduce the friction and the wear between two parts in contact and in movement with respect to each other. They also serve to dissipate a portion of the thermal energy generated by this friction. The lubricating compositions form a protective film between the surfaces of the parts on which they are applied.

The compositions used for the lubrication of mechanical parts generally consist of a base oil and of additives. The base oil, notably of petroleum or synthetic origin, exhibits variations in viscosity when the temperature is varied.

This is because, when the temperature of a base oil increases, its viscosity decreases and, when the temperature of the base oil decreases, its viscosity increases. In point of fact, under hydrodynamic lubrication conditions, the thickness of the protective film is proportional to the viscosity, and thus also depends on the temperature. A composition exhibits good lubricating properties if the thickness of the protective film remains substantially constant whatever the conditions and the duration of use of the lubricant.

In an internal combustion engine, a lubricating composition can be subjected to external or internal temperature changes. The external temperature changes are due to variations in temperature of the ambient air, such as temperature variations between summer and winter, for example. The internal temperature changes result from the operation of the engine. The temperature of an engine is lower during its starting phase, notably in cold weather, than during prolonged use. Consequently, the thickness of the protective film can vary in these different situations.

There thus exists a need to have available a lubricating composition having good lubrication properties, the viscosity of which is not significantly subject to variations in temperature.

It is known to add viscosity improvers, which improve the viscosity of a lubricating composition. The function of these additives is to modify the rheological behavior of the lubricating composition. They make it possible to promote a greater stability of the viscosity over a temperature range at which the lubricating composition is used. For example, these additives limit the decrease in the viscosity of the lubricating composition when the temperature rises, while limiting the increase in the viscosity under cold conditions.

The viscosity improvers (or viscosity index improvers) make it possible to guarantee good lubrication by limiting the impact on the viscosity under cold conditions and by guaranteeing a minimum film thickness under hot conditions. The viscosity improvers currently used are polymers such as olefin copolymers (OCPs) and polyalkyl methacrylates (PAMs). In general, the higher their molecular weight, the greater the contribution of these polymers to the control of the viscosity.

However, the polymers of high molar masses exhibit the disadvantage of having a low resistance to permanent shear, in comparison with the polymers of the same nature and of the same architecture but of smaller size.

In point of fact, a lubricating composition is subjected to high shear stresses, notably in internal combustion engines, where the moving surfaces have a very small spacing and the pressures exerted on the parts are high. These shear stresses on polymers of high molar masses result in cleavages at the macromolecular chains. The polymer, thus degraded, experiences a reduction in its thickening properties, and the viscosity drops irreversibly. This low resistance to permanent shear thus leads to a deterioration in the lubrication properties of the lubricating composition.

Finally, attempts have been made to develop compositions exhibiting better stability to oxidation, in particular better resistance to oxidation by free radicals.

The document US2011/319305 describes comb copolymers comprising repeat units of olefinic type with a molecular weight of greater than 500 g/mol and repeat units with a molecular weight of less than 500 g/mol and their use in hydraulic fluids.

The document EP 0 570 073 describes an additive for lubricating oils of poly(alkyl)-acrylate type in which some monomers comprise boron-based functionalities.

It is indicated, in applications WO2015/110642, WO2015/110643 and WO2016113229, that the random diol copolymers A1 are comb copolymers, that is to say copolymers having available a main chain (also known as backbone) and pendant hydrocarbon side chains, which are optionally hydroxylated, on either side of the main chain. It is observed that the side chains of these copolymers of the prior art are not polymers or oligomers, and that these copolymers are thus not comb copolymers in the sense usual for a person skilled in the art (IUPAC Commission on Macromolecular Nomenclature, Glossary of basic terms in polymer science, 1996 Recommendations, available at https://www.gfp.asso.fr/wp-content/uploads/glossaire.pdf). In reality, these copolymers are instead linear copolymers, the non-polymeric hydrocarbon side chains of which have a mean length ranging from 8 to 20 carbon atoms.

The compositions described in applications WO2015/110642, WO2015/110643 and WO2016113229 exhibit very advantageous properties, due to their ability to form thermoreversible associations. However, it was desired to further improve these properties; notably, attempts have been made to reduce the sensitivity of the viscosity of the compositions with respect to the temperature, to provide compositions which exhibit a better stability of the viscosity between high temperatures and low temperatures. Attempts have also been made to provide compositions which exhibit a greater amplitude of modulation of the viscosity.

In addition, it has been found that, under certain conditions, notably of high temperature, the associative behavior of these copolymers decreased. In particular, a drop in the viscosity index of the lubricating compositions comprising them and a poorer resistance to cycling (which can be defined as the succession of sequences of rise and decrease in the temperature as is observed in an engine), bringing about a loss in the lubricating properties over time, have been observed.

Consequently, the applicant company set itself as objective the preparation of novel copolymers exhibiting improved properties with respect to the copolymers of the prior art.

This objective is achieved by virtue of novel rheological additives which can associate, to possibly form a gel, and exchange in a thermoreversible way. Unlike the base oil, which thins when the temperature increases, the additives of the present invention exhibit the advantage of thickening the medium in which they are dispersed when the temperature increases and retain this advantage at high temperatures, such as, for example, up to 150° C. These additives comprise a comb polydiol copolymer A1 (a portion at least of the side chains of which are of oligomer or polymer type) and a compound A2 comprising at least two boronic ester functional groups. These additives make possible a greater amplitude of modulation of the viscosity as a function of the temperature. The lubricating compositions comprising them exhibit a reduced sensitivity of their viscosity with regard to the temperature and a greater stability of the viscosity with regard to changes in temperature. This characteristic results from the combined use of two specific compounds, a comb copolymer carrying diol functional groups and optionally styrenic functional groups and a compound comprising boronic ester functional groups.

It is possible, by virtue of the compositions of the invention, to provide lubricating compositions which have good lubrication properties during the phases of starting an engine (cold phase) and good lubrication properties when the engine is functioning at its operating temperature (hot phase).

SUMMARY OF THE INVENTION

The invention relates to a composition resulting from the mixing of at least
  a comb polydiol copolymer A1
  and
  a compound A2 comprising at least two boronic ester functional groups,
the comb polydiol copolymer A1 comprising a main chain and side chains, at least a portion of the side chains of the copolymer A1 being composed of oligomers.

A further subject matter of the invention is a lubricating composition resulting from the mixing of at least:
  a lubricating oil, and
  a composition as defined above and in detail below.

The invention additionally relates to a method for modulating the viscosity of a lubricating composition, the method comprising at least:
  the provision of a composition as defined above and in detail in the description below,
  the mixing of this composition with a lubricating oil.

According to a preferred embodiment, the side chains composed of oligomers represent from 3% to 95% by weight, with respect to the total weight of the copolymer A1, preferably from 15% to 95%.

According to a preferred embodiment, at least a portion of the side chains of the copolymer A1 are composed of oligomers comprising more than 30 carbon atoms, preferably at least 50 carbon atoms, better still at least 70 carbon atoms.

According to an again preferred embodiment, the side chains composed of oligomers comprising more than 30 carbon atoms represent from 3% to 95% by weight, with respect to the total weight of the copolymer A1, preferably from 15% to 95%.

According to a preferred embodiment, at least a portion of the side chains of the copolymer A1 are composed of oligomers which exhibit a degree of polymerization ranging from 5 to 1000, preferably from 5 to 500, better still from 5 to 200.

According to a preferred embodiment, at least a portion of the side chains of the copolymer A1 are composed of oligomers O1 comprising a polyolefin fragment.

According to a preferred embodiment, the side chains of the copolymer A1 composed of oligomers O1 comprise a polyolefin fragment having from 30 to 500 carbon atoms, preferentially from 50 to 400 carbon atoms, even better still from 50 to 200 carbon atoms.

According to a preferred embodiment, the side chains comprising a polyolefin fragment represent from 3% to 85%, preferably from 15% to 70%, by weight, with respect to the total weight of the copolymer A1.

According to an again preferred embodiment, the oligomers O1 are present in the copolymer A1 in the form of repeat units corresponding to one or more monomers M6 of general formula (IX):

in which:
$Q_1$ is chosen from the group formed by —H, —$CH_3$ and —$CH_2$—$CH_3$;
$Q_2$ is chosen from a -Q', —O-Q', —C(O)—O-Q', —O—C(O)-Q', —S—$(CH_2)_2$—C(O)—O-Q', —S-Q', —N(H)—C(O)-Q' and —C(O)—N(H)-Q' group, with Q' is a polyolefin,
n represents an integer chosen from 0 and 1,
A represents a divalent group chosen from -$A_1$-, —O-(-$A_2$-O—)$_{n'}$-$A_1$-, —C(O)—O-(-$A_2$-O—)$_{n'}$-$A_1$-, —O—C(O)-(-$A_2$-O—)$_{n'}$-$A_1$-, —S-(-$A_2$-O—)$_{n'}$-$A_1$-, —N(H)—C(O)-(-$A_2$-O—)$_{n'}$-$A_1$- and —C(O)—N(H)-(-$A_2$-O-)$_{n'}$-$A_1$-, with:
$A_1$ is a divalent radical chosen from a $C_1$-$C_{30}$ alkyl, a $C_6$-$C_{30}$ aryl or a $C_6$-$C_{30}$ aralkyl,
$A_2$ is a divalent radical chosen from $C_2$-$C_4$ alkyls,
n' is an integer, n' represents 0 or 1.

According to a preferred embodiment, at least a portion of the side chains of the copolymer A1 are composed of oligomers O2 comprising repeat units corresponding to monomers M2 of general formula (II):

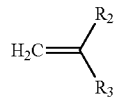
(II)

in which:
$R_2$ is chosen from the group formed by —H, —$CH_3$ and —$CH_2$—$CH_3$,
$R_3$ is chosen from the group formed by: —C(O)—O—$R'_3$, —O—$R'_3$, —S—$R'_3$ and —C(O)—N(H)—$R'_3$, with $R'_3$ is a $C_1$-$C_{30}$ alkyl group.

According to an again preferred embodiment, at least a portion of the oligomers O2 comprise repeat units corresponding to monomers M1 of general formula (I):

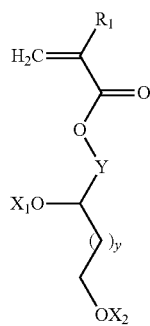
(I)

in which:
$R_1$ is chosen from the group formed by —H, —$CH_3$ and —$CH_2$—$CH_3$;
y is an integer equal to 0 or 1;
Y represents a divalent linking group chosen from $C_1$-$C_{20}$ alkyl chains, optionally comprising one or more ether —O— bridges;
$X_1$ and $X_2$, which are identical or different, are chosen from the group formed by hydrogen, tetrahydropyranyl, methyloxymethyl, tert-butyl, benzyl, trimethylsilyl and t-butyldimethylsilyl;

or else
$X_1$ and $X_2$ form, with the oxygen atoms, a bridge of following formula:

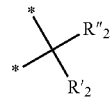

in which:
the stars (*) symbolize the bonds to the oxygen atoms,
$R'_2$ and $R''_2$, which are identical or different, are chosen from the group formed by hydrogen and a $C_1$-$C_{11}$ alkyl, preferably methyl;
or else
$X_1$ and $X_2$ form, with the oxygen atoms, a boronic ester of following formula:

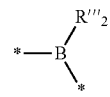

in which:
the stars (*) symbolize the bonds to the oxygen atoms,
$R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl.

According to an again preferred embodiment, the monomer M1 is chosen from the monomers of formula (Ia):

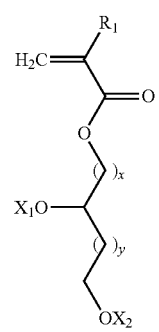
(Ia)

in which x is an integer ranging from 1 to 18, preferably from 2 to 18.

According to one embodiment, when a portion of the side chains of the copolymer A1 are composed of oligomers comprising repeat units corresponding to monomers M1 and/or M2, these oligomers exhibit a degree of polymerization ranging from 5 to 500, preferably from 10 to 400, better still from 20 to 200.

According to a preferred embodiment, when the side chains of the copolymer A1 are composed of oligomers O1 comprising a polyolefin fragment having from 30 to 105 carbon atoms, the repeat units of the copolymer A1 contain more than 5 mol % of monomers M6 of general formula (IX), preferably more than 6 mol % of monomers M6 of general formula (IX), even better still more than 6.5 mol % of monomers M6 of general formula (IX).

According to a preferred embodiment, the main chain of the copolymer A1 comprises repeat units corresponding to at least one monomer M2 of general formula (II):

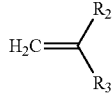

(II)

in which:

$R_2$ is chosen from the group formed by —H, —$CH_3$ and —$CH_2$—$CH_3$, $R_3$ is chosen from the group formed by: —C(O)—O—$R'_3$, —O—$R'_3$, —S—$R'_3$ and C(O)—N(H)—$R'_3$, with $R'_3$ is a $C_1$-$C_{30}$ alkyl group.

According to an again preferred embodiment, the main chain of the copolymer A1 comprises repeat units corresponding to at least one monomer M1 of general formula (I):

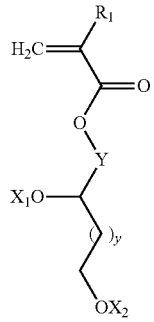

(I)

in which:

$R_1$ is chosen from the group formed by —H, —$CH_3$ and —$CH_2$—$CH_3$;

y is an integer equal to 0 or 1;

Y represents a divalent linking group chosen from $C_1$-$C_{20}$ alkyl chains, optionally comprising one or more ether —O— bridges;

$X_1$ and $X_2$, which are identical or different, are chosen from the group formed by hydrogen, tetrahydropyranyl, methyloxymethyl, tert-butyl, benzyl, trimethylsilyl and t-butyldimethylsilyl;

or else $X_1$ and $X_2$ form, with the oxygen atoms, a bridge of following formula:

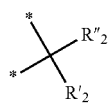

in which:

the stars (*) symbolize the bonds to the oxygen atoms, $R'_2$ and $R''_2$, which are identical or different, are chosen from the group formed by hydrogen and a $C_1$-$C_{11}$ alkyl, preferably methyl;

or else $X_1$ and $X_2$ form, with the oxygen atoms, a boronic ester of following formula:

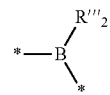

in which:

the stars (*) symbolize the bonds to the oxygen atoms, $R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl.

According to an again preferred embodiment, the monomer M1 is chosen from the monomers of general formula (Ia):

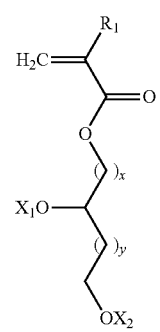

(Ia)

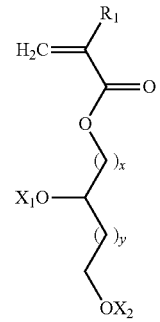

in which x is an integer ranging from 1 to 18, preferably from 2 to 18.

According to a preferred embodiment, the copolymer A1 comprises repeat units corresponding to at least one monomer M3 of general formula (X):

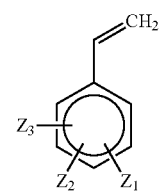

in which:

—$Z_1$, $Z_2$ and $Z_3$, which are identical or different, represent groups chosen from a hydrogen atom, a $C_1$-$C_{12}$ alkyl or a —OZ' or —C(O)—O—Z' group, with Z' a $C_1$-$C_{12}$ alkyl.

According to an again preferred embodiment, the monomer M3 is styrene.

According to an again preferred embodiment, the repeat units corresponding to monomers of formula (X) represent from 2 mol % to 50 mol %, with respect to the total number of moles of the repeat units of which the copolymer A1 is composed.

According to a preferred embodiment, the main chain of the comb copolymer A1 comprises at least two repeat units corresponding to monomers M2 of formula (II) having different $R_3$ groups.

According to an again preferred embodiment, one of the monomers M2 of the copolymer A1 has the general formula (II-A):

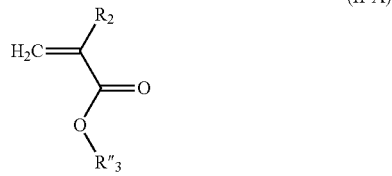

(II-A)

in which:
R$_2$ is chosen from the group formed by —H, —CH$_3$ and —CH$_2$—CH$_3$,
R"$_3$ is a C$_1$-C$_8$ alkyl group,
and the other monomer M2 of the copolymer A1 has the general formula (II-B):

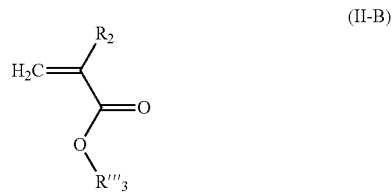

(II-B)

in which:
—R$_2$ is chosen from the group formed by —H, —CH$_3$ and —CH$_2$—CH$_3$,
R'"$_3$ is a C$_9$-C$_{30}$ alkyl group.

According to a preferred embodiment, at least a portion of the side chains of the comb copolymer A1 are oligomers O1 comprising a polyolefin fragment and the main chain of the comb copolymer A1 comprises at least one repeat unit corresponding to monomers M2 of general formula (II-A):

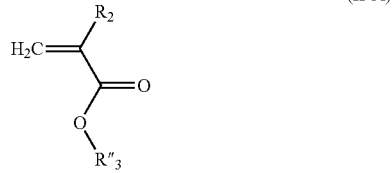

(II-A)

in which:
R$_2$ is chosen from the group formed by —H, —CH$_3$ and —CH$_2$—CH$_3$,
R"$_3$ is a C$_1$-C$_8$ alkyl group.

According to a preferred embodiment, the repeat units corresponding to monomers M2 represent from 10 mol % to 90 mol %, preferably from 30 mol % to 80 mol %, with respect to the total number of moles of the repeat units of which the copolymer A1 is composed.

According to a preferred embodiment, the repeat units corresponding to monomers M1 represent from 1 mol % to 50 mol %, preferably from 5 mol % to 30 mol %, with respect to the total number of moles of the repeat units of which the copolymer A1 is composed.

According to a preferred embodiment, the copolymer A1 exhibits a degree of branching ranging from 0.1 mol % to 10 mol %. The degree of branching is calculated by taking into account only the oligomeric side chains comprising more than 30 carbon atoms.

The copolymer A1 preferably exhibits a degree of branching ranging from 0.5 mol % to 5 mol % when the oligomeric chains are olefins with more than 100 carbon atoms, from 5 mol % to 10 mol % when the oligomeric chains are olefins with from 30 to 100 carbon atoms.

According to a preferred embodiment, the comb copolymer A1 comprises nonoligomeric pendant chains which have a mean length ranging from 1 to 10 carbon atoms, preferably from 3 to 8 carbon atoms.

According to a preferred embodiment, the main chain of the comb copolymer A1 has a number-average degree of polymerization ranging from 40 to 2000, preferably from 40 to 1000.

According to a preferred embodiment, the oligomeric pendant chains of the comb copolymer A1 have a number-average degree of polymerization ranging from 8 to 1000.

According to a first embodiment, the compound A2 is a compound of formula (III):

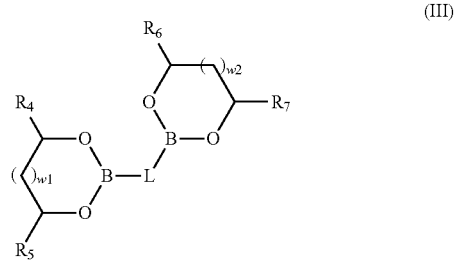

(III)

in which:
w$_1$ and w$_2$, which are identical or different, are integers chosen between 0 and 1;
R$_4$, R$_5$, R$_6$ and R$_7$, which are identical or different, represent a group chosen from a hydrogen atom or a hydrocarbon group comprising from 1 to 30 carbon atoms, optionally substituted by one or more groups chosen from: a hydroxyl or an —OJ or —C(O)—O-J group, with J a hydrocarbon group comprising from 1 to 24 carbon atoms;
L is a divalent linking group chosen from the group formed by a C$_6$-C$_{18}$ aryl, a C$_6$-C$_{18}$ aralkyl and a C$_2$-C$_{24}$ hydrocarbon chain.

According to a second embodiment, the compound A2 is a copolymer comprising at least:
repeat units corresponding to monomers M4 of formula (IV):

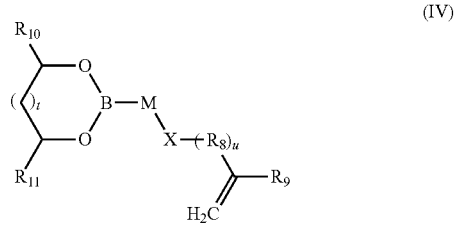

(IV)

in which:
t is an integer equal to 0 or 1;
u is an integer equal to 0 or 1;

M and $R_8$ are divalent linking groups, which are identical or different, chosen from the group formed by a $C_6$-$C_{18}$ aryl, a $C_7$-$C_{24}$ aralkyl and a $C_2$-$C_{24}$ alkyl; preferably, M is a $C_6$-$C_{18}$ aryl and $R_8$ is a $C_7$-$C_{24}$ aralkyl;

X is a functional group chosen from the group formed by —O—C(O)—, —C(O)—O—, —C(O)—N(H)—, —N(H)—C(O)—, —S—, —N(H)—, —N(R'$_4$)— and —O—, with R'$_4$ a hydrocarbon chain comprising from 1 to 15 carbon atoms;

$R_9$ is chosen from the group formed by —H, —CH$_3$ and —CH$_2$—CH$_3$;

$R_{10}$ and $R_{11}$, which are identical or different, represent a group chosen from a hydrogen atom or a hydrocarbon group comprising from 1 to 30 carbon atoms, optionally substituted by one or more groups chosen from: a hydroxyl or an —OJ or —C(O)—O-J group, with J a hydrocarbon group comprising from 1 to 24 carbon atoms;

repeat units corresponding to monomers M5 of general formula (V):

(V)

in which:
$R_{12}$ is chosen from the group formed by —H, —CH$_3$ and —CH$_2$—CH$_3$,
$R_{13}$ is chosen from the group formed by a $C_6$-$C_{18}$ aryl and a $C_6$-$C_{18}$ aryl substituted by a R'$_{13}$, —C(O)—O—R'$_{13}$, —O—R'$_{13}$, —S—R'$_{13}$ and —C(O)—N(H)—R'$_{13}$ group, with R'$_{13}$ is a $C_1$-$C_{30}$ alkyl group.

According to a preferred embodiment, when the compound A2 is a copolymer comprising at least two boronic ester functional groups, it is a comb copolymer comprising a main chain and side chains, at least a portion of the side chains of the copolymer A2 being composed of oligomers.

According to a preferred embodiment, when the compound A2 is a copolymer, at least one of the following three conditions is achieved:
either, in the formula (IV): u=1, $R_9$ is H and $R_8$ represents a $C_6$-$C_{18}$ aryl or a $C_7$-$C_{24}$ aralkyl and the double bond of the monomer M4 of formula (IV) is directly connected to the aryl group;
or, in the formula (V): $R_{12}$ represents H and $R_{13}$ is chosen from the group formed by a $C_6$-$C_{18}$ aryl and a $C_6$-$C_{18}$ aryl substituted by an R'$_{13}$ group with R'$_{13}$ represents H or a $C_1$-$C_{25}$ alkyl group and the double bond of the monomer M5 of formula (V) is directly connected to the aryl group;
or the copolymer A2 comprises at least one third monomer M3 of formula (X):

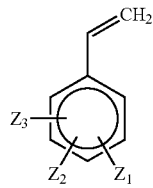

in which:
$Z_1$, $Z_2$ and $Z_3$, which are identical or different, represent groups chosen from a hydrogen atom, a $C_1$-$C_{12}$ alkyl or an —OZ' or —C(O)—O—Z' group, with Z' a $C_1$-$C_{12}$ alkyl.

Advantageously, when A2 comprises a third monomer M3 of formula (X), this monomer M3 is styrene.

Advantageously, the boronic ester copolymer A2 has a molar percentage of styrenic monomer(s), advantageously styrene, of formula (IV), (V) and/or (X) in said copolymer ranging from 0.05 mol % to 30 mol %, preferably from 0.1% to 25%.

According to a preferred embodiment, the content of copolymer A1 ranges from 0.1% to 50% by weight, with respect to the total weight of the composition.

According to a preferred embodiment, the content of compound A2 ranges from 0.1% to 50% by weight, with respect to the total weight of the composition.

According to a preferred embodiment, the ratio by weight of the copolymer A1 to the compound A2 (A1/A2 ratio) ranges from 0.005 to 200, preferably from 0.05 to 20, more preferably still from 0.1 to 10.

According to a preferred embodiment, the copolymer A1 was obtained by a method comprising at least:
a stage of reversible addition-fragmentation chain-transfer radical polymerization in the presence of a transfer agent of thiocarbonylthio type.

According to an again preferred embodiment, the copolymer A1 was obtained by a method comprising at least, after the polymerization:
a stage of aminolysis of the thiocarbonylthio residue to give thiol, followed by
a Michael addition to an acrylate, in order to convert the thiol into a thioether.

According to a preferred embodiment, the composition additionally comprises at least one exogenous compound A4 chosen from polyols.

According to a preferred embodiment, the molar percentage of exogenous compound A4 with respect to the boronic ester functional groups of the copolymer A2 ranges from 0.025% to 5000%, preferably ranges from 0.1% to 1000%, more preferably still from 0.5% to 500%, more preferably still from 1% to 150%.

According to another preferred embodiment, the composition additionally comprises at least one exogenous compound A5 chosen from those corresponding to the formula (XI):

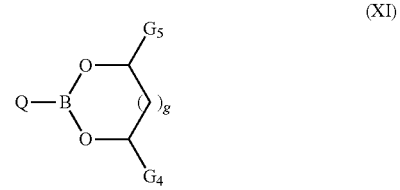

(XI)

in which:
Q represents a group chosen from a hydrocarbon group comprising from 1 to 30 carbon atoms, optionally substituted by one or more groups chosen from: a hydroxyl or an —OJ or —C(O)—O-J group, with J a hydrocarbon group comprising from 1 to 24 carbon atoms,
$G_4$ and $G_5$, which are identical or different, represent groups chosen from a hydrogen atom, a hydrocarbon chain comprising from 1 to 24 carbon atoms, a hydroxyl or an —OJ or —C(O)—O-J group, with J a hydrocarbon group comprising from 1 to 24 carbon atoms, g represents 0 or 1.

According to a preferred embodiment, the lubricating oil is chosen from the oils of Group I, Group II, Group III, Group IV or Group V of the API classification and one of their mixtures.

According to a preferred embodiment, the lubricating composition comprises at least one functional additive chosen from the group formed by antioxidants, detergents, antiwear additives, load-carrying additives, polymers which improve the viscosity index, pour point improvers, antifoaming agents, anticorrosion additives, thickeners, dispersants, friction modifiers and their mixtures.

DETAILED DESCRIPTION

The expression "is essentially composed of", followed by one or more characteristics, means that, besides the components or stages explicitly listed, components or stages which do not significantly modify the properties and characteristics of the invention can be included in the method or the material of the invention.

The expression "of between X and Y" includes the limits, unless explicitly mentioned otherwise. This expression thus means that the interval targeted comprises the values X, Y and all the values ranging from X to Y.

Definitions

"Oligomer" is understood to mean a macromolecule consisting of a limited number of repeat units. These repeat units can be all identical or an oligomer can comprise different repeat units. Generally, an oligomer comprises from 2 to 1000 repeat units. Most often, an oligomer results from the polymerization or copolymerization of a limited number of monomers. An oligomer comprises a main chain and can comprise side chains, also denoted pendant chains.

The main chain of a polymer or of an oligomer is a linear chain on which all the other chains can be considered as pendant. When several chains can be regarded as main chain, the one designated main chain is that which results in the simplest representation of the molecule. The term "main chain" within the meaning of the present invention does not necessarily mean that the chain length of the main chain is greater than that of the side chains.

A side chain or a pendant chain is a substituent of a macromolecular chain. This substituent can be a molecule of low molecular weight, an oligomer or a polymer. Preferably, according to the invention, the oligomeric pendant chains comprise a series of at least 30 carbon atoms, preferably at least 50 carbon atoms, better still at least 70 carbon atoms.

"Copolymer" is understood to mean a linear or branched oligomer or macromolecule having a sequence consisting of several repeat units (or monomer motifs), at least two units of which have a different chemical structure.

"Monomer motif" or "monomer" is understood to mean a molecule capable of being converted into an oligomer or a macromolecule by combination with itself or with other molecules of the same type. A monomer designates the smallest constituent unit, the repetition of which results in an oligomer or in a macromolecule.

"Comb polymer", also designated branched copolymer, is understood to mean a polymer which exhibits a main chain and at least one side chain or pendant chain attached to the main chain at a point located between the two ends of the main chain, known as branch point. Unlike linear polymers, which comprise non-polymeric side groups or pendant groups, the side chains of comb polymers are oligomers, polymers or copolymers. Preferably, according to the invention, a comb polymer comprises at least two, better still at least three, side chains or pendant chains. The degree of branching within the meaning of the invention characterizes the branching by oligomeric side chains having more than 30 carbon atoms.

"Random copolymer" is understood to mean an oligomer or a macromolecule in which the sequential distribution of the monomer motifs obeys known statistical laws. For example, a copolymer is said to be random when it is formed by monomer motifs, the distribution of which is a Markovian distribution. A diagrammatic random polymer (P1) is illustrated in FIG. 1. The distribution in the polymer chain of the monomer motifs depends on the reactivity of the polymerizable functional groups of the monomers and on the relative concentration of the monomers.

"Block copolymer" is understood to mean an oligomer or a macromolecule which comprises one or more blocks or which is formed of blocks. "Block" denotes a portion of a copolymer comprising several identical or different monomer motifs and which has at least one distinguishing feature of constitution or of configuration making it possible to distinguish it from its adjacent portions. A diagrammatic block copolymer (P3) is illustrated in FIG. 1.

A "gradient copolymer" denotes a copolymer of at least two monomer motifs of different structures, the monomer composition of which changes gradually along the polymer chain, thus gradually passing from one end of the polymer chain rich in one monomer unit to the other end rich in the other comonomer. A diagrammatic gradient polymer (P2) is illustrated in FIG. 1.

The polydiol copolymers of the invention are random copolymers or gradient copolymers. They can exhibit a gradient distribution of certain monomers and a statistical or virtually statistical distribution of other monomers. They differ from block copolymers.

"Copolymerization" is understood to mean a method which makes it possible to convert a mixture of at least two monomer motifs of different chemical structures into an oligomer or into a copolymer.

Polyolefins are known to a person skilled in the art. They can be obtained by polymerizing alkenes and/or alkanedienes consisting of carbon and hydrogen, for example $C_2$-$C_{10}$ alkenes, such as ethylene, propylene, n-butene, isobutene, cyclobutene, cycloheptene, cyclooctene or norbornene, and/or $C_4$-$C_{10}$ alkadienes, such as butadiene, isoprene, cyclooctadiene or norbornadiene. According to the invention, the following are included in the definition of polyolefins: hydrogenated polyolefins, hydrogenated poly (alkanedienes), the hydrogenation being partial or complete, copolymers of olefin, of polyolefin, of hydrogenated polyolefin and of hydrogenated polyolefin-co-polyolefin.

In the continuation of the present patent application, "B" represents a boron atom.

"$C_i$-$C_j$ alkyl" is understood to mean a saturated, linear or branched, hydrocarbon chain comprising from i to j carbon atoms. For example, "$C_1$-$C_{10}$ alkyl" is understood to mean a saturated, linear or branched, hydrocarbon chain comprising from 1 to 10 carbon atoms.

"$C_x$-$C_y$ aryl" is understood to mean a functional group which derives from an aromatic hydrocarbon compound comprising from x to y carbon atoms. This functional group can be monocyclic or polycyclic. By way of illustration, a $C_6$-$C_{18}$ aryl can be phenyl, naphthalene, anthracene, phenanthrene and tetracene.

"$C_x$-$C_y$ alkenyl" is understood to mean a linear or branched hydrocarbon chain comprising at least one unsaturation, preferably a carbon-carbon double bond, and comprising from x to y carbon atoms.

"$C_x$-$C_y$ aralkyl" is understood to mean an aromatic hydrocarbon compound, preferably monocyclic, substituted by at least one linear or branched alkyl chain and the total number of carbon atoms of the aromatic ring of which and of its substituents ranges from x to y carbon atoms. By way of illustration, a $C_7$-$C_{18}$ aralkyl can be chosen from the group formed by benzyl, tolyl and xylyl.

"$C_x$-$C_y$ aryl substituted by a Y group" is understood to mean an aromatic hydrocarbon compound, preferably monocyclic, comprising from x to y carbon atoms, at least one carbon atom of the aromatic ring of which is substituted by a Y group.

"Hal" or "halogen" is understood to mean a halogen atom chosen from the group formed by chlorine, bromine, fluorine and iodine.

In the description, when it is indicated that a copolymer "comprises repeating units corresponding to a monomer $M_i$", this means that the copolymer can result directly from the copolymerization of the monomer $M_i$, and i represents an index identifying the different monomers illustrated below, with other comonomers, but also that the copolymer may have been obtained by copolymerization of other monomers than the monomers $M_i$ and have been subsequently subjected to a chemical transformation stage, so that the structural units which it comprises are identical to those which would have been obtained by copolymerization of the monomer $M_i$. For example, a monomer having acid functionality, such as acrylic acid or methacrylic acid, can first of all be copolymerized with other monomers to form a copolymer, then all or a portion of the acid functional groups can subsequently be converted by any reaction, for example by means of an esterification reaction with an alkanol or an amidation reaction with an alkylamine. A copolymer comprising repeat units corresponding to an alkyl acrylate or alkylacrylamide monomer will then be obtained.

Composition of Additives According to the Invention:

A subject matter of the present invention is a composition of compounds which are associative and which can exchange in a thermoreversible way, this composition resulting from the mixing of at least:
 a comb polydiol copolymer A1 as described below or notably capable of being obtained by one of the methods described below;
 a compound A2 comprising at least two boronic ester functional groups.

This composition of additives makes it possible to control and to modulate the rheological behavior of a medium to which it is added. The medium can be a hydrophobic, notably nonpolar, medium, such as a solvent, a mineral oil, a natural oil or a synthetic oil.

Comb Polydiol Copolymers A1

The comb polydiol copolymer A1 comprises a main chain to which side chains are attached, at least a portion of the side chains of the copolymer A1 being composed of oligomers.

The side chains of the comb copolymer A1 according to the invention differ from the side chains of the polyol copolymers of the prior art employed as a mixture with boronic esters in that at least a portion of the side chains are composed of oligomers.

"Side chain composed of oligomers" is understood to mean that a portion at least of the side chain is an oligomer of one or more monomers. It is not in the least ruled out for this side chain to include other functionalities, such as, for example, a functional group or a succession of functional groups, connecting the side chain to the main chain.

The Side Chains of the Copolymers A1

The side chains of the copolymers A1 composed of oligomers exhibit a degree of polymerization which is not zero, unlike the side chains of the copolymers of the same type which are known from the prior art.

Preferably, the side chains composed of oligomers represent from 3% to 95% by weight, with respect to the total weight of the copolymer A1, preferably from 15% to 95%, better still from 20% to 95%.

Preferably, at least a portion of the side chains of the copolymer A1 are composed of oligomers comprising more than 30 carbon atoms, preferably at least 50 carbon atoms, better still at least 70 carbon atoms.

Preferably, the side chains composed of oligomers comprising more than 30 carbon atoms represent from 3% to 95% by weight, with respect to the total weight of the copolymer A1, preferably from 15% to 95%, better still from 20% to 95%.

Preferably, at least a portion of the side chains of the copolymers A1 composed of oligomers exhibit a degree of polymerization ranging from 5 to 1000, preferably from to 500, better still from 5 to 200.

More preferentially still, the side chains composed of oligomers with a degree of polymerization ranging from 5 to 1000 represent from 3% to 95% by weight, with respect to the total weight of the copolymer A1, preferably from 15% to 95%, better still from 20% to 95%.

The oligomeric side chains of the copolymers A1 can be all of the same nature or they can be of different natures.

The copolymers A1 can comprise oligomeric side chains and side chains which are not oligomers.

Preferably, the side chains of the copolymers A1 which are not oligomeric compounds represent from 5% to 97% by weight, with respect to the total weight of the copolymer A1, preferentially from 5% to 85%, better still from 5% to 80%, preferentially still from 5% to 75% by weight, with respect to the total weight of copolymer A1.

According to a first alternative form, at least a portion of the side chains of the copolymer A1 are composed of oligomers O1 comprising a polyolefin fragment. The polyolefin fragment can be obtained from a polyolefin macromonomer or from a functionalized monomer onto which a polyolefin functional group is grafted.

Preferably, the side chains comprising a polyolefin fragment represent from 8% to 50%, preferably from 10% to 40%, by weight, with respect to the total weight of the copolymer A1.

For example, the side chains comprising a polyolefin fragment can consist of repeat units corresponding to a monomer M6 of general formula (IX), derived from a polyolefin.

According to another alternative form, a portion of the side chains of the copolymer A1 are composed of oligomers O2 comprising repeat units corresponding to monomers chosen from monomers M2 of general formula (II).

For example, according to this alternative form, a portion of the side chains of the copolymer A1 are composed of oligomers O2 comprising repeat units corresponding to monomers chosen from:
 monomers M1 of general formula (I),
 monomers M2 of general formula (II).

The copolymer A1 can comprise both side chains of oligomers O1 type comprising a polyolefin fragment and of oligomers O2 type comprising repeat units corresponding to monomers chosen from monomers M2 of general formula (II).

The Main Chain of the Copolymers A1

The main chain of the comb copolymer A1 preferably comprises repeat units corresponding to monomers M1 of general formula (I).

The main chain of the comb copolymer A1 can comprise repeat units corresponding to monomers M2 of general formula (II).

Preferably, the main chain of the comb copolymer A1 comprises repeat units corresponding to at least one monomer M3 of general formula (X) defined above. According to this alternative form, the other monomers which participate in the composition of the comb polydiol copolymer A1 must be compatible with a copolymerization with monomers M3.

The copolymer A1 can be a random copolymer or a gradient copolymer.

Advantageously, the comb polydiol copolymer A1 results, directly or indirectly, from the (co)polymerization of at least one diol monomer M1, which is introduced either into the main chain, or into the side chains, or both into the main chain and into the side chains of the copolymer A1.

"Results directly or indirectly" is understood to mean that the method for the preparation of the copolymer can comprise one or more distinct stages of the copolymerization, such as a deprotection stage. Notably, the copolymerization can optionally be followed by a stage of deprotection of the diol functional groups.

Throughout the description, the following expressions are used interchangeably and in an equivalent manner: "the polydiol copolymer A1 results, directly or indirectly, from the copolymerization" and "the polydiol copolymer A1 results from the copolymerization".

Distribution of the Monomers in the Main Chain and in the Side Chains

The monomers M1, M2 and M3 can be present in the main chain and/or in the side chains. In the side chains, they are present in the form of oligomers. Optionally, other monomers can be present in the main chain and/or in the side chains.

Monomers M6 can be used in the copolymerization of the main chain and can provide oligomeric side chains.

When monomers M1, M2 and/or M3 are incorporated in the main chain of a copolymer A1 according to the invention, the side chains of the monomers M1, M2 and M3 form nonoligomeric side chains of the copolymer A1.

The comb copolymer A1 comprises nonoligomeric side chains which preferably have a mean length ranging from 1 to 10 carbon atoms, more preferentially still from 3 to 8 carbon atoms.

When the comb copolymer A1 comprises oligomeric side chains consisting of monomer M1 or of monomer M2, these monomers preferably have a mean length ranging from 1 to 10 carbon atoms.

"Mean length" is understood to mean the mean length of the alkyl fragments of the side chains of the monomers M1 of formula (I) and M2 of formula (II) participating in the constitution of the copolymer A1. The side chains resulting from the styrenic monomer(s) are not taken into account in the calculation of the mean lengths of the side chains of the comb copolymers A1. A person skilled in the art knows how to obtain this mean length by appropriately selecting the types and the ratio of monomers constituting the polydiol copolymer.

Unless specifically indicated, the preferences expressed below for the choice of the monomers M1, M2 and M3 are valid both when the monomers M1, M2 and M3 are present in the form of repeat units in the main chain and when they are present in the pendant chains.

Monomer M1

The first monomer M1 of the comb copolymer (A1) of the invention has the general formula (I):

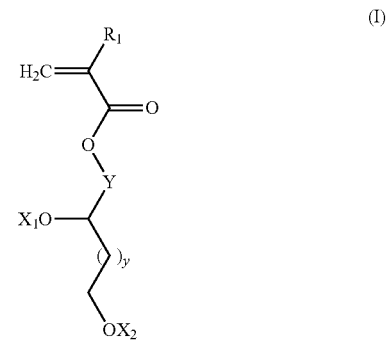

in which:

$R_1$ is chosen from the group formed by —H, —CH$_3$ and —CH$_2$—CH$_3$, preferably —H and —CH$_3$;

Y represents a divalent linking group chosen from $C_1$-$C_{20}$ alkyl chains, optionally comprising one or more ether —O— bridges; preferably, Y represents a group chosen from: a —(CH$_2$)$_x$— or —(CH$_2$)$_{x'}$—O—(CH$_2$)$_{x''}$— chain with x is an integer ranging from 1 to 18, preferably ranging from 2 to 18, more preferably from 3 to 8; more preferably still, x is equal to 4;

x' and x" integers ranging from 1 to 17, x'+x" is an integer ranging from 2 to 18, more preferably from 3 to 8; advantageously, x' is an integer ranging from 1 to 4, x"=1; more preferably still, x'=2, x"=1;

y is an integer equal to 0 or 1; preferably, y is equal to 0;

$X_1$ and $X_2$, which are identical or different, are chosen from the group formed by hydrogen, tetrahydropyranyl, methyloxymethyl, tert-butyl, benzyl, trimethylsilyl and t-butyldimethylsilyl;

or else $X_1$ and $X_2$ form, with the oxygen atoms, a bridge of following formula:

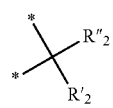

in which:

the stars (*) symbolize the bonds to the oxygen atoms,

R'$_2$ and R"$_2$, which are identical or different, are chosen from the group formed by hydrogen and a $C_1$-$C_{11}$ alkyl group;

or else $X_1$ and $X_2$ form, with the oxygen atoms, a boronic ester of following formula:

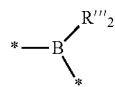

in which:
the stars (*) symbolize the bonds to the oxygen atoms,
$R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl, more preferably phenyl.

Preferably, when $R'_2$ and $R''_2$ are a $C_1$-$C_{11}$ alkyl group, the hydrocarbon chain is a linear chain. Preferably, the $C_1$-$C_1$ alkyl group is chosen from the group formed by methyl, ethyl, n-propyl, n-butyl, n-pentyl, n-hexyl, n-heptyl, n-octyl, n-nonyl, n-decyle and n-undecyl. More preferably, the $C_1$-$C_1$ alkyl group is methyl.

Preferably, when $R'''_2$ is a $C_2$-$C_{30}$ alkyl group, the hydrocarbon chain is a linear chain.

More preferably, the monomer M1 corresponds to the general formula (Ia):

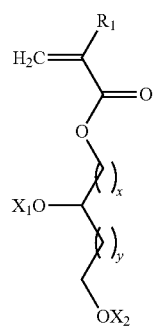

(Ia)

with x an integer ranging from 1 to 18, preferably ranging from 2 to 18, more preferably from 3 to 8; more preferably still, x is equal to 4.

Among the monomers of formula (I), the monomers corresponding to the formula (I-A) form part of the preferred ones:

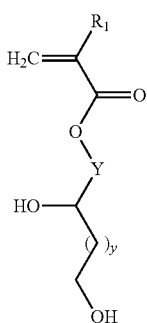

(I-A)

in which:
$R_1$ is chosen from the group formed by —H, —$CH_3$ and —$CH_2$—$CH_3$, preferably —H and —$CH_3$;

Y represents a divalent linking group chosen from: a —$(CH_2)_x$— or —$(CH_2)_{x'}$—O—$(CH_2)_{x''}$— chain
with
x is an integer ranging from 1 to 18, preferably ranging from 2 to 18, more preferably from 3 to 8; more preferably still, x is equal to 4;
x' and x" integers ranging from 1 to 17, x'+x" is an integer ranging from 2 to 18, more preferably from 3 to 8; advantageously, x' is an integer ranging from 1 to 4, x"=1; more preferably still, x'=2, x"=1;
y is an integer equal to 0 or 1; preferably, y is equal to 0.

Among the monomers of formula (I-A), those corresponding to the formula (Ia-A) form part of the preferred ones:

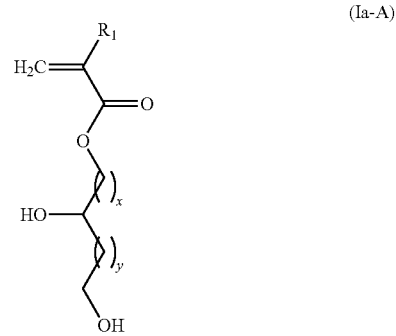

(Ia-A)

in which $R_1$, x and y have the same definitions and the same preferences as in the formula (I-A).

Among the monomers of formula (I), the monomers corresponding to the formula (I-B) form part of the preferred ones:

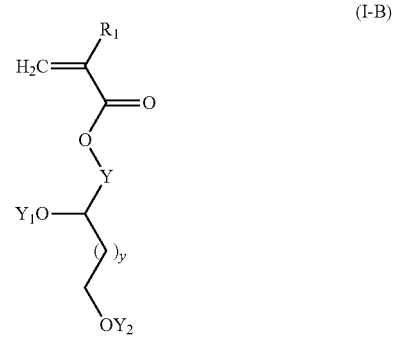

(I-B)

in which:
$R_1$ is chosen from the group formed by —H, —$CH_3$ and —$CH_2$—$CH_3$, preferably —H and —$CH_3$;
Y represents a divalent linking group chosen from: a —$(CH_2)_x$— or —$(CH_2)_{x'}$—O—$(CH_2)_{x''}$— chain
with
x is an integer ranging from 1 to 18, preferably ranging from 2 to 18, more preferably from 3 to 8; more preferably still, x is equal to 4;
x' and x" integers ranging from 1 to 17, x'+x" is an integer ranging from 2 to 18, more preferably from 3 to 8; advantageously, x' is an integer ranging from 1 to 4, x"=1; more preferably still, x'=2, x"=1;
y is an integer equal to 0 or 1; preferably, y is equal to 0;

$Y_1$ and $Y_2$, which are identical or different, are chosen from the group formed by tetrahydropyranyl, methyloxymethyl, tert-butyl, benzyl, trimethylsilyl and t-butyldimethylsilyl;

or else $Y_1$ and $Y_2$ form, with the oxygen atoms, a bridge of following formula:

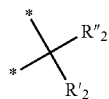

in which:
the stars (*) symbolize the bonds to the oxygen atoms,
$R'_2$ and $R''_2$, which are identical or different, are chosen from the group formed by hydrogen and a $C_1$-$C_{11}$ alkyl group;

or else $Y_1$ and $Y_2$ form, with the oxygen atoms, a boronic ester of following formula:

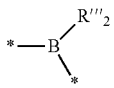

in which:
the stars (*) symbolize the bonds to the oxygen atoms,
$R'''_2$ is chosen from the group formed by a $C_6$-$C_{30}$ aryl, a $C_7$-$C_{30}$ aralkyl and a $C_2$-$C_{30}$ alkyl, preferably a $C_6$-$C_{18}$ aryl, more preferably phenyl.

Preferably, when $R'_2$ and $R''_2$ are a $C_1$-$C_{11}$ alkyl group, the hydrocarbon chain is a linear chain. Preferably, the $C_1$-$C_{11}$ alkyl group is chosen from the group formed by methyl, ethyl, n-propyl, n-butyl, n-pentyl, n-hexyl, n-heptyl, n-octyl, n-nonyl, n-decyle and n-undecyl. More preferably, the $C_1$-$C_{11}$ alkyl group is methyl.

Preferably, when $R'''_2$ is a $C_2$-$C_{30}$ alkyl group, the hydrocarbon chain is a linear chain.

Among the monomers of formula (I-B), those corresponding to the formula (Ia-B) form part of the preferred ones:

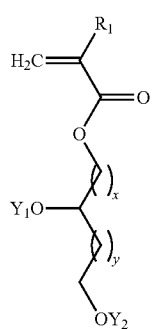

(Ia-B)

in which $R_1$, x, y, $Y_1$ and $Y_2$ have the same definitions and the same preferences as in the formula (I-B).

Examples of preferred diol monomers of formula (I) are illustrated below:

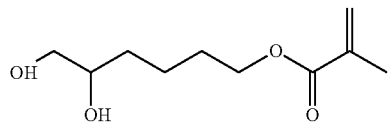

CAS 45755-07-1

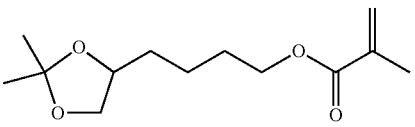

CAS 86218-23-7

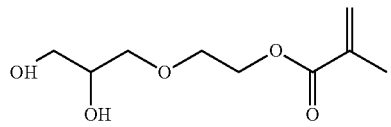

CAS 60503-49-3

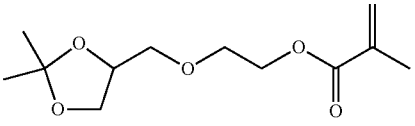

CAS 60503-48-2

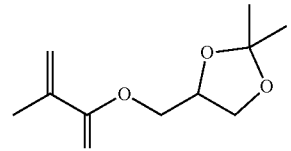 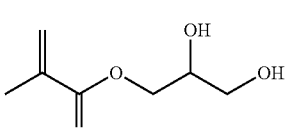

CAS 7098-80-8          CAS 5919-74-4

The synthesis of the comb polydiol copolymer (A1) can comprise the copolymerization of monomers (I-B) in the protected form with other comonomers, followed by the deprotection of the diol functional groups of the monomers (I-B).

Obtaining the Monomer M1

The monomer M1 of general formula (I) is obtained following the methods described in WO2015/110642, WO2015/110643 and WO2016113229.

Examples of the synthesis of the monomers M1 are illustrated in the experimental part of the applications WO2015/110642, WO2015/110643 and WO2016113229.

Monomer M2

The second monomer of the comb copolymer A1 of the invention has the general formula (II):

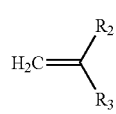

(II)

in which:
$R_2$ is chosen from the group formed by —H, —$CH_3$ and —$CH_2$—$CH_3$, preferably —H and —$CH_3$;
$R_3$ is chosen from the group formed by a $C_6$-$C_{18}$ aryl group and a $C_6$-$C_{18}$ aryl group substituted by a $R'_3$, —C(O)—O—$R'_3$, —O—$R'_3$, —S—$R'_3$ and —C(O)—N(H)—$R'_3$ group, with $R'_3$ a $C_1$-$C_{30}$ alkyl group.

Preferably, $R'_3$ is a $C_1$-$C_{30}$ alkyl group, the hydrocarbon chain of which is linear.

Among the monomers of formula (II), the monomers corresponding to the formula (II-A) form part of the preferred ones:

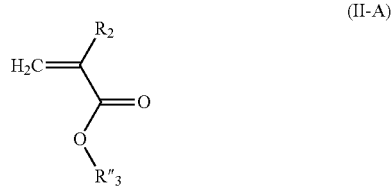

(II-A)

in which:
$R_2$ is chosen from the group formed by —H, —CH$_3$ and —CH$_2$—CH$_3$, preferably —H and —CH$_3$;
$R''_3$ is a $C_1$-$C_8$ alkyl group; preferably, the $R''_3$ is linear.

Preferably, the units corresponding to monomers (IIA) are present in the main chain of the copolymer A1.

Among the monomers of formula (II), the monomers corresponding to the formula (II-B) also form part of the preferred ones:

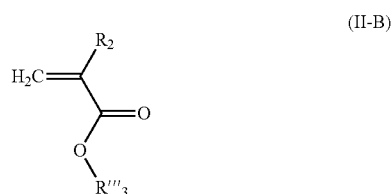

(II-B)

in which:
$R_2$ is chosen from the group formed by —H, —CH$_3$ and —CH$_2$—CH$_3$, preferably —H and —CH$_3$;
$R'''_3$ is a $C_9$-$C_{30}$ alkyl group; preferably, $R'''_3$ is linear.

Preferably, the units corresponding to monomers (IIB) are present in the oligomeric pendant chains of the copolymer A1.

Obtaining the Monomer M2

The monomers of formulae (II), (II-A) and (II-B) are well known to a person skilled in the art. They are sold by Sigma-Aldrich® and TCI®.

Monomer M3

The third monomer of the comb copolymer A1 of the invention has the general formula (X):

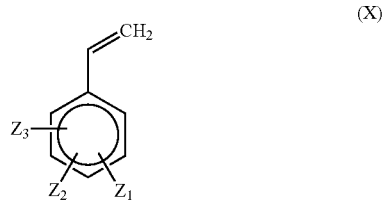

(X)

in which:
$Z_1$, $Z_2$ and $Z_3$, which are identical or different, represent groups chosen from a hydrogen atom, a $C_1$-$C_{12}$ alkyl or a —OZ' or —C(O)—O—Z' group, with Z' a $C_1$-$C_{12}$ alkyl.

"$C_1$-$C_{12}$ alkyl group" is understood to mean a saturated, linear or branched, hydrocarbon chain comprising from 1 to 12 carbon atoms. Preferably, the hydrocarbon chain is linear. Preferably, the hydrocarbon chain comprises from 1 to 6 carbon atoms.

Advantageously, $Z_1$, $Z_2$ and $Z_3$, which are identical or different, represent groups chosen from a hydrogen atom, a $C_1$-$C_6$ alkyl or a —OZ' or —C(O)—O—Z' group, with Z' a $C_1$-$C_6$ alkyl.

More preferably, $Z_1$, $Z_2$ and $Z_2$, which are identical or different, represent groups chosen from a hydrogen atom, a $C_1$-$C_4$ alkyl or a —OZ' or —C(O)—O—Z' group, with Z' a $C_1$-$C_4$ alkyl.

Mention may be made, among the preferred monomers M3, of: styrene, le para-(tert-butyl)styrene, para-methoxystyrene, para-acetoxystyrene or 2,4,6-trimethylstyrene.

According to a preferred embodiment, M3 is styrene.

Obtaining the Monomer M3

Some monomers of formula (X), such as styrene, le para-(tert-butyl)styrene, para-methoxystyrene, para-acetoxystyrene or 2,4,6-trimethylstyrene, are well known to a person skilled in the art. They are sold notably by Sigma-Aldrich®. Other monomers can be prepared from these commercial monomers by synthesis methods well known to a person skilled in the art.

Monomer M6

The monomer M6 has the general formula (IX):

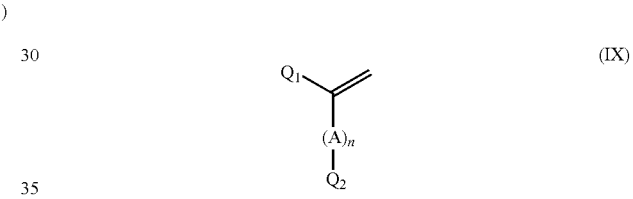

(IX)

in which:
$Q_1$ is chosen from the group formed by —H, —CH$_3$ and —CH$_2$—CH$_3$;
$Q_2$ is chosen from a -Q', —O-Q', —C(O)—O-Q', —O—C(O)-Q', —S-Q', —S—(CH$_2$)$_2$—C(O)—O-Q', —N(H)—C(O)-Q' and —C(O)—N(H)-Q' group, with Q' is a polyolefin,
n represents an integer chosen from 0 and 1,
A represents a divalent group chosen from: -A$_1$-, —O-(-A$_2$-O—)$_{n'}$-A$_1$-, —C(O)—O-(-A2-O—)$_{n'}$-A$_1$-, —O—C(O)-(-A$_2$-O—)$_{n'}$-A$_1$-, —S-(-A$_2$-O—)$_{n'}$-A$_1$-, —N(H)—C(O)-(-A$_2$-O—)$_{n'}$-A$_1$- and —C(O)—N(H)-(-A$_2$-O—)$_{n'}$-A$_1$- with:
$A_1$ is a divalent group chosen from a $C_1$-$C_{30}$ alkyl, a $C_6$-$C_{30}$ aryl or a $C_6$-$C_{30}$ aralkyl,
$A_2$ is a divalent group chosen from $C_2$-$C_4$ alkyls,
n' is an integer, n' represents 0 or 1.

For example, $A_2$ can be chosen from:

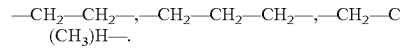

—CH$_2$—CH$_2$—,—CH$_2$—CH$_2$—CH$_2$—,—CH$_2$—C(CH$_3$)H—.

Preferably, $A_2$ is linear; more preferentially still, $A_2$ represents —CH$_2$—CH$_2$—.

Preferably, in the formula (IX), $Q_1$ represents —H.

Preferably, in the formula (IX), $Q_2$ is chosen from a -Q', —S—(CH$_2$)$_2$—C(O)—O-Q' or —C(O)—O-Q' group, with Q' a polyolefin.

According to a first alternative form, n=0 and $Q_1$=CH$_3$.

According to a second alternative form, which is preferred, n=1, n'=0, $Q_1$=H and $A_1$ is a divalent group chosen from a $C_1$-$C_{12}$ alkyl, a $C_6$-$C_{12}$ aryl or a $C_6$-$C_{12}$ aralkyl.

Preferentially, according to this second alternative form, n=1, $Q_1$=H and A=para-phenyl.

Polyolefin-based macromonomers, such as those of formula (IX), are known.

These repeat units comprise at least one Q' group derived from polyolefins.

Preferably, in the formula (IX), Q' represents a polyolefin or a hydrogenated polyolefin derived from alkenes or from alkanedienes, such as ethylene, propylene, n-butene, isobutene, butadiene, isoprene, cyclobutene, cycloheptene or cyclooctene.

The repeat units M6 derived from polyolefin-based macromonomers preferably comprise at least 90% by weight and more preferably at least 92.5% by weight and preferably at least 95% by weight of groups derived from alkenes and/or from alkadienes, with respect to the weight of the repeat units M6. The polyolefinic groups Q' can in particular also be present in the hydrogenated form.

Preferably, Q' represents a polyolefin chosen from hydrogenated polybutadienes with a number-average molecular weight from 400 to 50 000 g/mol, better still from 500 to 50 000 g/mol, more preferentially from 1000 to 10 000 g/mol, in particular from 1500 to 5000 g/mol and more preferentially still from 500 to 5000 g/mol, or also from 700 to 3000 g/mol.

Preferably, Q' represents a polyolefin comprising from 30 to 500 carbon atoms, preferentially from 50 to 400 carbon atoms, or also from 70 to 200 carbon atoms.

Obtaining the Repeat Units Corresponding to the Monomer M6

The repeat units corresponding to the monomer M6 can be obtained by any means known to a person skilled in the art.

The monomers M6 with $Q_1$ represents H and $Q_2$ represents —C(O)—O—Q', Q' being a polyolefin, can be obtained by reaction of acrylic acid with an alcohol Q'OH, of acryloyl chloride with an alcohol Q'OH or of acrylic anhydride with an alcohol Q'OH.

The monomers M6 with $Q_1$ represents $CH_3$ and $Q_2$ represents —C(O)—O—Q', Q' being a polyolefin, can be obtained by reaction of methacrylic anhydride with an alcohol Q'OH or of methacrylic acid with an alcohol Q'OH.

Alternatively, a repeat unit corresponding to the monomer M6 with $Q_1$ represents H, respectively $CH_3$, and $Q_2$ represents —C(O)—O—Q', Q' being a polyolefin or a hydrogenated polyolefin, can be introduced by functionalizing the backbone subsequent to the polymerization, for example by proceeding according to the following sequence:
copolymerization of acrylic acid, respectively methacrylic acid, with other monomers, such as, for example, the monomers M1 of formula (I) and optionally the monomers M2 of formula (II) and/or the monomers M3 of formula (X), in order to form the backbone of the comb copolymer A1,
esterification of at least a portion of the acid functional groups of the (meth)acrylic acid monomer by reaction with an alcohol Q'OH.

The polyolefinic alcohols which are used can be prepared notably by the following methods: synthesis of a hydroxyl-terminated polybutadiene, as taught by U.S. Pat. No. 5,159,123, followed by hydrogenation, for example by the method described in U.S. Pat. No. 7,148,292. Mention may be made, among the commercially available polyolefinic alcohols which can be used, of the polybutadiene Krasol HLBH 5000M sold by Cray Valley.

For the other alternative forms of $Q_2$, a person skilled in the art similarly uses conventional reactions for the functionalization of a polymerizable group before or after the polymerization of the backbone chain, or main chain, of the copolymer A1, notably by esterification or amidation reactions, by a thiol-ene coupling reaction, by a Michael addition between a thiol functional group and an acrylate, acrylamide ou maleimide functional group, and the like.

Pendant Chains Based on Oligomers M1/M2/M3:

According to a first embodiment, the copolymer A1 comprises side chains formed of oligomers comprising repeat units which correspond to monomers chosen from monomers M2 of general formula (II).

Preferably, according to this alternative form, the copolymer A1 comprises side chains formed of oligomers obtained, directly or indirectly, from monomers chosen from monomers M2 of general formula (II).

According to a second embodiment, the copolymer A1 comprises side chains formed of oligomers comprising repeat units which correspond to monomers chosen from:
monomers M1 of general formula (I),
monomers M2 of general formula (II).

Preferably, according to this alternative form, the copolymer A1 comprises side chains formed of oligomers obtained, directly or indirectly, from monomers chosen from:
monomers M1 of general formula (I),
monomers M2 of general formula (II).

According to a preferred embodiment, the copolymer A1 comprises side chains formed of oligomers comprising repeat units which correspond to monomers chosen from:
monomers M1 of general formula (I),
monomers M2 of general formula (II),
monomers M3 of general formula (X).

Preferably, according to this alternative form, the copolymer A1 comprises side chains formed of oligomers obtained, directly or indirectly, from monomers chosen from:
monomers M1 of general formula (I),
monomers M2 of general formula (II),
monomers M3 of general formula (X).

Obtaining the Pendant Chains Based on Oligomers M1/M2/M3:

The oligomeric pendant chains can be obtained directly by copolymerization:
of monomers participating in the composition of the main chain, with
at least one oligomer comprising a polymerizable functional group and repeat units corresponding to monomers M2 of general formula (II), and optionally monomers M1 of general formula (I) and/or monomers M3 of general formula (X).

According to a preferred embodiment, the pendant chains are obtained by copolymerization of monomers participating in the composition of the main chain with at least one "branching" monomer, followed by the grafting of the oligomer(s) to the branching functional group.

A branching monomer is a monomer comprising both a polymerizable functional group, for example a vinyl or acrylic double bond, and at least one reactive functional group which makes possible:
the grafting of a preoligomerized pendant chain, or
the initiation of a polymerization reaction.

Preferably, the branching monomer is chosen from radical polymerization initiators and transfer agents. The reactive functional group which makes it possible to initiate the polymerization of a pendant chain can, for example, consist of a brominated functional group, as described in detail in the experimental part. Other reactive functional groups well known to a person skilled in the art, for example a RAFT agent, an agent for radical polymerization in the presence of nitroxides (NMP), a thiol, a diazo, a peroxide, can also be used.

Preferably, the branching monomer M7 corresponds to the following formula (XII):

in which:

$G_1$ represents a group chosen from: —H, —$CH_3$, —$CH_2$—$CH_3$; M represents a hydrocarbon group comprising from 1 to 40 carbon atoms, optionally one or more functional groups chosen from —O—, —O—C(O)—, —O—C(O)—O—, —N(H)—, —N=, —N(H)—C(O)—, —N(H)—C(O)—N(H)—, —S—, —S—C(O)— or —S—C(S)—O—;

$G_2$ represents a group chosen from: C, Br, I, —C(O)—OH, -$G_3$ or —C(O)—O$G_3$, with $G_3$ a $C_1$-$C_{12}$ alkyl group.

Mention may be made, as example of branching monomers, of: acrylic acid, methacrylic acid, brominated and xanthate monomers;

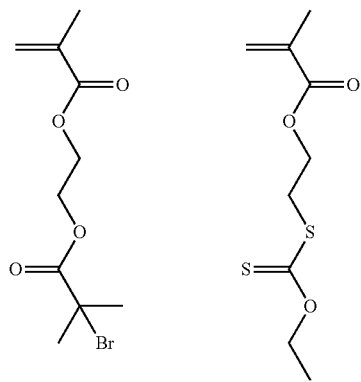

Other Monomers

In addition to the repeat units described in detail above, corresponding to the monomers M1, M2, M3 and M6, the comb copolymers A1 of the invention can comprise, in the main chain as in the pendant chains, other repeat units derived from other comonomers, their proportion being at most 20% by weight, preferably at most 10% by weight and more preferably at most 5% by weight, based on the total weight of the repeat units of which the copolymer A1 is composed.

Structuring of the Comb Polydiol Copolymers A1

The comb polydiol copolymers A1 comprise a main chain, or backbone chain, and at least one side chain or pendant chain.

Preferably, the comb polydiol copolymers A1 comprise more than two oligomeric side chains or pendant chains.

Preferably, the main chain comprises at least repeat units corresponding to the monomers M2 of formula (II).

Preferably, the main chain additionally comprises at least repeat units corresponding to the monomers M3 of formula (X).

The main chain advantageously comprises repeat units corresponding to the monomers M1 of formula (I).

The pendant chains can be chosen notably from the group consisting of:

$Q_2$ groups as defined above in the formula (IX) and which are chosen from -Q', —O-Q', —C(O)—O-Q', —O—C(O)-Q', —S-Q', —S—($CH_2$)$_2$—C(O)—O-Q', —N(H)—C(O)-Q' and —C(O)—N(H)-Q', with Q' is a polyolefin.

The $Q_2$ groups can optionally be attached to the main chain through a group A chosen from: -$A_1$, —O-($A_2$-O)$_{n'}$-$A_1$, —C(O)—O-($A_2$-O)$_{n'}$-$A_1$, —O—C(O)-($A_2$-O)$_{n'}$-$A_1$, —S-($A_2$-O)$_{n'}$-A1, —N(H)—C(O)-($A_2$-O)$_{n'}$-$A_1$ and —C(O)—N(H)-($A_2$-O)$_{n'}$-A1, with:

$A_1$ is a $C_1$-$C_{30}$ alkyl, a $C_6$-$C_{30}$ aryl or a $C_6$-$C_{30}$ aralkyl, $A_2$ is a $C_2$-$C_4$ alkyl, n' is an integer, n' represents 0 or 1, Oligomers composed of repeat units corresponding to monomers M2 and optionally monomers M1 and/or M3.

Thus, repeat units corresponding to monomers M1 and to monomers M2 and M3 can be encountered on the main chain and/or on the pendant chains.

Different possible distributions of the functionalities of these copolymers have been represented in FIGS. 6A, 6B and 6C.

In these figures, the diol functional groups (such as those carried by the monomers M1 of formula (I)) are denoted "F".

In FIG. 6A, the main chain (P) comprises diol functional groups, whereas the side chains (L) do not comprise them. For example, this figure can correspond to a copolymer based on monomers M1, M2 and optionally M3 and on olefinic macromonomers M6.

In FIG. 6B, the main chain (P) does not comprise diol functional groups, whereas some side chains (Lb) comprise them, but not the side chains (La). For example, this figure can correspond to a copolymer based on monomers M2 and M3 and on olefinic macromonomers M6 (La), side chains (Lb) which are oligomers of M1 and of M2 and optionally of M3 having been grafted to the main chain.

In FIG. 6C, the main chain (P) and some side chains (Lb) comprise diol functional groups. For example, this figure can correspond to a copolymer based on monomers M1 and M2 and optionally M3 and on olefinic macromonomers M6, which form the side chains (La), side chains which are oligomers of M1 and of M2 having been grafted to the main chain in order to form the side chains (Lb).

Preferred Polydiol Copolymers

In one embodiment, a preferred comb copolymer comprises at least:

repeat units corresponding to a first monomer M1 of general formula (I) as described above;

repeat units corresponding to a second monomer M2 of formula (II) as described above, in which $R_2$ is —$CH_3$ and $R_3$ is a —C(O)—O—$R'_3$ group with —$R'_3$ represents H or a $C_1$-$C_{30}$ alkyl;

repeat units corresponding to a third monomer M3 of general formula (X) as described above; notably styrene.

In another embodiment, a preferred comb copolymer comprises at least:

repeat units corresponding to a first monomer M1 of general formula (I) as described above;

repeat units corresponding to a second monomer M2 of formula (II-A) as described above, in which $R_2$ is —CH$_3$ and R$_3$ is a —C(O)—O—R'$_3$ group with —R'$_3$ represents H or a C$_1$-C$_8$ alkyl;

repeat units corresponding to a third monomer M3 of general formula (X) as described above; notably styrene, oligomeric side chains O1 comprising at least one polyolefin fragment, in particular side chains corresponding to a monomer M6 of general formula (IX), and more preferentially Q$_2$ is chosen from a -Q', —S—(CH$_2$)$_2$—C(O)—O-Q' or —C(O)—O-Q' group, with Q' a polyolefin.

In another embodiment, a preferred copolymer A1 comprises at least:

repeat units corresponding to a first monomer M1 of general formula (I) as described above;

repeat units corresponding to a second monomer M2 of formula (II-A) as described above;

repeat units corresponding to a third monomer M2 of formula (II-B) as described above, distinct from the first monomer of formula (II-A); and repeat units corresponding to a fourth monomer M3 of general formula (X) as described above, notably styrene.

According to this embodiment, a preferred copolymer A1 comprises repeat units corresponding at least to:

a first monomer M1 of general formula (I) as described above;

a second monomer M2 of formula (II-A) in which R$_2$ is —CH$_3$ and R''$_3$ is a C$_1$-C$_8$ alkyl group, preferably a linear C$_1$-C$_8$ alkyl;

a third monomer M2 of formula (II-B), in which R$_2$ is —CH$_3$ and R'''$_3$ is a C$_9$-C$_{30}$ alkyl group, preferably a linear C$_9$-C$_{30}$ alkyl, better still a linear C$_{12}$-C$_{24}$ alkyl; and fourth monomer M3 of general formula (X) as described above, notably styrene.

According to this embodiment, a preferred copolymer A1 results from the copolymerization of at least:

a first monomer M1 of general formula (I) as described above;

a second monomer M2 which is n-butyl methacrylate;

a third monomer M2 chosen from the group formed by palmityl methacrylate, stearyl methacrylate, arachidyl methacrylate and behenyl methacrylate, optionally, a fourth monomer M3 of general formula (X) as described above, notably styrene.

In one embodiment, a preferred comb copolymer comprises at least:

repeat units corresponding to a first monomer M1 of general formula (I) as described above;

repeat units corresponding to a second monomer M2 of formula (II) as described above, in which R$_2$ is —CH$_3$ and R$_3$ is a —C(O)—O—R'$_3$ group with —R'$_3$ represents H or a C$_1$-C$_{30}$ alkyl;

repeat units corresponding to a third monomer M6 of formula (IX) as described above, advantageously a monomer M6 of formula (IX) in which Q$_1$ represents H, n=0, Q$_2$ is —CO—O-Q' and Q' represents an olefin.

Preferably, the oligomeric side chains represent from 20% to 95% by weight, with respect to the total weight of the copolymer A1.

According to a first preferred alternative form, the oligomeric side chains 01 comprising a polyolefin fragment represent from 20% to 70% by weight, with respect to the total weight of the copolymer A1.

According to a second preferred alternative form, the oligomeric side chains 02, comprising at least repeat units corresponding to a monomer M2 of general formula (II) and optionally repeat units corresponding to a monomer M1 of general formula (I) and/or repeat units corresponding to a monomer M3 of general formula (X), represent from 30% to 95% by weight, with respect to the total weight of the copolymer A1.

Preferably, the nonoligomeric side chains represent from 5% to 80% by weight, with respect to the total weight of the copolymer A1.

Preferably, the repeat units of formula (X) represent from 2 mol % to 50 mol %, with respect to the total number of moles of the monomers of which the copolymer A1 is composed.

Preferably, the repeat units corresponding to monomers M2 represent from 10 mol % to 90 mol %, preferably from 30 mol % to 80 mol %, with respect to the total number of moles of the monomers of which the copolymer A1 is composed.

Preferably, the repeat units corresponding to monomers M1 represent from 1 mol % to 50 mol %, preferably from 5 mol % to 30 mol %, with respect to the total number of moles of the monomers of which the copolymer A1 is composed.

When the mol % of a repeat unit and/or of a monomer (such as M1, M2 or M3) is calculated with respect to the total number of moles of the monomers of which the copolymer A1 is composed and when the latter comprises one or more side chains comprising a fragment of polyolefin type, the polyolefinic fragment is incorporated by counting it as a single monomer (M6).

Method for Obtaining Polydiol Copolymers A1

A person skilled in the art is in a position to synthesize the comb polydiol copolymers A1 by resorting to his general knowledge.

The copolymerization can be initiated in bulk or in solution in an organic solvent by compounds which generate free radicals. For example, the copolymers of the invention are obtained by the known methods of radical copolymerization, notably controlled radical copolymerization, such as the method denoted Reversible Addition-Fragmentation Chain Transfer (RAFT) radical polymerization and the method denoted Atom Transfer Radical Polymerization (ARTP). Telomerization and conventional radical polymerization can also be employed to prepare the copolymers of the invention (Moad, G. and Solomon, D. H., The Chemistry of Radical Polymerization, 2nd Ed., Elsevier Ltd, 2006, p. 639; Matyaszewski, K. and Davis, T. P., Handbook of Radical Polymerization, Wiley-Interscience, Hoboken, 2002, p. 936).

According to a preferred embodiment, the copolymerization is carried out by conventional radical synthesis, without a RAFT chain-transfer agent.

According to a preferred embodiment, the copolymerization is carried out by radical synthesis in the presence of a chain-transfer agent of thiol or halogenated derivatives type.

The comb polydiol copolymer A1 is prepared according to a method which comprises at least one polymerization stage (a) in which the following are brought into contact:

i) monomers chosen from the monomers M1 of general formula (I), M2 of general formula (II), M3 of general formula (X), M7 of general formula (XII), M6 of general formula (IX), as are described above;

ii) at least one source of free radicals.

In one embodiment, the method can additionally comprise iii) at least one chain-transfer agent.

"A source of free radicals" is understood to mean a chemical compound which makes it possible to generate a chemical entity having one or more unpaired electrons on its outer shell. A person skilled in the art can use any known source of free radicals suited to polymerization methods, notably controlled radical polymerization methods. Preference is given, among sources of free radicals, by way of illustration, to benzoyl peroxide, tert-butyl peroxide, diazo compounds, such as azobisisobutyronitrile, peroxygenated compounds, such as persulfates or hydrogen peroxide, redox systems, such as the oxidation of $Fe^{2+}$, persulfates/sodium metabisulfite mixtures, or ascorbic acid/hydrogen peroxide or also compounds which can be split photochemically or by ionizing radiation, for example ultraviolet rays, or by $\beta$ or $\gamma$ radiation.

"Chain-transfer agent" is understood to mean a compound, the aim of which is to provide homogeneous growth of the macromolecular chains by reversible transfer reactions between growing entities, i.e. polymer chains terminated by a carbon-based radical, and dormant entities, i.e. polymer chains terminated by a transfer agent. This reversible transfer process makes it possible to control the molecular weights of copolymers thus prepared. Preferably, in the method of the invention, the chain-transfer agent comprises a thiocarbonylthio —S—C(=S)— group. Mention may be made, by way of illustration of chain-transfer agent, of dithioesters, trithiocarbonates, xanthates and dithiocarbamates. A preferred transfer agent is cumyl dithiobenzoate or 2-cyano-2-propyl benzodithioate.

"Chain-transfer agent" is also understood to mean a compound, the aim of which is to limit the growth of the macromolecular chains in the course of formation by addition of monomer molecules and to initiate new chains, which makes it possible to limit the final molecular weights, indeed even to control them. Such a type of transfer agent is used in telomerization. A preferred transfer agent is cysteamine.

In one embodiment, the method for the preparation of a comb polydiol copolymer comprises at least one polymerization stage (a) as defined above, in which the monomers M1 and M2 are chosen with $X_1$ and $X_2$ represent hydrogen.

In one embodiment, the method for the preparation of a comb polydiol copolymer comprises at least one polymerization stage (a) as defined above with at least one branching monomer M7 of general formula (XII), this polymerization stage being followed:

(b) optionally by a functionalization of the branching monomer M7

(c) by at least one oligomerization stage starting from the branching monomer M7 (or from the functional group derived from M7) or (d) by at least one stage of grafting an oligomer starting from the branching monomer M7 (or from the functional group derived from M7).

According to one embodiment (when a radical polymerization has been carried out with a RAFT chain-transfer agent), after the direct synthesis of the polymer containing the diol functional groups, the method comprises a stage of removal of the RAFT chain end by aminolysis, followed by Michael addition.

The preferences and definitions described for the general formulae (I), (Ia), (I-A), (I-B), (Ia-A), (Ia-B), (II-A), (II-B), (IX), (X) and (XII) also apply to the methods described above.

A person skilled in the art can use different synthesis schemes for the introduction of the side chains into the polydiol copolymers A1.

A synthesis by grafting is represented in FIG. 7.

In stage E1, monomers M1, M2 and optionally M3 are copolymerized with branching comonomers M7 in order to form a main chain (P).

The monomers M1 form repeat units comprising a diol functionality represented by the letter F.

The monomers M7 form repeat units comprising a branching functionality represented by the letter F' (several different functional groups F' can be present).

In stage E2, the main chain (P) is grafted, by means of a portion of the functional groups F', by side chains (La), such as, for example, polyolefin chains.

In stage E3, the main chain (P) is grafted, by means of the remainder of the functional groups F', by side chains (Lb), such as, for example, oligomeric chains resulting from the copolymerization of monomers M1 and M2 and optionally M3, these side chains carrying diol functional groups denoted F belonging to the monomers M1.

A synthesis by a method comprising both the polymerization with macromonomers and the grafting of oligomers, these two techniques making it possible to incorporate side chains, is represented in FIG. 8.

In stage E1, varied monomers are reacted: an olefinic macromonomer M6, a monomer M1 comprising a diol functional group F, a monomer M7 comprising a branching functionality F' and a methacrylate or acrylate monomer M2.

In stage E2, a comb copolymer having a main chain (P) carrying olefinic side chains (La), diol functional groups F, branching functional groups F' and acrylate functional groups (not represented) is obtained.

The branching functional groups F' of this copolymer are reacted with methacrylate or acrylate monomers M2 and diol monomers M1, which results, in stage E3, in a comb copolymer having a main chain (P) carrying:
  methacrylate or acrylate motifs (not represented)
  olefinic side chains (La),
  diol functional groups (F),
  side chains (Lb) comprising diol functional groups (F) and acrylate functional groups (not represented).

Properties of the Comb Polydiol Copolymers A1

The polydiol copolymers A1 are comb copolymers. "Comb copolymers" is understood to mean a copolymer having available a main chain (also known as backbone) and oligomeric side chains. The side chains are pendant on either side of the main chain. FIG. 2 diagrammatically represents a comb polymer.

The copolymers A1 exhibit a backbone resulting from polymerizable functional groups, notably a backbone of methacrylate functional groups and preferably of styrene functional groups, and a mixture of hydrocarbon side chains substituted or unsubstituted by diol functional groups, some of which are oligomers and others of which are pendant chains of monomers, which are nonoligomeric.

The copolymers A1 exhibit side chains which can be:
  chains resulting from the monomers of formulae (I), (II) and (X),
  polyolefins, notably corresponding to macromonomers M6 of formula (IX),
  oligomers resulting from the polymerization of monomers of formulae (I) and (II) and optionally (X).

The monomers of formulae (I), (II) and (X) exhibit polymerizable functional groups, the reactivity of which results in the formation of copolymers, the monomers having diol functional groups of which are distributed statistically or in gradient fashion or in a mixed distribution along the backbone of the copolymer, either on the main chain or on the side chains.

The comb polydiol copolymers A1 exhibit the advantage of being sensitive to external stimuli, such as the temperature, the pressure or the shear rate; this sensitivity is reflected by a change in properties. In response to a stimulus, the conformation in space of the copolymer chains is modified and the diol functional groups are rendered more or less accessible to association reactions, which can generate crosslinking, and also to exchange reactions. These association and exchange processes are reversible.

The comb copolymer A1 is a heat-sensitive copolymer, that is to say that it is sensitive to changes in temperature.

Advantageously, the side chains of the comb polydiol copolymer A1 of oligomers type corresponding to monomers M1, M2 and M3 respectively of formulae (I), (II) and (X) have a number-average molar mass ranging from 400 to 50 000, the number-average molar mass being obtained by size exclusion chromatography measurement using poly (methyl methacrylate) calibration.

A person skilled in the art knows how to obtain this mean length by appropriately selecting the types and the ratio of monomers constituting the polydiol copolymer A1.

The choice of this mean chain length makes it possible to obtain a polymer compatible with a hydrophobic medium, whatever the temperature at which the copolymer is dispersed, and capable of modulating the viscosity of the medium. "Hydrophobic medium" is understood to mean a medium which does not have an affinity or which has a very slight affinity for water, that is to say that it is not miscible in water or in an aqueous medium.

Advantageously, the polydiol copolymer A1 has a molar percentage of repeat units corresponding to monomers M1 of formula (I) in said copolymer ranging from 1% to 50%, preferably from 5% to 30%.

Advantageously, the polydiol copolymer A1 has a molar percentage of repeat units corresponding to monomers M2 of formula (II) in said copolymer ranging from 10% to 90%, preferably from 30% to 80%.

The molar percentage of repeat units in the copolymer results directly from the adjustment of the amounts of monomers employed for the synthesis of the copolymer.

Advantageously, the main chain of the comb polydiol copolymer A1 has a number-average degree of polymerization ranging from 40 to 2000, preferably from 40 to 1000. In a known way, the degree of polymerization is controlled by using a controlled radical polymerization technique, a technique of radical polymerization in the presence of a transfer agent, also known as telomerization under certain conditions, or by adjusting the amount of source of free radicals when the copolymers of the invention are prepared by conventional radical polymerization.

Advantageously, the comb polydiol copolymer A1 has a number-average molar mass ranging from 5000 to 400 000 g/mol, preferably from 10 000 to 200 000 g/mol, the number-average molar mass being obtained by size exclusion chromatography measurement using poly(methyl methacrylate) calibration.

The size exclusion chromatography measurement method is described in the work by Fontanille, M. and Gnanou, Y., Chimie et physico-chimie des polymères [Chemistry and Physical Chemistry of Polymers], 2nd Ed., Dunod, 2010, p. 546.

Advantageously, the comb polydiol copolymer A1 exhibits a degree of branching ranging from 0.1 mol % to 10 mol %, preferably from 0.5 mol % to 5 mol %.

The degree of branching is measured by proton NMR and/or by gel permeation chromatography (GPC) equipped with quadruple detection, namely a concentration detector, a light scattering detector, a UV/visible detector and a viscometer.

Compound A2

Boronic Diester Compound A2

In one embodiment, the compound A2 comprising two boronic ester functional groups has the general formula (III):

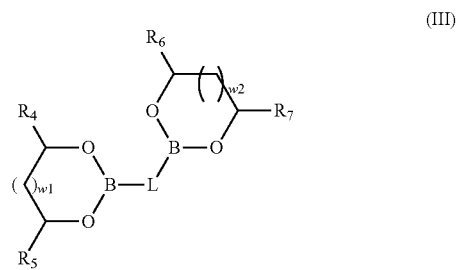

in which:
  $w_1$ and $w_2$, which are identical or different, are integers equal to 0 or 1,
  $R_4$, $R_5$, $R_6$ and Rr, which are identical or different, are chosen from the group formed by hydrogen and a hydrocarbon group comprising from 1 to 30 carbon atoms, preferably between 4 and 18 carbon atoms, more preferentially still between 6 and 14 carbon atoms, said hydrocarbon group being optionally substituted by one or more groups chosen from: a hydroxyl or an —OJ or —C(O)—O-J group, with J a hydrocarbon group comprising from 1 to 24 carbon atoms;
  L is a divalent linking group chosen from the group formed by a $C_6$-$C_{18}$ aryl, a $C_7$-$C_{24}$ aralkyl and a $C_2$-$C_{24}$ hydrocarbon chain, preferably a $C_6$-$C_{18}$ aryl.

"Hydrocarbon group comprising from 1 to 30 carbon atoms" is understood to mean a linear, branched or cyclic alkyl group comprising from 1 to 30 carbon atoms, a linear, branched or cyclic alkenyl group comprising from 2 to 30 carbon atoms, an aryl group comprising from 6 to 30 carbon atoms or an aralkyl group comprising from 7 to carbon atoms.

"Hydrocarbon group comprising from 1 to 24 carbon atoms" is understood to mean a linear or branched alkyl group comprising from 1 to 24 carbon atoms or a linear or branched alkenyl group comprising from 2 to 24 carbon atoms, an aryl group comprising from 6 to 24 carbon atoms or an aralkyl group comprising from 7 to 24 carbon atoms. Preferably, J comprises from 4 to 18 carbon atoms, preferably between 6 and 12 carbon atoms.

"$C_2$-$C_{24}$ hydrocarbon chain" is understood to mean a linear or branched alkyl or alkenyl group comprising from 2 to 24 carbon atoms. Preferably, the hydrocarbon chain L is a linear alkyl group. Preferably, the hydrocarbon chain L comprises from 6 to 16 carbon atoms.

In one embodiment of the invention, the compound A2 is a compound of general formula (III) above in which:
  $w_1$ and $w_2$, which are identical or different, are integers equal to 0 or 1;
  $R_4$ and $R_6$ are identical and are hydrogen atoms;
  $R_5$ and $R_7$ are identical and are a hydrocarbon group, preferably a linear alkyl, having from 1 to 24 carbon atoms, preferably from 4 to 18 carbon atoms, preferably from 6 to 16 carbon atoms;

L is a divalent linking group and is a $C_6$-$C_{18}$ aryl, preferably phenyl.

The boronic diester compound A2 of formula (III) as described above is obtained according to the method described in WO2015/110642 or in W2015/110643.

Poly(Boronic Ester) Copolymer Compound A2

In another embodiment, the compound A2 comprising at least two boronic ester functional groups is a poly(boronic ester) copolymer resulting from the copolymerization of at least one monomer M4 of formula (IV) as described below with at least one monomer M5 of formula (V) as described below.

In the continuation of the patent application, the expressions "boronic ester copolymer" or "poly(boronic ester) copolymer" are equivalent and denote the same copolymer.

Monomer M4 of Formula (IV)

The monomer M4 of the boronic ester copolymer compound A2 has the general formula (IV):

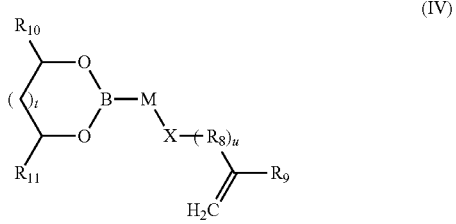

(IV)

in which:
- t is an integer equal to 0 or 1;
- u is an integer equal to 0 or 1;
- M and $R_8$ are divalent linking groups, which are identical or different, and are chosen from the group formed by a $C_6$-$C_{18}$ aryl, a $C_7$-$C_{24}$ aralkyl and a $C_1$-$C_{24}$ alkyl; preferably, M is a $C_6$-$C_{18}$ aryl and $R_8$ is a $C_7$-$C_{24}$ aralkyl;
- X is a functional group chosen from the group formed by —O—C(O)—, —C(O)—O—, —C(O)—N(H)—, —N(H)—C(O)—, —S—, —N(H)—, —N(R'$_4$)— and —O—, with R'$_4$ a hydrocarbon chain comprising from 1 to 15 carbon atoms;
- $R_9$ is chosen from the group formed by —H, —CH$_3$ and —CH$_2$—CH$_3$, preferably —H and —CH$_3$;
- $R_{10}$ and $R_{11}$, which are identical or different, are chosen from the group formed by hydrogen and a hydrocarbon group comprising from 1 to 30 carbon atoms, preferably between 4 and 18 carbon atoms, more preferentially still between 6 and 14 carbon atoms, said hydrocarbon group being optionally substituted by one or more groups chosen from: a hydroxyl or an —OJ or —C(O)—O-J group, with J a hydrocarbon group comprising from 1 to 24 carbon atoms.

"$C_1$-$C_{24}$ alkyl" is understood to mean a saturated, linear or branched, hydrocarbon chain comprising from 1 to 24 carbon atoms. Preferably, the hydrocarbon chain is linear. Preferably, the hydrocarbon chain comprises from 6 to 16 carbon atoms.

"Hydrocarbon chain comprising from 1 to 15 carbon atoms" is understood to mean a linear or branched alkyl or alkenyl group comprising from 1 to 15 carbon atoms. Preferably, the hydrocarbon chain is a linear alkyl group. Preferably, it comprises from 1 to 8 carbon atoms.

"Hydrocarbon group comprising from 1 to 30 carbon atoms" is understood to mean a linear, branched or cyclic alkyl group comprising from 1 to 30 carbon atoms, a linear, branched or cyclic alkenyl group comprising from 2 to 30 carbon atoms, an aryl group comprising from 6 to 30 carbon atoms or an aralkyl group comprising from 7 to carbon atoms.

"Hydrocarbon group comprising from 1 to 24 carbon atoms" is understood to mean a linear or branched alkyl group comprising from 1 to 24 carbon atoms or a linear or branched alkenyl group comprising from 2 to 24 carbon atoms, an aryl group comprising from 6 to 24 carbon atoms or an aralkyl group comprising from 7 to 24 carbon atoms. Preferably, J comprises from 4 to 18 carbon atoms, preferably between 6 and 12 carbon atoms.

In one embodiment, the monomer M4 has the general formula (IV) in which:
- t is an integer equal to 0 or 1;
- u is an integer equal to 0 or 1;
- M and $R_8$ are divalent linking groups and are different; M is a $C_6$-$C_{18}$ aryl, preferably phenyl, and $R_8$ is a $C_7$-$C_{24}$ aralkyl, preferably benzyl;
- X is a functional group chosen from the group formed by —O—C(O)—, —C(O)—O—, —C(O)—N(H)— and —O—, preferably —C(O)—O— or —O—C(O)—;
- $R_9$ is chosen from the group consisting of —H and —CH$_3$, preferably —H;
- $R_{10}$ and $R_{11}$ are different; one of the $R_{10}$ or $R_{11}$ groups is H and the other $R_{10}$ or $R_{11}$ group is a hydrocarbon chain, preferably a linear alkyl group, having from 1 to 24 carbon atoms, preferably between 4 and 18 carbon atoms, preferably between 6 and 12 carbon atoms.

In one embodiment, the monomer M4 is a styrenic monomer. This is the case when, in the formula (IV): u=1, $R_9$ is H and $R_8$ represents a $C_6$-$C_{18}$ aryl or a $C_7$-$C_{24}$ aralkyl and the double bond of the monomer M4 of formula (IV) is directly connected to the aryl group.

Synthesis of the Monomer M4 of Formula (IV)

The monomer M4 of formula (IV) as described above is obtained according to the method described in WO2015/110642 or in WO2015/110643.

Monomer M5 of General Formula (V):

The monomer M5 of the boronic ester copolymer compound A2 has the general formula (V):

(V)

in which:
- $R_{12}$ is chosen from the group formed by —H, —CH$_3$ and —CH$_2$—CH$_3$, preferably —H and —CH$_3$;
- $R_{13}$ is chosen from the group formed by a $C_6$-$C_{18}$ aryl and a $C_6$-$C_{18}$ aryl substituted by an R'$_{13}$, —C(O)—O—R'$_{13}$, —O—R'$_{13}$, —S—R'$_{13}$ and —C(O)—N(H)—R'$_{13}$ group, with R'$_{13}$ represents H or a $C_1$-$C_{25}$ alkyl group.

"$C_1$-$C_{25}$ alkyl group" is understood to mean a saturated, linear or branched, hydrocarbon chain comprising from 1 to 25 carbon atoms. Preferably, the hydrocarbon chain is linear.

"$C_6$-$C_{18}$ aryl group substituted by an R'$_{13}$ group" is understood to mean an aromatic hydrocarbon compound comprising from 6 to 18 carbon atoms, at least one carbon atom of the aromatic ring of which is substituted by a $C_1$-$C_{25}$ alkyl group as defined above.

Among the monomers of formula (V), the monomers corresponding to the formula (V-A) form part of the preferred ones:

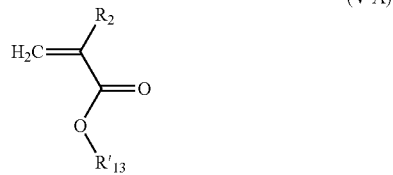

in which:
R$_2$ is chosen from the group formed by —H, —CH$_3$ and —CH$_2$—CH$_3$, preferably —H and —CH$_3$;
R'$_{13}$ represents H or a C$_1$-C$_{25}$ alkyl group, preferably H or a linear C$_1$-C$_{25}$ alkyl, more preferentially still H or a linear C$_3$-C$_{15}$ alkyl, more preferably still H or a linear C$_5$-C$_{15}$ alkyl.

According to another embodiment, the monomer M5 is a styrenic monomer. This is the case when, in the formula (V): R$_{12}$ represents H and R$_{13}$ is chosen from the group formed by a C$_6$-C$_{18}$ aryl and a C$_6$-C$_{18}$ aryl substituted by an R'$_{13}$ group with R'$_{13}$ represents H or a C$_1$-C$_{25}$ alkyl group and the double bond of the monomer M5 of formula (V) is directly connected to the aryl group.

Advantageously, according to this embodiment, the monomer M5 is styrene.

Obtaining the Monomer M5:
The monomers of formulae (V) and (V-A) are well known to a person skilled in the art. They are sold by Sigma-Aldrich® and TCI®.

Styrenic Monomer:
Advantageously, the copolymer A2 comprises at least one monomer having a styrenic nature, that is to say either styrene or a styrene derivative, such as a styrene substituted by another group on the aromatic ring.

The monomer M4 can be a styrenic monomer when, in the formula (IV): u=1, R$_9$ is H and R$_8$ represents a C$_6$-C$_{18}$ aryl or a C$_7$-C$_{24}$ aralkyl and the double bond of the monomer M4 of formula (IV) is directly connected to the aryl group.

The monomer M5 can also be a styrenic monomer when, in the formula (V): R$_{12}$ represents H and R$_{13}$ is chosen from the group formed by a C$_6$-C$_{18}$ aryl and a C$_6$-C$_{18}$ aryl substituted by an R'$_{13}$ group with R'$_{13}$ represents H or a C$_1$-C$_{25}$ alkyl group and the double bond of the monomer M5 of formula (V) is directly connected to the aryl group.

When neither M4 nor M5 exhibits a styrenic nature, advantageously, the copolymer A2 comprises at least one third monomer M3 of formula (X):

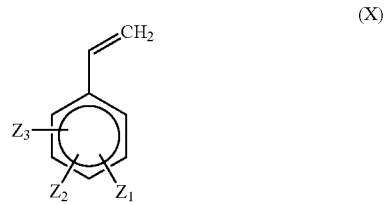

in which:
Z$_1$, Z$_2$ and Z$_3$, which are identical or different, represent groups chosen from a hydrogen atom, a C$_1$-C$_{12}$ alkyl or an —OZ' or —C(O)—O—Z' group, with Z' a C$_1$-C$_{12}$ alkyl.

M3 has been described in detail above for the preparation of the copolymer A1. The preferred monomers M3 and their preferred amounts are the same in A2 as in A1.

Advantageously, when A2 comprises a third monomer M3 of formula (X), this monomer M3 is styrene.

Olefinic Monomer:
According to one alternative form, the copolymer A2 comprises repeat units corresponding to at least one monomer having an olefinic nature, i.e. a monomer carrying an olefin chain and optionally one or more other functional groups. Notably, according to this alternative form, the copolymer A2 comprises repeat units corresponding to at least one monomer M6 of general formula (IX) as described above.

The preferred alternative forms of the monomer M6 of general formula (IX) of the copolymer A1 also apply to the copolymer A2.

Other Monomers
In addition to the repeat units described in detail above, the copolymers A2 can comprise other repeat units derived from other comonomers, their proportion being at most 20% by weight, preferably at most 10% by weight and more preferably at most 5% by weight, based on the total weight of the repeat units of which the copolymer A2 is composed.

Configuration of the Poly(Boronic Ester) Copolymer
The copolymer A2 can be a linear copolymer or a comb copolymer, that is to say a copolymer comprising oligomeric side chains.

In the case where the copolymer A2 is a comb copolymer, the oligomeric side chains can notably be chains corresponding to polyolefinic monomers M6 of general formula (IX) or to oligomers comprising structural units corresponding to monomers M2 of general formula (II) and optionally monomers M3 of general formula (X).

In one embodiment, a preferred comb copolymer comprises at least:
repeat units corresponding to a first monomer M4 of general formula (IV) as described above;
repeat units corresponding to a second monomer M5 of formula (V) as described above, preferably of formula (VA);
repeat units corresponding to a third monomer M6 of formula (IX) as described above, advantageously a monomer M6 of formula (IX) in which Q$_1$ represents H, n=0, Q$_2$ is —CO—O-Q' and Q' represents an olefin.

Synthesis of the Poly(Boronic Ester) Copolymer Compound A2
The copolymer A2 is obtained according to the method described in WO2015/110642 or in WO2015/110643.

In the case where the copolymer A2 is a comb copolymer, a person skilled in the art will apply the same derivatization or copolymerization techniques as described above for A1.

Properties of the Poly(Boronic Ester) Copolymer Compounds A2
Advantageously, the chain formed by the linking of the R$_{10}$, M, (R$_8$)$_u$, with u an integer equal to 0 or 1, and X groups of the monomer M4 of general formula (IV) exhibits a total number of carbon atoms ranging from 8 to 38, preferably ranging from 10 to 26.

Advantageously, the nonoligomeric side chains of the boronic ester copolymer A2 have a mean length of greater than 8 carbon atoms, preferably ranging from 11 to 16. This chain length makes it possible to disperse the boronic ester copolymer in a hydrophobic medium.

Advantageously, when the copolymer A2 comprises polyolefinic side chains, the nonoligomeric side chains of the copolymer A2 have a mean length ranging from 1 to 8 carbon atoms.

"Side chain mean length" is understood to mean the mean length of the side chains of each monomer constituting the copolymer. The side chains resulting from the styrenic monomer(s) are not taken into account in the calculation of The compound A2, notably the poly(boronic ester) copolymer, exhibits the property of being able to react in a hydrophobic medium, notably a nonpolar medium, with a compound carrying diol functional group(s) by a transesterification reaction. This transesterification reaction can be represented according to the following scheme 9:

Scheme 9

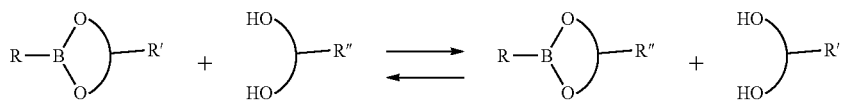

the mean lengths of the side chains. A person skilled in the art knows how to obtain this mean length by appropriately selecting the types and the ratio of monomers constituting the boronic ester copolymer.

Advantageously, the boronic ester copolymer A2 has a molar percentage of monomer of formula (IV) in said copolymer ranging from 0.25% to 30%, preferably from 1% to 25%, better still from 5% to 20%.

Advantageously, the boronic ester copolymer A2 has a molar percentage of monomer of formula (IV) in said copolymer ranging from 0.25% to 30%, preferably from 1% to 25%, and a molar percentage of monomer of formula (V) in said copolymer ranging from 70% to 99.75%, preferably from 75% to 99%.

Advantageously, the boronic ester copolymer A2 has a molar percentage of styrenic monomer(s) of formula (IV), (V) and/or (X) in said copolymer ranging from 2 mol % to 50 mol %, preferentially from 3 mol % to 40 mol % and more preferably from 5 mol % to 35 mol %.

"Molar percentage of styrenic monomer(s)" is understood to mean the sum of the contents of each of the styrenic monomers in the boronic ester copolymer A2, and the styrenic monomers can be:
- of formula (IV) when, in the formula (IV): u=1, $R_9$ is H and $R_8$ represents a $C_6$-$C_{18}$ aryl or a $C_7$-$C_{24}$ aralkyl and the double bond of the monomer M4 of formula (IV) is directly connected to the aryl group;
- of formula (V) when, in the formula (V): $R_{12}$ represents H and $R_{13}$ is chosen from the group formed by a $C_6$-$C_{18}$ aryl and a $C_6$-$C_{18}$ aryl substituted by an $R'_{13}$ group with $R'_{13}$ represents H or a $C_1$-$C_{25}$ alkyl group and the double bond of the monomer M5 of formula (V) is directly connected to the aryl group;
and/or
- of formula (X), as explained above.

Advantageously, the poly(boronic ester) copolymer has a number-average degree of polymerization ranging from 50 to 1500, preferably from 50 to 800.

Advantageously, the poly(boronic ester) copolymer has a polydispersity index (PI) ranging from 1.04 to 3.54, preferably ranging from 1.10 to 3.10. These values are obtained by size exclusion chromatography using tetrahydrofuran as eluent and poly(methyl methacrylate) calibration.

Advantageously, the poly(boronic ester) copolymer has a number-average molar mass ranging from 10 000 to 200 000 g/mol, preferably from 25 000 to 100 000 g/mol. These values are obtained by size exclusion chromatography using tetrahydrofuran as eluent and poly(methyl methacrylate) calibration.

Thus, during a transesterification reaction, a boronic ester with a different chemical structure from the starting boronic ester is formed by exchange of the hydrocarbon groups symbolized by

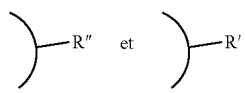

Exogenous Compound A4

According to one embodiment, the composition of additives results from the mixing of at least:
- a comb polydiol copolymer A1,
- a copolymer A2 comprising at least two boronic ester functional groups and which can associate with said polydiol copolymer A1 by at least one transesterification reaction,
- an exogenous polyol compound A4.

Advantageously, according to this embodiment of the invention, the molar percentage of exogenous compound A4 in the composition of additives, with respect to the boronic ester functional groups of the copolymer A2, ranges from 0.025% to 5000%, preferably from 0.1% to 1000%, more preferably still from 0.5% to 500%, more preferably still from 1% to 150%.

The exogenous compound A4 is chosen from polyols, notably 1,2-diols and 1,3-diols, as well as glycerol derivatives. Within the meaning of the present invention, "exogenous compound" is understood to mean a compound which is added to the composition of additives resulting from the mixing of at least one comb polydiol copolymer A1 and of at least one compound A2, notably the poly(boronic ester) copolymer.

The compound A4 is chosen from organic compounds comprising at least one diol group and which are compatible with use in a lubricating composition. Preferably, the compound A4 is chosen from hydrocarbon compounds comprising from 2 to 30 carbon atoms.

Preferably, this exogenous compound A4 is chosen from lubricating additives, such as, for example, the compounds known for their function of friction modifier, of thickener, of dispersant or of detergent in lubricating compositions.

Notably, the exogenous compound A4 can be chosen from 1,2-diols and 1,3-diols, as well as glycerol derivatives.

According to a preferred embodiment, the exogenous compound A4 can have the general formula (VI):

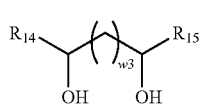

(VI)

in which:

w3 is an integer equal to 0 or 1, $R_{14}$ and $R_{15}$, which are identical or different, are chosen from the group formed by hydrogen and a hydrocarbon chain having from 1 to 24 carbon atoms, preferably between 4 and 18 carbon atoms, preferably between 6 and 12 carbon atoms.

"Hydrocarbon chain comprising from 1 to 24 carbon atoms" is understood to mean a linear or branched alkyl or alkenyl group comprising from 1 to 24 carbon atoms. Preferably, the hydrocarbon chain is a linear alkyl group. Preferably, it comprises from 4 to 18 carbon atoms, preferably between 6 and 12 carbon atoms.

In one embodiment, the exogenous compound A4 has the general formula (VI) in which:

$w_3$ is an integer equal to 0 or 1;

$R_{14}$ and $R_{15}$, which are identical or different, are chosen from the group formed by -T, —$CH_2$—O-T and —$CH_2$—O—C(O)-T, T being chosen from the group formed by hydrogen and a hydrocarbon chain, preferably a linear alkyl chain, having from 1 to 24 carbon atoms, preferably between 4 and 18 carbon atoms, preferably between 6 and 12 carbon atoms.

In one embodiment, the exogenous compound A4 has the general formula (VI) in which:

$w_3$ is an integer equal to 0 or 1;

$R_{14}$ and $R_{15}$ are different; one of the $R_{14}$ or $R_{15}$ groups is H and the other $R_{14}$ or $R_{15}$ group is a hydrocarbon chain, preferably a linear alkyl group, having from 1 to 24 carbon atoms, preferably between 4 and 18 carbon atoms, preferably between 6 and 12 carbon atoms.

In another preferred embodiment, the exogenous compound is chosen from sugars and sugar derivatives.

A person skilled in the art is capable, by resorting to his general knowledge, of choosing, among sugars and sugar derivatives, which ones are compatible with a lubricating oil.

The compounds of formula (VI) are commercially available from the following suppliers: Sigma-Aldrich®, Alfa Aesar® and TCI®.

Exogenous Compound A5

According to one embodiment, the composition of additives results from the mixing of at least:

a comb polydiol copolymer A1, a copolymer A2 comprising at least two boronic ester functional groups and which can associate with said comb polydiol copolymer A1 by at least one transesterification reaction, an exogenous compound A5 chosen from those corresponding to the formula (XI):

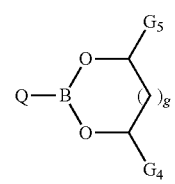

(XI)

in which:

Q represents a group chosen from a hydrocarbon group comprising from 1 to carbon atoms, optionally substituted by one or more groups chosen from: a hydroxyl or an —OJ or —C(O)—O-J group, with J a hydrocarbon group comprising from 1 to 24 carbon atoms, $G_4$ and $G_5$, which are identical or different, represent groups chosen from a hydrogen atom, a hydrocarbon chain comprising from 1 to 24 carbon atoms, a hydroxyl or an —OJ or —C(O)—O-J group, with J a hydrocarbon group comprising from 1 to 24 carbon atoms, g represents 0 or 1.

Advantageously, the exogenous compound A5 corresponds to the formula (XIIA):

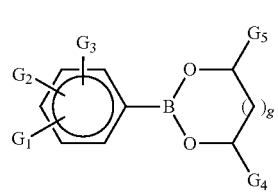

(XIIA)

in which:

$G_1$, $G_2$, $G_3$, $G_4$ and $G_5$, which are identical or different, represent groups chosen from a hydrogen atom, a hydrocarbon chain comprising from 1 to 24 carbon atoms, a hydroxyl or an —OJ or —C(O)—O-J group, with J a hydrocarbon group comprising from 1 to 24 carbon atoms, g represents 0 or 1.

According to a preferred embodiment, the molar percentage of exogenous compound A5 with respect to the diol functional groups of the comb copolymer A1 ranges from 0.025% to 5000%, preferably ranges from 0.1% to 1000%, more preferably still from 0.5% to 500%, more preferably still from 1% to 150%.

According to a preferred embodiment, the exogenous compound A5 is chosen from those corresponding to the formula (XII B):

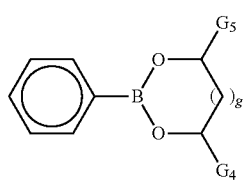

(XIIB)

According to an again preferred embodiment, the exogenous compound A5 is chosen from those corresponding to the formula (XII B) with g=O, $G_4$=H and $G_5$ represents a $C_1$-$C_{24}$ alkyl.

By transesterification reaction, the exogenous compound A5 releases in situ the diol fragment A6 of formula (XIII):

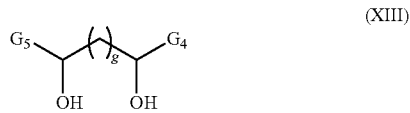

(XIII)

Characteristics of the Novel Compositions of Additives of the Invention

The compositions of additives of the invention exhibit very varied rheological properties as a function of the temperature and according to the proportion of the compounds A1, A2 and optionally A4 and/or A5 used.

The comb polydiol copolymers A1 and the compounds A2 as defined above exhibit the advantage of being associative and of exchanging chemical bonds in a thermoreversible way, notably in a hydrophobic medium, notably a nonpolar hydrophobic medium.

Under certain conditions, the comb polydiol copolymers A1 and the compounds A2 as defined above can be crosslinked.

The comb polydiol copolymers A1 and the compounds A2 also exhibit the advantage of being exchangeable.

"Associative" is understood to mean that covalent chemical bonds of the boronic ester type are established between the comb polydiol copolymers A1 and the compounds A2 comprising at least two boronic ester functional groups, notably with the poly(boronic ester) copolymer. Depending on the functionality of the comb polydiols A1 and of the compounds A2 and depending on the composition of the mixtures, the formation of covalent bonds between the comb polydiols A1 and the compounds A2 may or may not lead to the formation of a three-dimensional polymeric network.

"Chemical bond" is understood to mean a covalent chemical bond of boronic ester type.

"Exchangeable" is understood to mean that the compounds are capable of exchanging chemical bonds with one another without the total number and the nature of the chemical functional groups being modified. The exchange (transesterification) chemical reaction is illustrated in the following reaction scheme 10:

with:
R a chemical group of the compound A2,
the hatched circle symbolizing the remainder of the chemical structure of the compound A2,
the squared rectangle symbolizing the remained of the chemical structure of the polydiol comb polymer A1.

The boronic ester bonds of the compounds A2, optionally the boronic ester bonds formed by transesterification reaction between the boronic esters of the compounds A2 and the exogenous compounds A4 and/or A5, as well as the boronic ester bonds formed by association of the comb polydiol copolymers A1 and compounds A2, can be exchanged with the diol functional groups carried by the compounds A3 released in situ and optionally with diol functional groups carried by the exogenous compounds A4 and/or A5 to form new boronic ester and new diol functional groups without the total number of boronic ester functional groups and of diol functional groups being affected. This other process of exchange of chemical bonds is carried out by metathesis reaction, via successive exchanges of the boronic ester functional groups in the presence of diols. Another process of exchange of chemical bonds is illustrated in FIG. 3, in which it can be observed that the polydiol copolymer A1-1, which was associated with the polymer A2-1, has exchanged two boronic ester bonds with the boronic ester copolymer A2-2. The polydiol copolymer A1-2, which was associated with the polymer A2-2, has exchanged two boronic ester bonds with the boronic ester copolymer A2-1; the total number of boronic ester bonds in the composition being unchanged and equal to 4. The copolymer A1-1 is then associated with the polymer A2-2. The copolymer A1-2 is then with the polymer A2-1. The copolymer A2-1 has been exchanged with the polymer A2-2.

"Crosslinked" is understood to mean a copolymer in the form of a network obtained by the establishment of bridges between the macromolecular chains of the copolymer. These chains connected to one another are mostly distributed in the three dimensions of space. A crosslinked copolymer forms a three-dimensional network. In practice, the formation of a copolymer network is ensured by a solubility test. It can be ascertained that a copolymer network has been formed by placing the copolymer network in a solvent known to dissolve noncrosslinked copolymers of the same chemical nature. If the copolymer swells instead of dissolving, a person skilled in the art knows that a network has been formed. FIG. 4 illustrates this solubility test.

Scheme 10

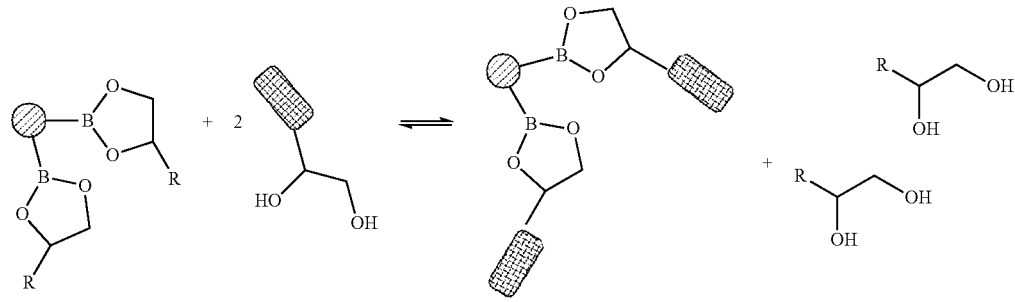

"Crosslinkable" is understood to mean a copolymer capable of being crosslinked.

"Reversibly crosslinked" is understood to mean a crosslinked copolymer, the bridges of which are formed by a reversible chemical reaction. The reversible chemical reaction can be displaced in one direction or in another, causing a change in structure of the polymer network. The copolymer can change from an initial noncrosslinked state to a crosslinked state (three-dimensional network of copolymers) and from a crosslinked state to an initial noncrosslinked state. In the context of the present invention, the bridges which are formed between the chains of copolymers are labile. These bridges can be formed or exchanged by virtue of a chemical reaction which is reversible. In the context of the present invention, the reversible chemical reaction is a transesterification reaction between diol functional groups of a copolymer (copolymer A1) and boronic ester functional groups of a crosslinking agent (compound A2). The bridges formed are bonds of boronic ester type. These boronic ester bonds are covalent and labile due to the reversibility of the transesterification reaction.

"Crosslinked in a thermoreversible way" is understood to mean a copolymer crosslinked by virtue of a reversible reaction, the displacement in one direction or in the other of which is controlled by the temperature. The thermoreversible crosslinking mechanism of the composition of the invention is presented diagrammatically in FIG. 5. At low temperature, the polydiol copolymer A1 (symbolized by the copolymer carrying functional groups A in FIG. 5) is not or only slightly crosslinked by the boronic ester compounds A2 (symbolized by the compound carrying functional groups B in FIG. 5). When the temperature increases, the diol functional groups of the copolymer A1 react with the boronic ester functional groups of the compound A2 by a transesterification reaction. The polydiol copolymers A1 and the compounds A2 comprising at least two boronic ester functional groups then bind together and can be exchanged. Depending on the functionality of the polydiols A1 and of the compounds A2 and depending on the composition of the mixtures, a gel can be formed in the medium, notably when the medium is nonpolar. When the temperature decreases again, the boronic ester bonds between the polydiol copolymers A1 and the compounds A2 split and, if appropriate, the composition loses its gelled nature.

The amount of boronic ester bonds which can be established between the comb polydiol copolymers A1 and the compounds A2 is adjusted by a person skilled in the art by means of an appropriate selection of the polydiol copolymer A1, of the compound A2 and of the composition of the mixture.

In addition, a person skilled in the art knows how to select the structure of the compound A2 as a function of the structure of the copolymer A1. Preferably, when in the copolymer A1 comprising at least one monomer M1 in which y=1, then the compound A2 of general formula (III) or the copolymer A2 comprising at least one monomer M4 of formula (IV) will preferably be chosen with $w_1=1$, $w_2=1$ and t=1, respectively.

By controlling the degree of association of the polydiol copolymer A1 and of the compound A2, notably of the static poly(boronic ester) copolymer, the viscosity and the rheological behavior of this composition are modulated. When it is present, the exogenous compound A4 and/or A5 makes it possible to modulate the viscosity of this composition as a function of the temperature and according to the desired use.

In a preferred embodiment of the invention, the exogenous compound A4 is of the same chemical nature as the diol compound A3 released in situ by the transesterification reaction between the comb polydiol copolymer A1 and the compound A2, notably the poly(boronic ester) copolymer. According to this embodiment, the total amount of free diols present in said composition is strictly greater than the amount of diol compounds released in situ. "Free diols" is understood to mean the diol functional groups which are capable of being able to form a chemical bond of boronic ester type by a transesterification reaction. Within the meaning of the present patent application, "total amount of free diols" is understood to mean the total number of diol functional groups capable of being able to form a chemical bond of boronic ester type by transesterification.

According to this embodiment, the total amount of free diols is always equal to the sum of the number of moles of exogenous polyol compounds A4 and of the number (expressed in mol) of diol functional groups of the polydiol copolymer A1. In other words, if, in the composition of additives, there are:

i mol of exogenous polyol compounds A4 and
j mol of polydiol copolymers A1,
the total amount of free diols will be at all times (thus whatever the degree of association between the polydiol copolymer A1 and the compound A2, notably the poly(boronic ester) copolymer A2)=i+j*the mean number of diols per comb polymer chain A1 (unit: mol).

The amount of diols released in situ in the context of the transesterification reactions between A1 and A2 is equal to the number of boronic ester functional groups connecting the copolymers A1 and A2.

A person skilled in the art knows how to select the chemical structure and the amount of exogenous compounds A4 and/or A5 which he adds to the composition of additives as a function of the molar percentage of boronic ester functional group of the compound A2, notably as a function of the poly(boronic ester) copolymer, in order to modulate the rheological behavior of the composition.

Advantageously, the content of copolymer A1 in the composition ranges from 0.1% to 50.0% by weight, with respect to the total weight of the composition, preferably ranges from 0.25% to 40% by weight, with respect to the total weight of the final composition, more preferably from 1% to 30% by weight, with respect to the total weight of the final composition.

Advantageously, the content of compound A2 in the composition ranges from 0.1% to 50.0% by weight, with respect to the total weight of the composition, preferably ranges from 0.25% to 40% by weight, with respect to the total weight of the final composition, more preferably from 0.5% to 30% by weight, with respect to the total weight of the final composition.

In one embodiment, the content of copolymer A1 in the composition ranges from 0.5% to 50.0% by weight, with respect to the total weight of the composition, and the content of compound A2, notably of boronic ester copolymer, in the composition ranges from 0.5% to 50.0% by weight, with respect to the total weight of the composition.

Preferentially, the ratio by weight of the polydiol compound A1 to the compound A2 (A1/A2 ratio) in the composition ranges from 0.005 to 200, preferably from 0.05 to 20, more preferably still from 0.1 to 10.

In one embodiment, the composition of the invention is provided in the form of a mother composition. "Mother composition" is understood to mean a composition of which a person skilled in the art can make daughter solutions by withdrawing a certain amount of mother solution supplemented by the supply of a necessary amount of diluent (solvent or other) in order to obtain a desired concentration. A daughter composition is thus obtained by dilution of a mother composition.

A hydrophobic medium can be a solvent, a mineral oil, a natural oil or a synthetic oil.

In one embodiment, the composition of the invention can additionally comprise at least one additive chosen from the group formed by thermoplastics, elastomers, thermoplastic elastomers, thermosetting polymers, pigments, dyes, fillers, plasticizers, fibers, antioxidants, lubricant additives, compatibilizers, antifoaming agents, dispersant additives, adhesion promoters and stabilizers.

Method for the Preparation of the Novel Compositions of Additives of the Invention The novel compositions of additives of the invention are prepared by means well known to a person skilled in the art. For example, it is sufficient for a person skilled in the art notably:

- to withdraw a desired amount of a solution comprising the comb polydiol copolymer A1 as defined above;
- to withdraw a desired amount of a solution comprising the compound A2 as defined above; notably a desired amount of a solution comprising the poly(boronic ester) copolymer as defined above; and
- optionally to withdraw a desired amount of a solution comprising the exogenous compound A4 and/or A5 as defined above;
- to mix the solutions withdrawn, either simultaneously or sequentially, in order to obtain the composition of the invention.

The order of addition of the compounds has no influence in the implementation of the method for the preparation of the composition of additives.

A person skilled in the art also knows how to adjust the various parameters of the composition of the invention in order to obtain either a composition in which the comb polydiol copolymer A1 and the compound A2, notably the boronic ester copolymer, are associated or a composition in which the comb polydiol copolymer A1 and the compound A2, notably the boronic ester copolymer, are crosslinked and in order to modulate the degree of association or the degree of crosslinking for a given temperature of use. For example, a person skilled in the art knows how to adjust notably, and in a nonexhaustive manner:

- the molar percentage of monomer M1 carrying diol functional groups in the comb polydiol copolymer A1;
- the content of styrenic monomer M3 in the comb polydiol copolymer A1;
- the molar percentage of olefinic macromonomer M6 in the comb polydiol copolymer A1;
- the molar percentage of oligomeric pendant chains comprising repeat units corresponding to monomers M2 and optionally M1 and M3 in the comb polydiol copolymer A1;
- the molar percentage of monomer M4 carrying boronic ester functional groups in the boronic ester copolymer A2;
- the mean length of the oligomeric side chains of the polydiol copolymer A1;
- the mean length of the nonoligomeric side chains of the polydiol copolymer A1;
- the mean length of the side chains of the boronic ester copolymer A2;
- the length of the monomer M4 of the boronic ester copolymer A2;
- the content of styrenic monomer M4 of formula (IV) or M5 of formula (V) or M3 of formula (X) in the boronic ester copolymer A2;
- the length of the boronic diester compound A2;
- the number-average degree of polymerization of the main chains of the polydiol copolymers A1 and of the boronic ester copolymers A2;
- the number-average degree of polymerization of the side chains of the polydiol copolymers A1 and optionally of the boronic ester copolymers A2;
- the percentage by weight of the polydiol copolymer A1;
- the percentage by weight of the boronic diester compound A2;
- the percentage by weight of the boronic ester copolymer A2;

and, if appropriate:

- the molar amount of the exogenous compound A4 with respect to the boronic ester functional groups of the compound A2, notably of the poly(boronic ester) copolymer;
- the chemical nature of the exogenous compound A4;
- the molar percentage of the exogenous compound A4;
- the molar amount of the exogenous compound A5 with respect to the diol functional groups of the diol copolymer A1;
- the chemical nature of the exogenous compound A5;
- the molar percentage of the exogenous compound A5.

Use of the Novel Compositions of the Invention

The compositions of the invention can be used in all the media, the viscosities of which vary as a function of the temperature. The compositions of the invention make it possible to thicken a fluid and to modulate the viscosity as a function of the temperature of use. The composition of additives according to the invention can be used in fields as varied as improved oil recovery, the paper industry, paints, food additives, or cosmetic or pharmaceutical formulation.

Lubricating Composition According to the Invention

Another subject matter of the present invention relates to a lubricating composition resulting from the mixing of at least:

- a lubricating oil,
- a comb polydiol copolymer A1 as defined above,
- a compound A2, notably a copolymer A2, as defined above, comprising at least two boronic ester functional groups and being able to associate with said comb polydiol copolymer A1 by at least one transesterification reaction,
- optionally an exogenous compound A4, and notably as defined above,
- optionally an exogenous boronic compound A5 as defined above.

The preferences and definitions described for the general formulae (I), (I-A), (I-B), (Ia), (Ia-A), (Ia-B), (II-A), (II-B), (IX), (X) and (XII) also apply to the comb polydiol copolymer A1 used in the lubricating compositions of the invention.

The preferences and definitions described for the general formulae (III), (IV), (V), (IX) and (X) also apply to the boronic ester compound A2 used in the lubricating compositions of the invention.

The lubricating compositions according to the invention have an inverted behavior with regard to a modification of the temperature, in comparison with the behavior of the base oil and of the rheological additives of polymer type of the prior art, and exhibit the advantage that this rheological behavior can be modulated as a function of the temperature of use. Unlike the base oil, which thins when the temperature increases, the compositions of the present invention exhibit the advantage of thickening when the temperature increases. The formation of reversible covalent bonds makes it possible to (reversibly) increase the molar mass of the polymers and thus limits the drop in the viscosity of the base oil at high temperatures. The supplementary addition of diol compounds makes it possible to control the rate of formation of these reversible bonds. Advantageously, the viscosity of the lubricating composition is thus controlled and depends less on the temperature fluctuations. In addition, for a given temperature of use, it is possible to modulate the viscosity of the lubricating composition and its rheological behavior by adjusting the amount of diol compounds added to the lubricating composition. Finally, the lubricating compositions of the invention have an improved thermal stability, an improved oxidation stability, an improved viscosity index, an improved resistance to cycling and a better reproducibility of performance qualities over time.

Lubricating Oil

"Oil" is understood to mean a fatty substance which is liquid at ambient temperature (25° C.) and atmospheric pressure (760 mm Hg, i.e. $10^5$ Pa).

"Lubricating oil" is understood to mean an oil which eases the friction between two moving parts for the purpose of facilitating the operation of these parts. Lubricating oils can be of natural, mineral or synthetic origin.

The lubricating oils of natural origin can be oils of vegetable or animal origin, preferably oils of vegetable origin, such as rapeseed oil, sunflower oil, palm oil, coconut oil, and the like.

The lubricating oils of mineral origin are of petroleum origin and are extracted from petroleum cuts originating from the atmospheric and vacuum distillation of crude oil. The distillation can be followed by refining operations, such as solvent extraction, deasphalting, solvent dewaxing, hydrotreating, hydrocracking, hydroisomerization, hydrofinishing, and the like. By way of illustration, mention may be made of paraffinic mineral base oils, such as Bright Stock Solvent (BSS) oil, naphthenic mineral base oils, aromatic mineral oils, hydrorefined mineral bases, the viscosity index of which is approximately 100, hydrocracked mineral bases, the viscosity index of which is between 120 and 130, or hydroisomerized mineral bases, the viscosity index of which is between 140 and 150.

The lubricating oils of synthetic origin (or synthetic bases) originate, as their name indicates, from chemical synthesis, such as the addition of a product to itself or polymerization, or the addition of a product to another, such as esterification, alkylation, fluorination, and the like, of components originating from petrochemicals, carbochemistry, and inorganic chemistry, such as: olefins, aromatics, alcohols, acids, halogenated compounds, phosphorus compounds, silicon compounds, and the like. By way of illustration, mention may be made of:
- synthetic oils based on synthetic hydrocarbons, such as poly(α-olefins) (PAO), poly(internal olefins) (PIO), polybutenes and polyisobutenes (PIB), -alkylbenzenes or alkylated polyphenyls;
- synthetic oils based on esters, such as esters of diacids or esters of neopolyols;
- synthetic oils based on polyglycols, such as monoalkylene glycols, polyalkylene glycols and polyalkylene glycol monoethers;
- synthetic oils based on phosphate esters;
- synthetic oils based on silicon derivatives, such as silicone oils or polysiloxanes.

The lubricating oils which can be used in the composition of the invention can be chosen from any oil of Groups I to V specified in the guidelines of the API (Base Oil Interchangeability Guidelines of the American Petroleum Institute (API)) (or their equivalents according to the ATIEL (Technical Association of the European Lubricants Industry) classification, as summarized below:

| | Content of saturated compounds* | Sulfur content** | Viscosity index (VI)*** |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | (PAO) Poly(α-olefins) | | |
| Group V | Esters and other bases not included in bases Groups I to IV | | |

*measured according to the standard ASTM D2007
**measured according to the standards ASTM D2622, ASTM D4294, ASTM D4927 and ASTM D3120
***measured according to the standard ASTM D2270

The compositions of the invention can comprise one or more lubricating oils. The lubricating oil or the lubricating oil mixture is the predominant ingredient in the lubricating composition. The description used is then lubricating base oil. Predominant ingredient is understood to mean that the lubricating oil or the mixture of lubricating oils represents at least 51% by weight, with respect to the total weight of the composition.

Preferably, the lubricating oil or the mixture of lubricating oils represents at least 70% by weight, with respect to the total weight of the composition.

In one embodiment of the invention, the lubricating oil is chosen from the group formed by the oils of Group I, Group II, Group III, Group IV or Group V of the API classification and one of their mixtures. Preferably, the lubricating oil is chosen from the group formed by the oils of Group III, Group IV or Group V of the API classification and their mixture. Preferably, the lubricating oil is an oil from Group III of the API classification.

The lubricating oil has a kinematic viscosity at 100° C., measured according to the standard ASTM D445, ranging from 2 to 150 cSt, preferably ranging from 2 to 15 cSt.

Functional Additives

In one embodiment, the composition of the invention can additionally comprise one or more functional additives chosen from the group formed by detergents, antiwear additives, load-carrying additives, antioxidants, polymers which improve the viscosity index, pour point improvers, antifoaming agents, thickeners, anticorrosion additives, dispersants, friction modifiers and their mixtures.

The functional additive(s) which are added to the composition of the invention are chosen as a function of the final use of the lubricating composition. These additives can be introduced in two different ways:
- either each additive is added in isolation and sequentially to the composition,
- or all the additives are added simultaneously to the composition; in this case, the additives are generally available in the form of a packet, known as packet of additives.

The functional additive or the mixtures of functional additives, when they are present, represent from 0.1% to 10% by weight, with respect to the total weight of the composition.

The Detergents:

These additives reduce the formation of deposits at the surface of the metal parts by dissolution of the oxidation and combustion byproducts. The detergents which can be used in the lubricating compositions according to the present invention are well known to a person skilled in the art. The detergents commonly used in the formulation of lubricating compositions are typically anionic compounds comprising a long lipophilic hydrocarbon chain and a hydrophilic head. The associated cation is typically a metal cation of an alkali metal or alkaline earth metal. The detergents are preferentially chosen from the alkali metal or alkaline earth metal salts of carboxylic acids, sulfonates, salicylates, naphthenates, and also phenate salts. The alkali metals and alkaline earth metals are preferentially calcium, magnesium, sodium or barium. These metal salts can contain the metal in an approximately stoichiometric amount or else in excess (in an amount greater than the stoichiometric amount). In the latter case, "overbased" detergents have to be dealt with. The excess metal contributing the overbased nature to the detergent is provided in the form of metal salts which are insoluble in the oil, for example carbonate, hydroxide, oxalate, acetate or glutamate, preferentially carbonate.

The Antiwear Additives and the Load-Carrying Additives:

These additives protect the surfaces from friction by formation of a protective film adsorbed on these surfaces. A great variety of antiwear and load-carrying additives exist. Mention may be made, by way of illustration, of phosphorus/sulfur additives, such as metal alkyl thiophosphates, in particular zinc alkyl thiophosphates, and more specifically zinc dialkyl dithiophosphates or ZnDTP, amine phosphates, polysulfides, notably sulfur-based olefins, and metal dithiocarbamates.

The Antioxidants:

These additives slow down the degradation of the composition. The degradation of the composition can be reflected by the formation of deposits, the presence of sludges or an increase in the viscosity of the composition. The antioxidants act as radical inhibitors or destroyers of hydroperoxides. The antioxidants commonly employed include antioxidants of phenolic or amine type.

The Anticorrosion Additives:

These additives cover the surface with a film which prevents access of oxygen to the surface of the metal. They can sometimes neutralize the acids or certain chemical products in order to prevent corrosion of the metal. Mention may be made, by way of illustration, for example, of dimercaptothiadiazole (DMTD), benzotriazoles or phosphites (capture of free sulfur).

The Polymers which Improve the Viscosity Index:

These additives make it possible to guarantee good cold behavior and a minimum viscosity at high temperature of the composition. Mention may be made, by way of illustration, for example, of polymeric esters, olefin copolymers (OCPs) or polymethacrylates (PMAs).

The Pour Point Improvers:

These additives improve the cold behavior of the compositions by slowing down the formation of paraffin crystals. These are, for example, polyalkyl methacrylates, polyacrylates, polyarylamides, polyalkylphenols, polyalkylnaphthalenes and alkylated polystyrenes.

The Antifoaming Agents:

These additives have the effect of countering the effect of the detergents. Mention may be made, by way of illustration, of polymethylsiloxanes and polyacrylates.

The Thickeners:

The thickeners are additives used especially for industrial lubrication and make it possible to formulate lubricants of greater viscosity than engine lubricating compositions. Mention may be made, by way of illustration, of polyisobutenes having a weight-average molar mass of 10 000 to 100 000 g/mol.

The Dispersants:

These additives ensure the maintenance in suspension and the discharge of the insoluble solid contaminants composed of the oxidation byproducts which are formed during the use of the composition. Mention may be made, by way of illustration, for example, of succinimides, PIB (polyisobutene) succinimides and Mannich bases.

The Friction Modifiers;

These additives improve the coefficient of friction of the composition. Mention may be made, by way of illustration, of molybdenum dithiocarbamate, amines having at least one hydrocarbon chain of at least 16 carbon atoms, esters of fatty acids and of polyols, such as esters of fatty acids and of glycerol, in particular glycerol monooleate.

Contents of Compounds of the Lubricating Compositions

Advantageously, the content of comb copolymer A1 in the lubricating composition ranges from 0.05% to 20% by weight, with respect to the total weight of the lubricating composition, preferably from 0.5% to 10% by weight, with respect to the total weight of the lubricating composition.

Advantageously, the content of compound A2, notably the content of poly(boronic ester) copolymer, ranges from 0.05% to 20% by weight, with respect to the total weight of the lubricating composition, preferably from 0.25% to 10% by weight, with respect to the total weight of the lubricating composition.

Preferentially, the ratio by weight (A1/A2 ratio) of the polydiol compound A1 to the compound A2, notably the poly(boronic ester) copolymer, ranges from 0.001 to 100, preferably from 0.05 to 20, more preferably still from 0.1 to 10, more preferably from 0.2 to 5.

In one embodiment, the sum of the weights of the comb copolymer A1 and of the compound A2 ranges from 0.01% to 40%, advantageously from 0.75% to 20%, with respect to the total weight of the lubricating composition, preferably from 2% to 15%, with respect to the total weight of the lubricating composition, and the weight of lubricating oil ranges from 60% to 99.9%, with respect to the total weight of the lubricating composition.

For the engine applications, advantageously, the sum of the weights of the comb copolymer A1 and of the compound A2 represents from 0.1% to 15%, with respect to the total weight of the lubricating composition.

For the transmission applications, advantageously, the sum of the weights of the comb copolymer A1 and of the compound A2 represents from 0.5% to 40%, with respect to the total weight of the lubricating composition.

In one embodiment, the molar percentage of exogenous compound A4 in the lubricating composition ranges from 0.05% to 5000%, preferably ranges from 0.1% to 1000%, more preferably from 0.5% to 500%, more preferably still from 1% to 150%, with respect to the boronic ester functional groups of the compound A2, notably of the poly(boronic ester) copolymer.

In one embodiment, the lubricating composition of the invention results from the mixing of:
- from 0.05% to 20% by weight of at least one comb polydiol copolymer A1 as defined above, with respect to the total weight of the lubricating composition;
- from 0.05% to 20% by weight of at least one compound A2 as defined above, notably of poly(boronic ester) copolymer, with respect to the total weight of the lubricating composition; and
- optionally from 0.001% to 0.5% by weight of at least one exogenous compound A4 as defined above, with respect to the total weight of the lubricating composition;
- optionally from 0.001% to 0.5% by weight of at least one exogenous compound A5 as defined above, with respect to the total weight of the lubricating composition; and
- from 60% to 99.9% by weight of at least one lubricating oil as defined above, with respect to the total weight of the lubricating composition.

In another embodiment, the lubricating composition of the invention results from the mixing of:
- from 0.5% to 20% by weight of at least one comb polydiol copolymer A1 as defined above, with respect to the total weight of the lubricating composition;
- from 0.25% to 20% by weight of at least one compound A2 as defined above, notably of poly(boronic ester) copolymer, with respect to the total weight of the lubricating composition; and
- optionally from 0.001% to 0.5% by weight of at least one exogenous compound A4 as defined above, with respect to the total weight of the lubricating composition;
- optionally from 0.001% to 0.5% by weight of at least one exogenous compound A5 as defined above, with respect to the total weight of the lubricating composition;
- from 0.5% to 15% by weight of at least one functional additive as defined above, with respect to the total weight of the lubricating composition; and
- from 60% to 99.25% by weight of at least one lubricating oil as defined above, with respect to the total weight of the lubricating composition.

Method for the Preparation of the Lubricating Compositions of the Invention

The lubricating compositions of the invention are prepared by means well known to a person skilled in the art. For example, it is sufficient for a person skilled in the art notably:
- to withdraw a desired amount of a solution comprising the comb polydiol copolymer A1 as defined above;
- to withdraw a desired amount of a solution comprising the compound A2, notably the poly(boronic ester) copolymer A2, as defined above;
- optionally to withdraw a desired amount of a solution comprising the exogenous compound A4 as defined above;
- to mix, either simultaneously or sequentially, the withdrawn solutions in a lubricating base oil, in order to obtain the lubricating composition of the invention.

The order of addition of the compounds has no influence in the implementation of the method for the preparation of the lubricating composition.

Properties of the Lubricating Compositions According to the Invention

The lubricating compositions of the invention result from the mixing of associative polymers, which exhibit the property of increasing the viscosity of the lubricating oil by associations. The lubricating compositions according to the invention exhibit the advantage that these combinations or crosslinkings are thermoreversible and optionally that the degree of association or of crosslinking can be controlled by virtue of the addition of a supplementary diol compound. In addition, they exhibit an improved thermal stability, an improved viscosity index, an improved oxidation stability, improved cycling performance qualities and a better reproducibility of performance qualities over time.

A person skilled in the art knows how to adjust the different parameters of the different constituents of the composition in order to obtain a lubricating composition, the viscosity of which increases when the temperature increases, and in order to modulate its viscosity and its rheological behavior.

Method for Modulating the Viscosity of a Lubricating Composition

Another subject matter of the present invention is a method for modulating the viscosity of a lubricating composition, the method comprising at least:
- the provision of a lubricating composition resulting from the mixing of at least one lubricating oil, of at least one comb polydiol copolymer A1 and of at least one compound A2 comprising at least two boronic ester functional groups and which can associate with said polydiol copolymer A1 by at least one transesterification reaction,
- optionally the addition, to said lubricating composition, of at least one exogenous compound A4,
- optionally the addition, to said lubricating composition, of at least one exogenous compound A5 chosen from boronic di- and triesters.

Within the meaning of the present invention, "to modulate the viscosity of a lubricating composition" is understood to mean an adaptation of the viscosity at a given temperature as a function of the use of the lubricating composition. This is obtained by adding an exogenous compound A4 and/or A5 as defined above. These compounds make it possible to control the degree of association and of crosslinking of the two polydiol A1 and poly(boronic ester) A2 copolymers. Such a method is described in detail in WO2016/113229.

Other Subject Matters According to the Invention

Another subject matter of the present invention is the use of the lubricating composition as defined above to lubricate a mechanical part.

In the continuation of the description, the percentages are expressed by weight, with respect to the total weight of the lubricating composition.

The compositions of the invention can be used to lubricate the surfaces of the parts which are conventionally found in an engine, such as the pistons, rings, liners system.

Thus, another subject matter of the present invention is a composition for lubricating at least an engine, said composition comprising, notably is essentially composed of, a composition resulting from the mixing of:
- from 85% to 99.9% by weight, advantageously from 92% to 99% by weight, of a lubricating oil, and
- from 0.1% to 15% by weight, advantageously from 1% to 8% by weight, of a mixture of at least one comb copolymer A1 as defined above and of at least one boronic ester copolymer A2 as defined above; and
- optionally from 0.001% to 0.1% by weight of at least one exogenous compound A4 as defined above;
- optionally from 0.001% to 0.1% by weight of at least one exogenous compound A5 as defined above;

the composition having a kinematic viscosity at 100° C., measured according to the standard ASTM D445, ranging from 3.8 to 26.1 cSt; the percentages by weight being expressed with respect to the total weight of said composition.

In one embodiment, a subject matter of the invention is a composition for lubricating at least an engine, said composition comprising, notably is essentially composed of, a composition resulting from the mixing of:

from 80% to 99% by weight of a lubricating oil, and
from 0.1% to 15% by weight of a mixture of at least one copolymer A1 as defined above and of at least one boronic ester copolymer A2 as defined above; and
optionally from 0.001% to 0.1% by weight of at least one exogenous compound A4 as defined above;
from 0.5% to 15% by weight of at least one functional additive chosen from the group formed by detergents, antiwear additives, load-carrying additives, additional antioxidants, anticorrosion additives, polymers which improve the viscosity index, pour point improvers, antifoaming agents, thickeners, dispersants, friction modifiers and their mixtures;

the composition having a kinematic viscosity at 100° C., measured according to the standard ASTM D445, ranging from 3.8 to 26.1 cSt; the percentages by weight being expressed with respect to the total weight of said composition.

The definitions and preferences relating to the lubricating oils, to the comb copolymers A1, to the boronic ester compounds A2 and to the exogenous compounds A4 and/or A5 also apply to the compositions for lubricating at least an engine.

Another subject matter of the present invention is a composition for lubricating at least a transmission, such as manual or automatic gearboxes.

Thus, another subject matter of the present invention is a composition for lubricating at least a transmission, said composition comprising, notably is essentially composed of, a composition resulting from the mixing of:

from 50% to 99.5% by weight of a lubricating oil, and
from 0.5% to 50% by weight of a mixture of at least one copolymer A1 as defined above and of at least one boronic ester copolymer A2 as defined above; and
optionally from 0.001% to 0.5% by weight of at least one exogenous compound A4 as defined above;
optionally from 0.001% to 0.5% by weight of at least one exogenous compound A5 as defined above;

the composition having a kinematic viscosity at 100° C., measured according to the standard ASTM D445, ranging from 4.1 to 41 cSt, the percentages by weight being expressed with respect to the total weight of said composition.

In one embodiment of the invention, the composition for lubricating at least a transmission comprises, notably is essentially composed of, a composition resulting from the mixing of:

from 45% to 99.39% by weight of a lubricating oil, and
from 0.5% to 50% by weight of a mixture of at least one comb copolymer A1 as defined above and of at least one boronic ester copolymer A2 as defined above; and
optionally from 0.001% to 0.5% by weight of at least one exogenous compound A4 as defined above;
optionally from 0.001% to 0.5% by weight of at least one exogenous compound A5 as defined above;
from 0.1% to 15% by weight of at least one functional additive chosen from the group formed by detergents, antiwear additives, load-carrying additives, additional antioxidants, anticorrosion additives, polymers which improve the viscosity index, pour point improvers, antifoaming agents, thickeners, dispersants, friction modifiers and their mixtures;

the composition having a kinematic viscosity at 100° C., measured according to the standard ASTM D445, ranging from 4.1 to 41 cSt, the percentages by weight being expressed with respect to the total weight of said composition.

The definitions and preferences relating to the lubricating oils, to the copolymers A1, to the boronic ester copolymers A2 and to the exogenous compounds A4 and A5 also apply to the compositions for lubricating at least a transmission.

The compositions of the invention can be used for engines or transmissions of light vehicles, of heavy-duty vehicles but also of ships.

Another subject matter of the present invention is a method for the lubrication of at least a mechanical part, notably at least an engine or at least a transmission, said method comprising a stage in which said mechanical part is brought into contact with at least one lubricating composition as defined above.

The definitions and preferences relating to the lubricating oils, to the copolymers A1, to the boronic ester copolymers A2 and, if appropriate, to the exogenous compounds A4 and A5 also apply to the method for the lubrication of at least a mechanical part.

FIGURES

FIG. 1 diagrammatically represents a random copolymer (P1), a gradient copolymer (P2) and a block copolymer (P3); each circle represents a monomer motif. The difference in chemical structure between the monomers is symbolized by a different color (light gray/black).

FIG. 2 diagrammatically represents a comb copolymer.

FIG. 3 diagrammatically illustrates the reactions for exchanges of boronic ester bonds between two polydiol polymers (A1-1 and A1-2) and two boronic ester polymers (A2-1 and A2-2) in the presence of diols.

FIG. 4 diagrammatically illustrates and represents the crosslinking of the composition according to the invention in tetrahydrofuran (THF).

FIG. 5 diagrammatically represents the behavior of the composition of the invention as a function of the temperature. A copolymer (2) having diol functional groups (functional group A) can associate in a thermoreversible way with a copolymer (1) having boronic ester functional groups (functional group B) via a transesterification reaction. The organic group of the boronic ester functional groups (functional group B) which is exchanged during the transesterification reaction is a diol symbolized by a black crescent. A chemical bond (3) of boronic ester type is formed, with release of a diol compound.

EXPERIMENTAL SECTION

Figure 1:
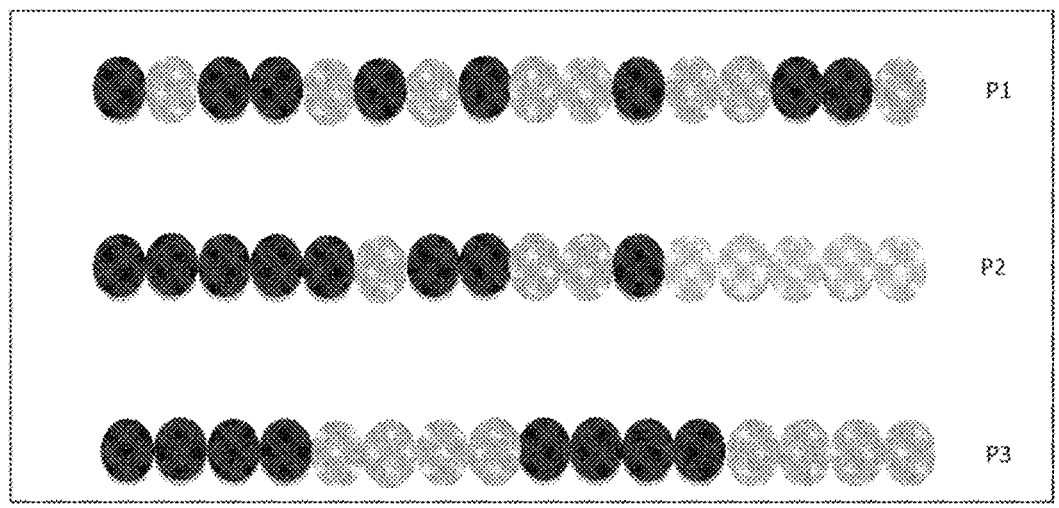
Figure 2:
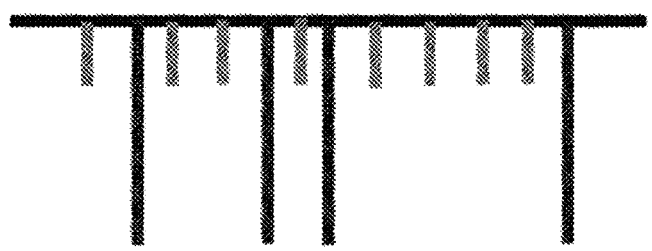
Figure 3:
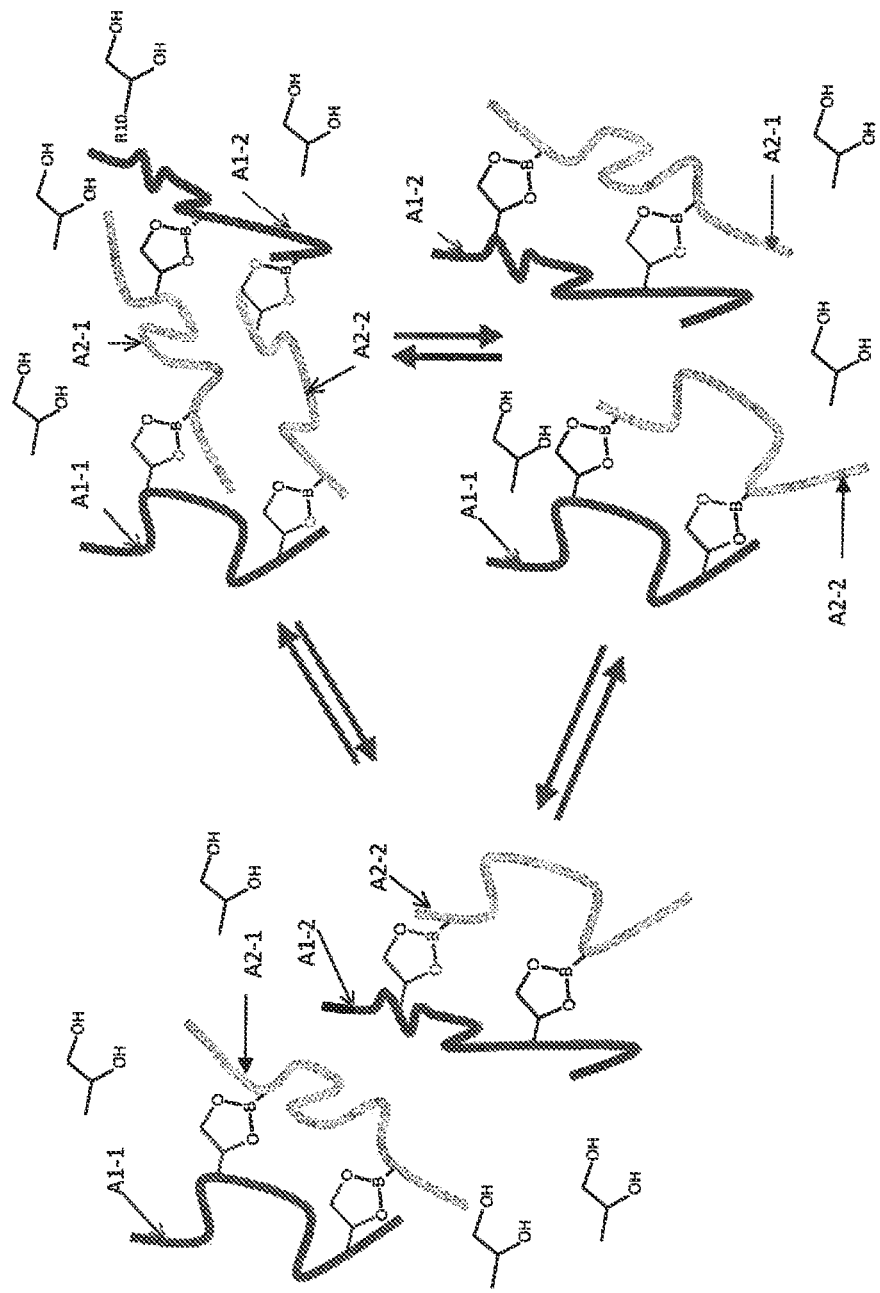
Figure 4:
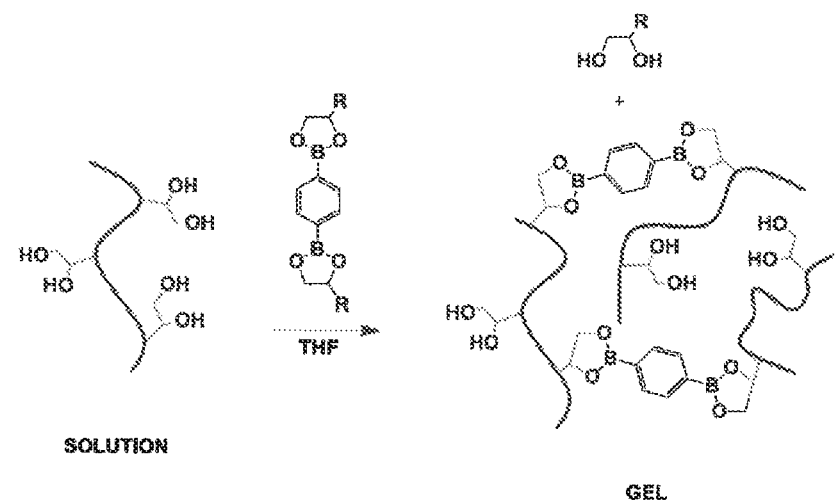
Figure 5:
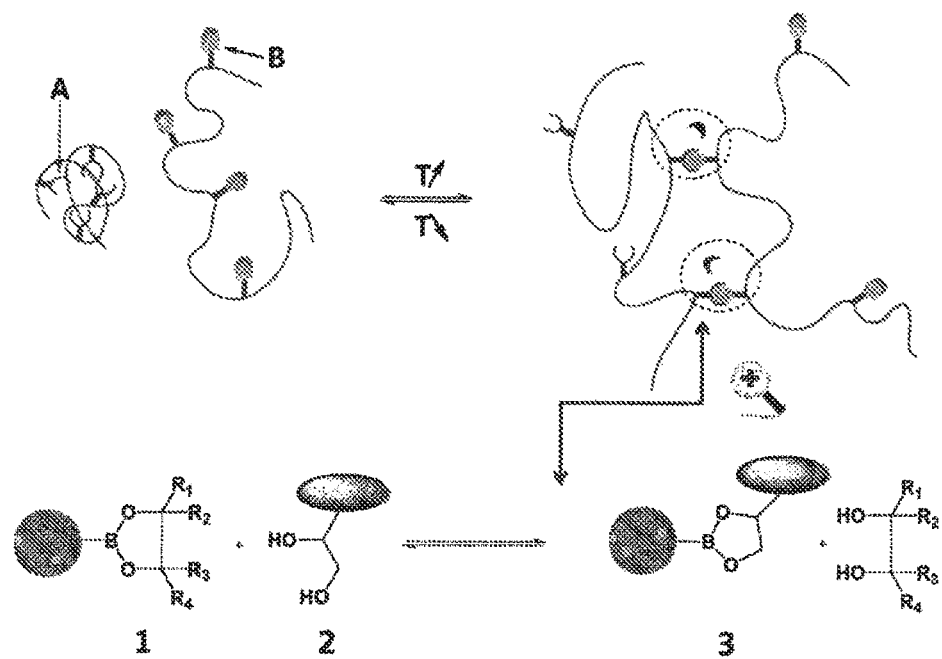
Figure 6A:
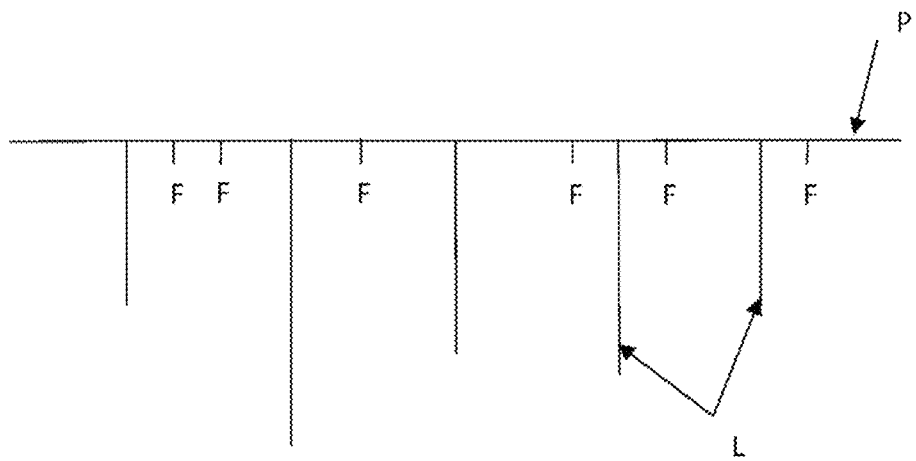
FIGS. 6A, 6B and 6C represent different comb copolymers A1.
Figure 6B:
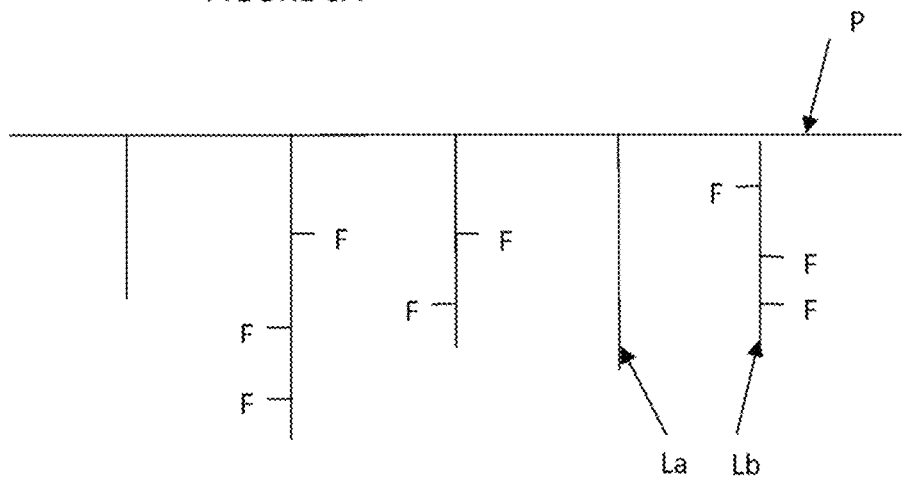
Figure 6C:
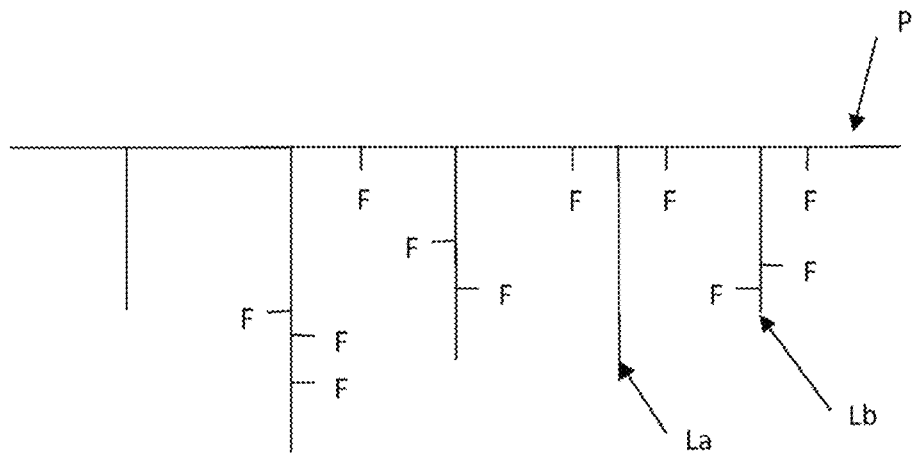
Figure 7:
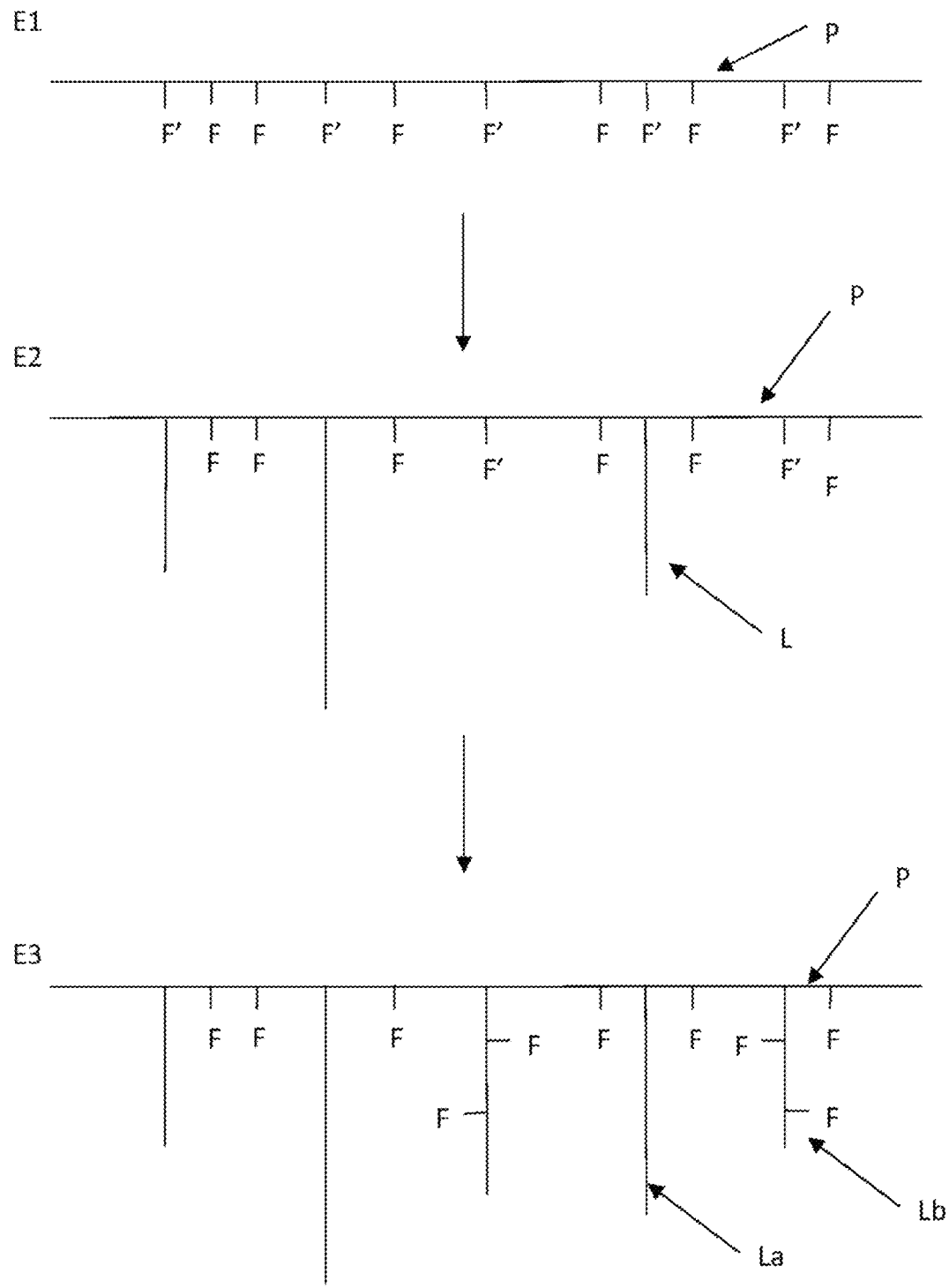
FIG. 7 represents a scheme for the synthesis of comb copolymers A1.
Figure 8:
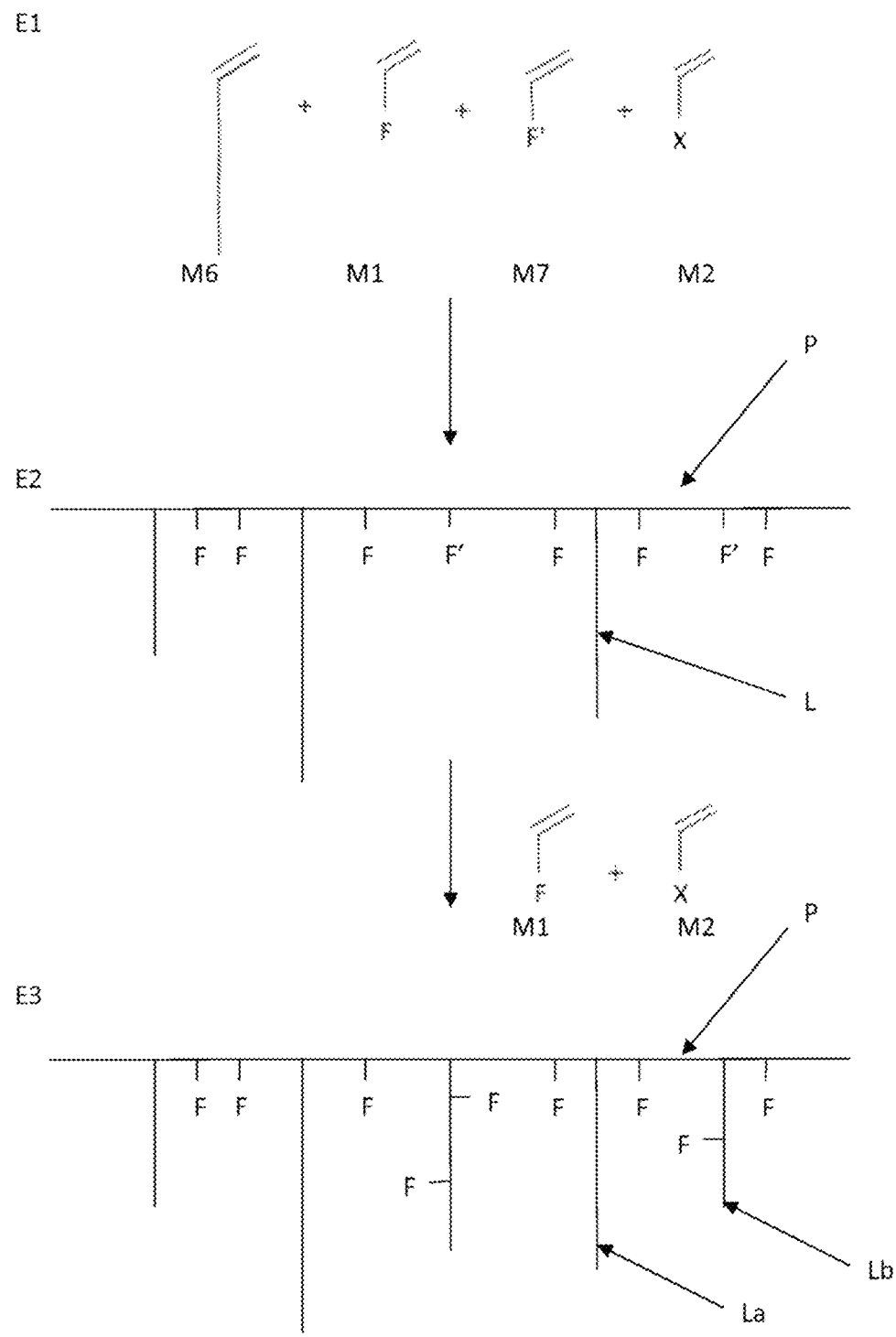
FIG. 8 represents a scheme for the synthesis of comb copolymers A1.

The following examples illustrate the invention without limiting it.

1 Synthesis of Comb Copolymers A1 Carrying Diol Functional Group 1.1: Synthesis of the Monomers 1.1.1 Synthesis of the Monomer M1 Carrying a Diol Functional Group The synthesis of a methacrylate monomer carrying a diol functional group is carried out in three stages (stages 1, 2 and 3) according to the protocol below:

$1^{st}$ stage:

42.1 g (314 mmol) of 1,2,6-hexanetriol (1,2,6-HexTri) are introduced into a 1 liter round-bottomed flask. 5.88 g of molecular sieve (4 Å) are added, followed by 570 ml of acetone. 5.01 g (26.3 mmol) of para-toluenesulfonic acid (pTSA) are subsequently added slowly. The reaction medium is left stirring at ambient temperature for 24 hours. 4.48 g (53.3 mmol) of $NaHCO_3$ are then added. The reaction medium is left stirring at ambient temperature for 3 hours before being filtered. The filtrate is then concentrated under vacuum using a rotary evaporator until a suspension of white crystals is obtained. 500 ml of water are then added to this suspension. The solution thus obtained is extracted with 4×300 ml of dichloromethane. The organic phases are combined and dried over $MgSO_4$. The solvent is subsequently completely evaporated under vacuum at 25° C. using a rotary evaporator.

$2^{Nd}$ Stage:

5.01 g (28.8 mmol) of the product thus obtained are introduced into a 1 liter round-bottomed flask. 4.13 g (31.9 mmol) of DIPEA and 37.9 mg (0.31 mmol) of DMAP are subsequently introduced into the round-bottomed flask, followed by 5.34 g (34.6 mmol) of methacrylic anhydride. The round-bottomed flask is then stirred at ambient temperature for 24 hours. 0.95 g of methanol (29.7 mmol) is subsequently added to this solution and the round-bottomed flask was left stirring for an additional 1 hour. The product is then dissolved in 40 ml of hexane. The organic phase is subsequently successively washed with 25 ml of water, 3×25 ml of a 0.5M aqueous hydrochloric acid solution, 3×25 ml of a 0.5M aqueous NaOH solution and again with 25 ml of water. The organic phase is dried over $MgSO_4$, filtered and then concentrated under vacuum using a rotary evaporator to give a light yellow liquid.

$3^{rd}$ Stage:

17.23 g (71.2 mmol) of the product thus obtained are introduced into a 1 liter round-bottomed flask. 90 ml of water and 90 ml of acetonitrile are subsequently introduced into the round-bottomed flask, followed by 59.1 ml (159 mmol) of acetic acid. The round-bottomed flask is then stirred at 30° C. for 24 hours while allowing a gentle stream of nitrogen to bubble through in order to drive the removal of the acetone. The solution thus obtained is extracted with 6×30 ml of ethyl acetate. The organic phase is subsequently successively washed with 5×30 ml of a 0.5M aqueous NaOH solution and then 3×30 ml of water. The organic phase is subsequently dried over $MgSO_4$, filtered and then concentrated under vacuum using a rotary evaporator to give a light yellow liquid, the characteristics of which are as follows:

$^1$H NMR (400 MHz, $CDCl_3$) δ: 6.02 (singlet, 1H), 5.49 (singlet, 1H), 4.08 (triplet, J=6.4 Hz, 1H), 3.65-3.58 (multiplet, 1H), 3.57-3.50 (multiplet, 3H), 3.35 (split doublet, J=7.6 Hz and J=11.2 Hz, 1H), 1.86 (split doublet, J=1.2 Hz and J=1.6 Hz, 3H), 1.69-1.31 (multiplet, 6H).

1.1.2 Synthesis of the Brominated Monomer (Branching Monomer):

Scheme 11: Synthesis of the brominated monomer

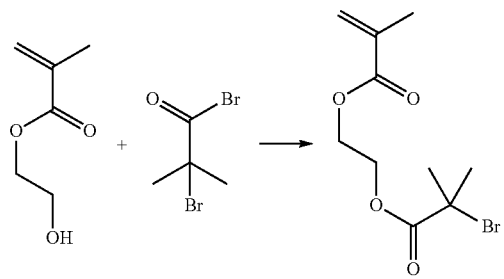

7 ml of hydroxyethyl methacrylate (58 mmol), 5.4 ml of pyridine (66 mmol) and 75 ml of dichloromethane are introduced into a 250 ml round-bottomed flask. The round-bottomed flask is then closed using a septum, degassed by bubbling with $N_2$ for 30 min and then placed in a bath of ice-cold water. 7.7 ml of 2-bromo-2-methyl propionyl bromide (64 mmol) are subsequently added dropwise to the reaction mixture over approximately 15 minutes. The round-bottomed flask is kept stirred for 6 hours. A white precipitate is formed during the reaction. The solution is subsequently filtered in order to remove the solid. The solid is rinsed with dichloromethane (2×10 ml). The organic phase is subsequently washed 2 times with 100 ml of distilled water, 2 times with 100 ml of a 10% $NaHCO_3$ solution and then 2 times with 100 ml of a saturated NaC solution. The organic phase is then dried over $MgSO_4$ and the solvent removed using a rotary evaporator. 11.6 g of a bright yellow liquid are obtained (yield=72%).

$^1$H NMR ($CDCl_3$): δ: 6.05 ppm (m, 1H), 5.52 ppm (m, 1H), 4.35 ppm (m, 4H), 1.87 ppm (m, 3H), 1.85 ppm (s, 6H).

1.1.3 Synthesis of the Methacrylic Olefinic Macromonomer (Monomer M6-A):

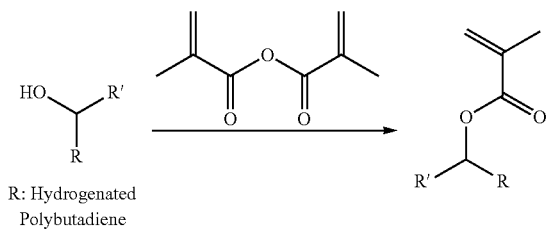

Scheme 12: synthesis of an olefinic monomer

R: Hydrogenated Polybutadiene
R': H or CH₃

58.8 g (11.6 mmol) of Krasol HLBH 5000M (product supplied by Cray Valley) are dissolved in 150 g of dichloromethane (DCM). 11.9 g of methacrylic anhydride (77.3 mmol), 56.2 mg of 4-dimethylaminopyridine (0.47 mmol) and 7.37 g of trimethylamine (76 mmol) are subsequently added. The solution is left stirring at ambient temperature for 24 h. The solution is subsequently washed 2 times with a 0.5M aqueous sodium hydroxide solution, then 2 times with a 0.5M aqueous hydrochloric acid solution and finally 2 times with distilled water. The organic phase is dried over MgSO₄ and then the solvent is evaporated using a rotary evaporator. The product is subsequently dissolved in tetrahydrofuran (THF) before being precipitated 3 times consecutively from acetone (redissolved in THF before each precipitation). The product is dried under vacuum at 50° C. for 18 hours. A colorless and translucent viscous liquid is thus obtained. The quantitative functionalization of the Krasol (of the alcohol to give methacrylate) is confirmed by ¹H NMR by the complete disappearance of the peak between 3.8 and 4.1 ppm, characteristic of the protons in the a position with respect to the alcohol functional group of the Krasol.

¹H NMR (CDCl₃): δ:6.05 ppm (m, 1H), 5.52 ppm (m, 1H), 5.1-4.9 ppm (m, 1H), 1.94 ppm (s, 3H), 2.05-0.48 ppm (1020H), traces of DCM (5.29 ppm), THF (3.75 ppm; 1.84 ppm) and acetone (2.17 ppm).

1.1.4 Synthesis of the Olefin Macromonomer Carrying a Terminal Styrene Functional Group (Monomer M6-B -OLF1500-St)

The synthesis of the olefin macromonomer carrying a terminal styrene functional group (OLF1500-St) is carried out in two stages (Schemes 13 and 14) according to the following protocol:

1ˢᵗ stage 4.0 g (27 mmol) of 4-vinylbenzoic acid (4-VBA) are dissolved in 110 ml of anhydrous dichloromethane (DCM) with a catalytic amount (15 drops) of anhydrous dimethylformamide (DMF). 5.8 ml (67 mmol) of oxalyl chloride is subsequently added to the solution. The reaction mixture is left stirring at ambient temperature for 2 hours. After evaporation of the solvent under reduced pressure, the yellow liquid obtained is dried under vacuum for 2 h.

2ⁿᵈ Stage:

2.64 g (1.76 mmol) of the olefin copolymer OLF1500-OH exhibiting a number-average molar mass, $M_n$, of 1500 g/mol and carrying a terminal primary alcohol functional group and 3.8 ml (27.5 mmol) of NEt₃ are dissolved in 50 ml of anhydrous DCM and the mixture is brought to approximately 0° C. using an ice bath. A solution of 4-vinylbenzoyl chloride obtained during the 1ˢᵗ stage (27 mmol) in 30 ml of DCM is subsequently added dropwise to the reaction mixture over approximately 25 min. The mixture is stirred in the ice bath for 1 hour and then at ambient temperature for 24 hours. The excess 4-vinylbenzoyl chloride is neutralized by addition of 10 ml of water and by leaving the reaction mixture stirring for 1 hour. The reaction mixture is subsequently successively washed with 3×100 ml of a 1M HCl solution, 2×100 ml of a 1M NaOH solution and 1×100 ml of aqueous sodium chloride solution. After drying the organic phase over MgSO₄, the clear yellow solution obtained is filtered through a basic alumina column. The evaporation of the DCM and the drying under vacuum give 2.80 g (97.6%) of a light yellow oil, the characteristics of which are as follows:

¹H NMR (400 MHz, CDCl₃) δ: 8.00 (multiplet, 2H), 7.46 (split doublet, J=1.5 Hz and J=8.3 Hz, 2H), 6.75 (split doublet, J=12.0 Hz and J=17.5 Hz, 1H), 5.86 (split doublet, J=0.8 Hz and J=17.7 Hz, 1H), 5.38 (doublet, J=11.0 Hz, 1H), 4.41-4.28 (multiplet, 2H), 1.83-0.52 (multiplet, 961H).

1.1.5. Synthesis of the Boronic Ester Condensed with 1,2-Dodecanediol Monomer (mEB-C₁₂)

This monomer is obtained according to the protocol described in the application WO2016/113229 (Experimental part § 2.1)

1.2: Synthesis of the Copolymers—Methods

The comb copolymers A1 of the invention are obtained by resorting to the synthesis methods described in the applications W2015/110642, W2015/110643 and WO2016/113229, if appropriate supplemented by the methods described in the present patent application.

The number-average molar mass and the dispersity are obtained by size exclusion chromatography using poly(methyl methacrylate) calibration and THF as eluent.

1.2.1 Synthesis of a brominated main chain (brominated backbone 1):

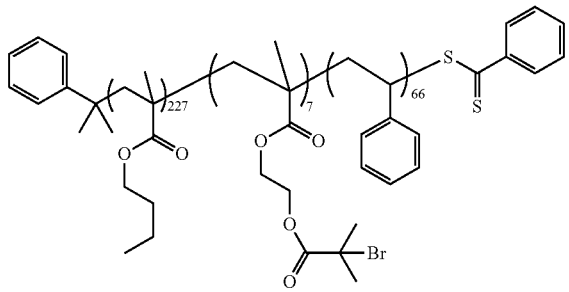

0.50 g (1.8 mmol) of brominated monomer obtained according to the protocol described above in point 1.1.2 (Scheme 11), 8.52 g (59.9 mmol) of butyl methacrylate, 1.14 g (11.0 mmol) of styrene, 35.8 mg (0.13 mmol) of cumyl dithiobenzoate, 6.3 mg (0.04 mmol) of azobisisobutyronitrile (AIBN) and 5 g of anisole are introduced into a 50 ml Schlenk tube. The reaction medium is stirred and degassed for 30 minutes by bubbling nitrogen through, before being brought to 65° C. for a period of 16 hours. The polymer is subsequently isolated by 3 successive precipitations from methanol and then dried under vacuum at 50° C. for 16 hours. A copolymer exhibiting a number-average molar mass ($M_n$) of 38 000 g/mol, a dispersity (Đ) of 1.2 and a number-average degree of polymerization ($DP_n$) of approximately 300 is obtained. The polymer thus obtained contains approximately 2.3 mol % (approximately 5% by weight) of brominated methacrylate monomer. These values are respectively obtained by size exclusion chromatography, using THF as eluent and poly(methyl methacrylate) (PMMA) calibration, and by monitoring the conversion of monomers during the copolymerization.

1.2.2 Synthesis of a Brominated Main Chain (Brominated Backbone 2):

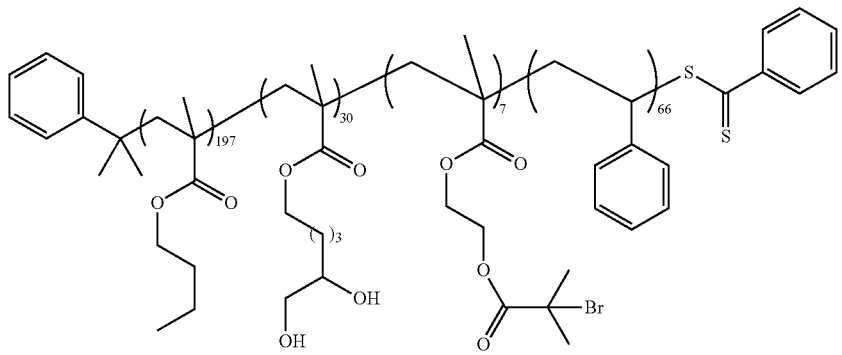

0.50 g (1.8 mmol) of brominated monomer obtained according to the protocol described above in point 1.1.2 (Scheme 11), 7.45 g (52.4 mmol) of butyl methacrylate, 1.46 g (7.2 mmol) of 5,6-dihydroxyhexyl methacrylate obtained according to the protocol described in section 1.1.1 above, 1.13 g (10.8 mmol) of styrene, 35.8 mg (0.13 mmol) of cumyl dithiobenzoate, 6.3 mg (0.04 mmol) of AIBN and 5 g of anisole are introduced into a 50 ml Schlenk tube. The reaction medium is stirred and degassed for 30 minutes by bubbling nitrogen through, before being brought to 65° C. for a period of 16 hours. The polymer is subsequently isolated by 3 successive precipitations from methanol and then dried under vacuum at 50° C. for 16 hours. A copolymer exhibiting an $M_n$ of 46 000 g/mol, a dispersity (Đ) of 1.2 and a number-average degree of polymerization ($DP_n$) of approximately 300 is obtained. The polymer thus obtained contains approximately 2.3 mol % (approximately 5% by weight) of brominated methacrylate monomer. These values are respectively obtained by size exclusion chromatography, using THF as eluent and PMMA calibration, and by monitoring the conversion of monomers during the copolymerization.

1.2.3 Synthesis by ATRP of the Comb Polydiol Copolymer CPDiol-1

520 mg (87 μmol of brominated monomer and approximately 12 μmol of dithiobenzoate) of brominated backbone 1 obtained according to the protocol described above, 13.4 g (39.5 mmol) of stearyl methacrylate, 0.91 g (4.5 mmol) of 5,6-dihydroxyhexyl methacrylate obtained according to the protocol described above in § 1.1.1, 3 g of N,N-dimethylformamide (DMF) and 10 g of anisole are introduced into a 50 ml Schlenk round-bottomed flask. In parallel, 52 mg (333 μmol) of 2,2'-bipyridine, 5 mg (20 μmol) of copper (II) dibromide ($CuBr_2$) and 21 mg (147 μmol) of CuBr are dissolved in 2 g of DMF in a sample tube before sealing it using a septum. The flask and the sample tube are degassed by bubbling nitrogen through the solutions for 30 minutes. The solution contained in the sample tube is subsequently withdrawn and then injected into the round-bottomed flask using a syringe. The round-bottomed flask is then placed in an oil bath thermostatically controlled at 60° C. for 7 hours. The solution is subsequently filtered through a basic alumina column in order to remove the copper. Finally, the polymer is isolated by 3 successive precipitations from methanol and then dried under vacuum at 50° C. for 20 hours. A copolymer exhibiting a number-average molar mass $M_n$ of 105 000 g/mol and a dispersity Đ of 1.5 is obtained. These values are obtained by size exclusion chromatography using THF as eluent and PMMA calibration. According to the conversion of monomers determined by $^1H$ NMR, the pendant chains have a number-average degree of polymerization $DP_n$ of approximately 40.

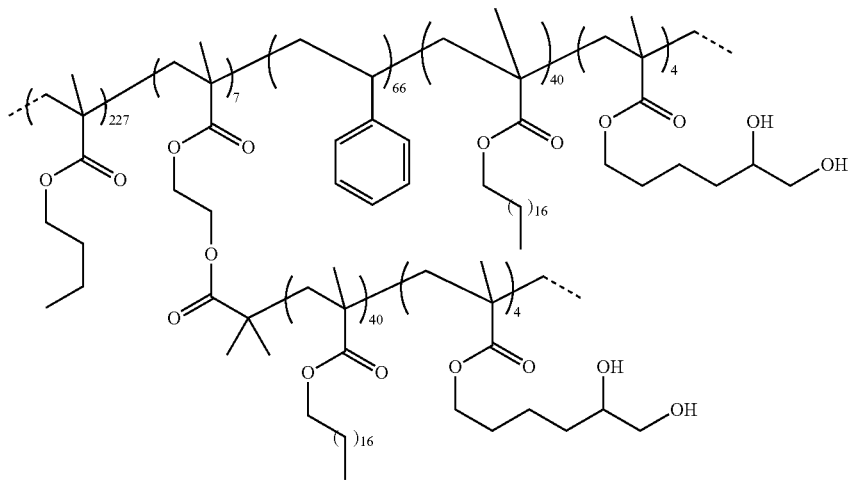

1.2.4 Synthesis by ATRP of the Comb Polydiol BB:

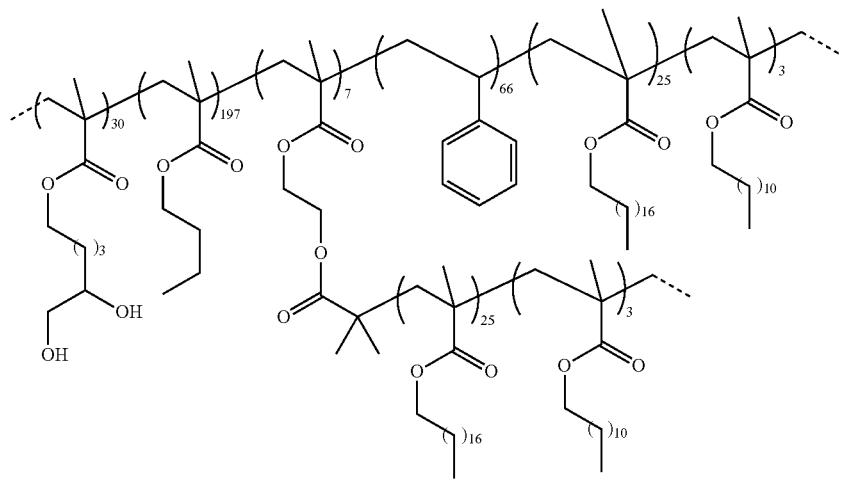

522 mg (84 μmol of brominated monomer approximately 12 μmol of dithiobenzoate) of brominated backbone 2 obtained according to the protocol described above, 9.22 g (27.2 mmol) of stearyl methacrylate, 0.80 g (3.1 mmol) of lauryl methacrylate and 6.8 g of anisole are introduced into a 50 ml Schlenk round-bottomed flask. In parallel, 48 mg (308 μmol) of 2,2'-bipyridine, 4 mg (18 μmol) of CuBr$_2$ and 19 mg (133 μmol) of CuBr are dissolved in 3.3 g of DMF in a sample tube before sealing it using a septum. The flask and the sample tube are degassed by bubbling nitrogen through the solutions for 30 minutes. The solution contained in the sample tube is subsequently withdrawn and then injected into the round-bottomed flask using a syringe. The round-bottomed flask is then placed in an oil bath thermostatically controlled at 60° C. for 6.3 hours. The solution is subsequently filtered through a basic alumina column in order to remove the copper. Finally, the polymer is isolated by 3 successive precipitations from methanol and then dried under vacuum at 50° C. for 20 hours. A copolymer exhibiting a number-average molar mass $M_n$ of 210 000 g/mol and a dispersity Ð of 1.6 is obtained. These values are obtained by size exclusion chromatography using THF as eluent and PMMA calibration. According to the conversion of monomers determined by $^1$H NMR, the pendant chains have a number-average degree of polymerization $DP_n$ of approximately 30 units.

1.2.5 Synthesis of a comb copolymer of butyl methacrylate, of methacrylate carrying a diol functional group and of the olefin macromonomer OLF1500-St (CPDiol-2)

Scheme 13

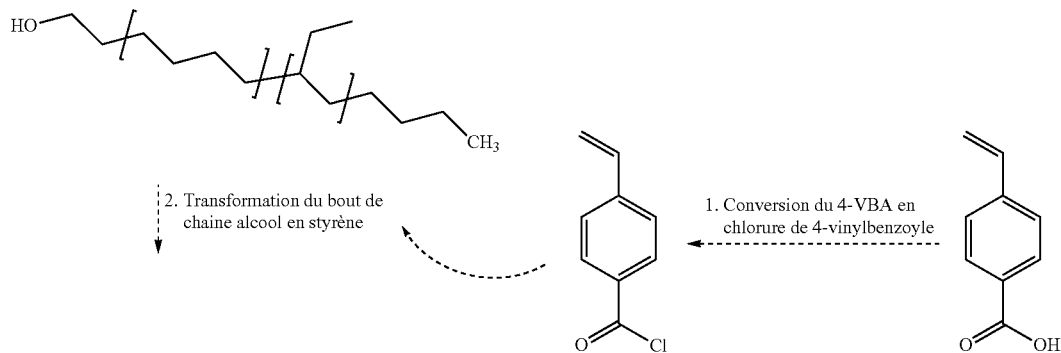

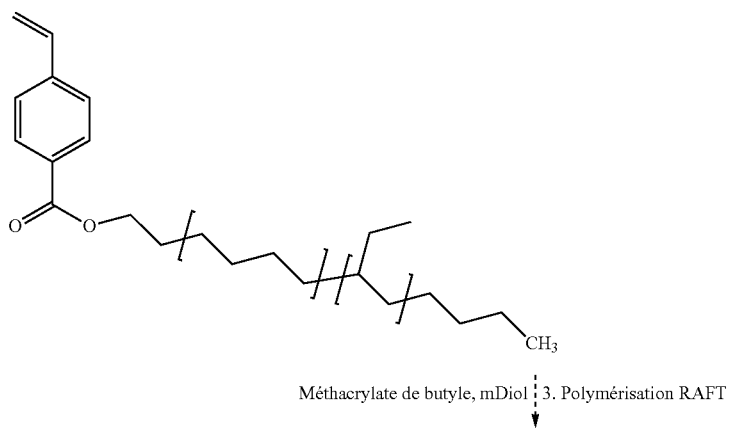

Méthacrylate de butyle, mDiol ┊ 3. Polymérisation RAFT

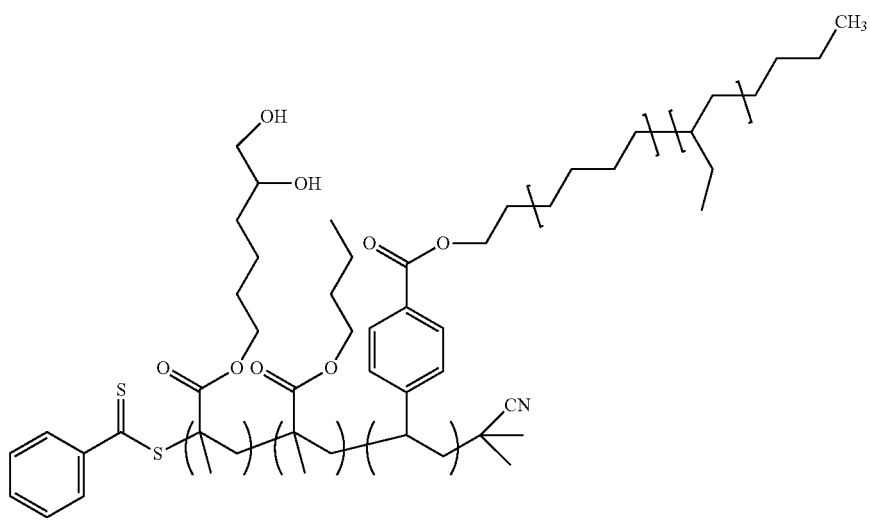

The synthesis of the comb copolymer carrying diol functional groups in the main chain CPDiol-2 is carried out according to the following protocol (Scheme 13 above).

2.50 g (17.5 mmol) of butyl methacrylate (BMA), 0.18 g (0.89 mmol) of methacrylate monomer carrying a diol functional group, 0.89 g (0.93 mmol) of the olefin macromonomer M6-B-OLF1500-St obtained according to the protocol described in section 1.1.4 above, 9.3 mg (0.04 mmol) of RAFT transfer agent 2-cyano-2-propyl benzodithioate (CPBD), 2.8 mg (0.02 mmol) of azobisisobutyronitrile (AIBN) and 3.6 ml of anisole are introduced into a 25 ml Schlenk tube. The reaction medium is stirred and degassed for 30 min by bubbling nitrogen through, before being brought to 65° C. for a period of 19 hours.

After 19 h of polymerization, the Schlenk tube is placed in an ice bath in order to halt the polymerization. The polymer is subsequently isolated by 2 successive precipitations from methanol cooled using an ice bath, filtration and drying under vacuum at 50° C. overnight. The copolymer thus obtained exhibits a number-average molar mass ($M_n$) of 65 500 g/mol, a dispersity (Đ) of 1.25 and a number-average degree of polymerization ($DP_n$) of 350. The first two values are obtained by size exclusion chromatography using THF as eluent and poly(methyl methacrylate) calibration, while the $DP_n$ is obtained by $^1$H NMR monitoring of the conversion of monomers during polymerization.

A poly(butyl methacrylate-co-alkyldiol methacrylate-co-M6-B-OLF1500-St) copolymer CPDiol-2 containing 4.5 mol % of diol repeat units (4.6% by weight) and 6.8 mol % of pendant OLF1500-OCP chains (32% by weight) is obtained. The mean length of the side chains is 10.9 carbon atoms.

1.2.6 Synthesis of a Comb Copolymer of Butyl Methacrylate, of Olefin Macromonomer M6-B-OLF1500-St and of Pendant Polydiol Polymeric Chains (CPDiol-3)

The synthesis of the comb copolymer containing the olefin macromonomer M6-B-OLF1500-St and pendant polydiol polymeric chains (CPDiol-3) is carried out according to the following protocol (Scheme 14 below):

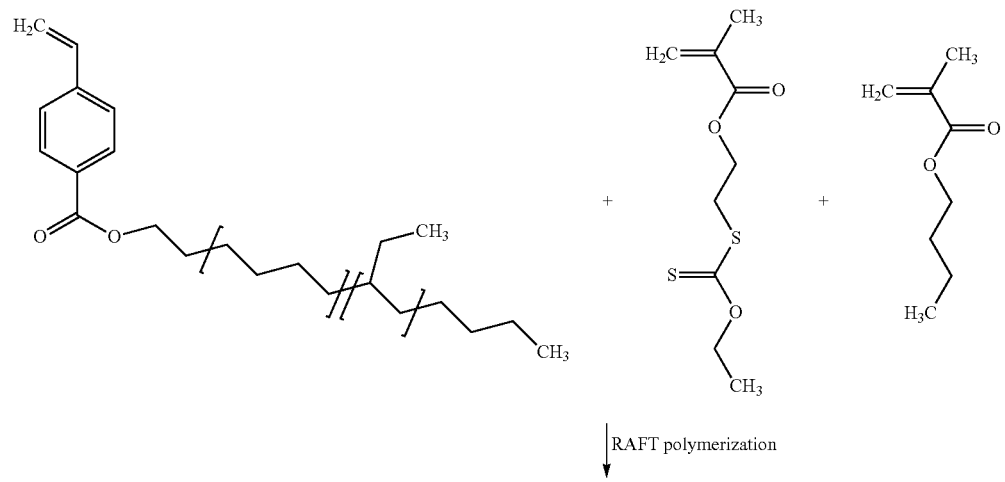
RAFT polymerization
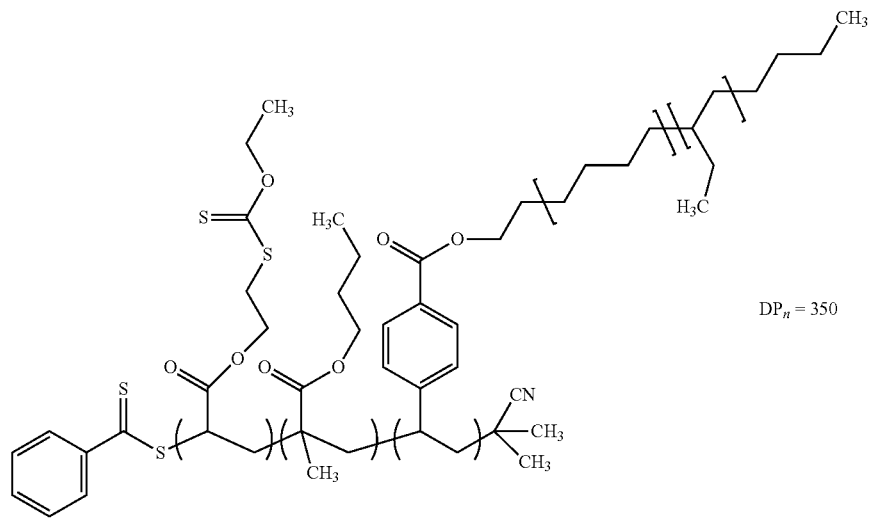
M6-B-OLF1500-St-co-xanthate backbone
1. n-butylamine
2. 1,6-hexanediol diacrylate

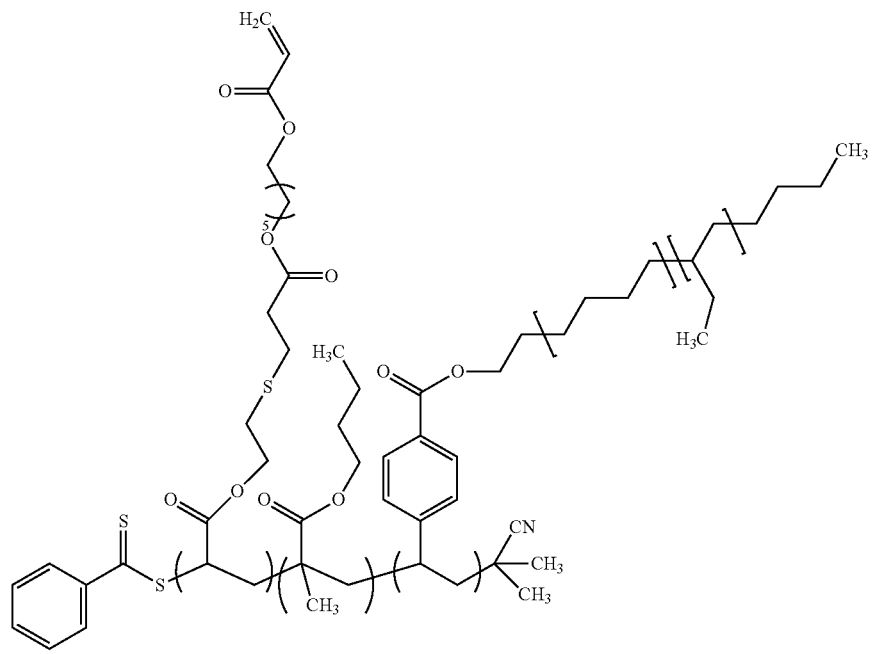
M6-B-OLF1500-St-co-acrylate backbone
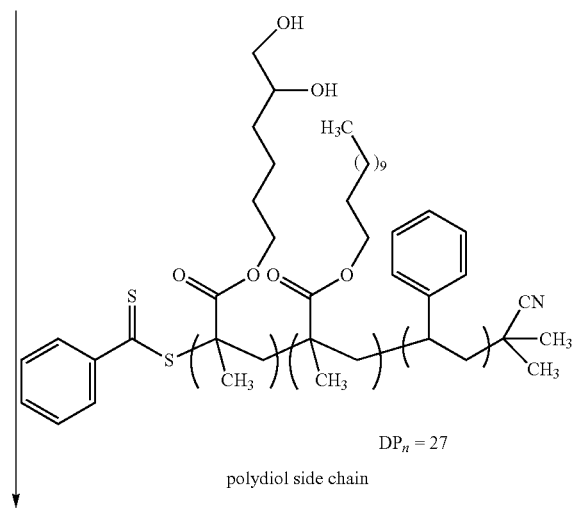
$DP_n = 27$
polydiol side chain -continued

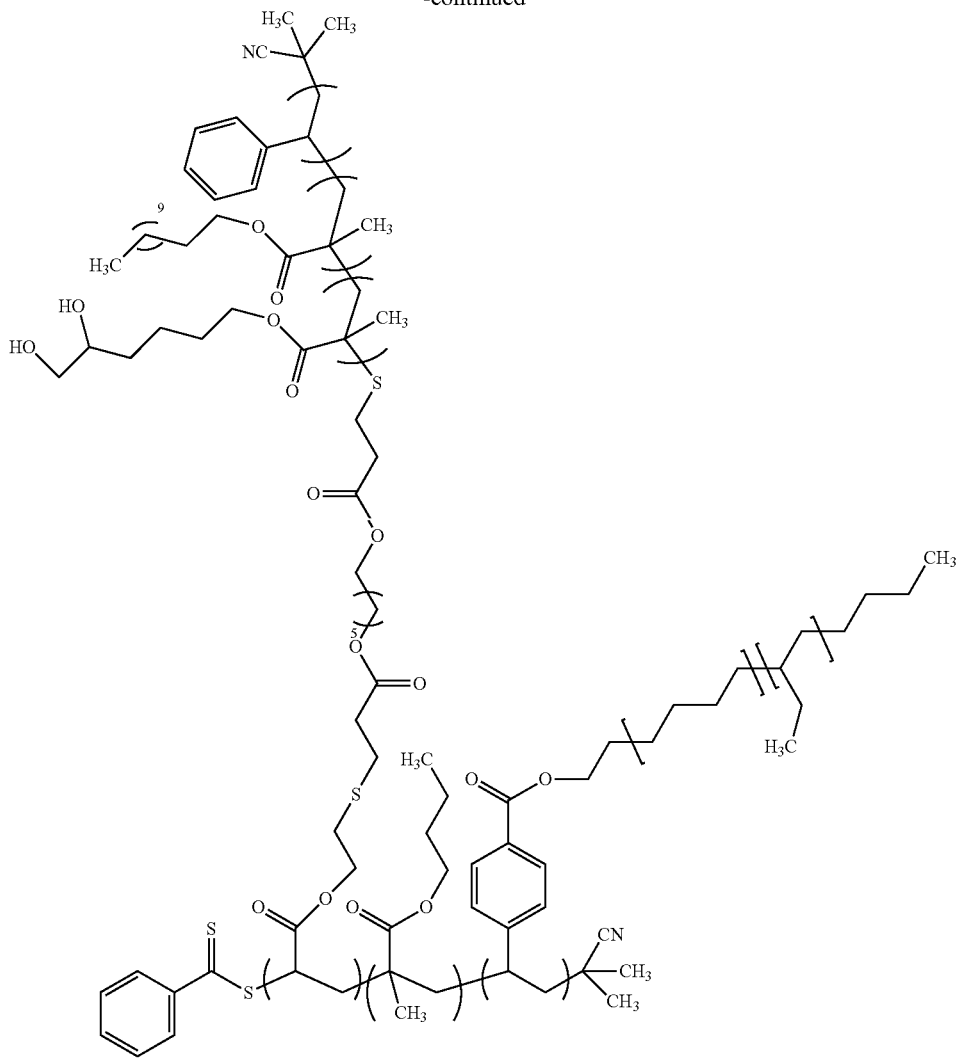

Comb copolymer CPDiol-3

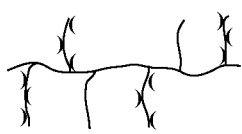

Comb copolymer CPDiol-3

Scheme 14

1.2.6.1 Synthesis of a main chain containing olefin macromonomer M6-B-OLF1500-St and 2-xanthate ethyl methacrylate (M6-B-OLF1500-St-co-xanthate backbone)

4.00 g (28.1 mmol) of butyl methacrylate, 1.30 g (1.36 mmol) of the olefin macromonomer M6-B-OLF1500-St, 1.06 g (4.52 mmol) of 2-xanthate ethyl methacrylate (XEMA; synthesized according to the protocol described in the paper "Synthesis of Well-Defined Polythiol Copolymers by RAFT Polymerization", R. Nicola, Macromolecules, 2012, 45, 821-827), 16.4 mg (0.074 mmol) of RAFT transfer agent 2-cyano-2-propyl benzodithioate (CPBD), 4.8 mg (0.030 mmol) of azobisisobutyronitrile (AIBN) and 6.4 ml of anisole are introduced into a 50 ml Schlenk tube. The reaction medium is stirred and degassed for 30 min by bubbling nitrogen through, before being brought to 65° C. for a period of 20.5 hours.

After 20.5 h of polymerization, the Schlenk tube is placed in an ice bath in order to halt the polymerization. The polymer is subsequently isolated by 2 successive precipitations from methanol cooled using an ice bath, filtration and drying under vacuum at 50° C. overnight. The copolymer thus obtained exhibits a number-average molar mass ($M_n$) of 80 600 g/mol, a dispersity (Đ) of 1.61 and a number-average degree of polymerization ($DP_n$) of 350. The first two values are obtained by size exclusion chromatography using THF as eluent and poly(methyl methacrylate) calibration, while the $DP_n$ is obtained by $^1H$ NMR monitoring of the conversion of monomers during polymerization.

A poly(butyl methacrylate-co-2-xanthate ethyl methacrylate-co-M6-B-OLF1500-St) copolymer, "M6-B-OLF1500-St-co-xanthate backbone", containing 7.9 mol % of 2-xanthate ethyl methacrylate repeat units (9.5% by weight) and 5.6 mol % of pendant OLF1500-OCP chains (27% by weight), is obtained.

1.2.6.2 Synthesis of a Main Chain Containing Olefin Macromonomer M6-B-OLF1500-St and Pendant Acrylate Functional Groups (M6-B-OLF1500-St-Co-Acrylate backbone)

The xanthate functional groups of the "M6-B-OLF1500-St-co-xanthate backbone" copolymer are subsequently converted into acrylates by Michael addition with 1,6-hexanediol diacrylate according to the following protocol:

3.70 g (1.50 mmol of XEMA functional groups) of "M6-B-OLF1500-St-co-xanthate backbone" are introduced into a 250 ml Schlenk tube and dissolved in 35 ml of a THF:DMF=1:1 by volume mixture. 0.44 g (6.00 mmol) of n-butylamine and three drops of tributylphosphine are introduced into the Schlenk tube. The reaction medium is degassed for 10 min by bubbling nitrogen through, then stirred at ambient temperature for 2 hours. Subsequently, a solution of 6.79 g (30.0 mmol) of 1,6-hexanediol diacrylate in 3 ml of THF is introduced and the reaction medium is left stirring at ambient temperature for a period of 48 hours.

The reaction medium is subsequently concentrated under vacuum and the polymer is isolated by 3 successive precipitations from methanol cooled using an ice bath, filtration and drying under vacuum at 50° C. overnight. The copolymer thus obtained exhibits a number-average molar mass ($M_n$) of 60 100 g/mol and a dispersity (Đ) of 1.65, as obtained by size exclusion chromatography using THF as eluent and poly(methyl methacrylate) calibration.

The "M6-B-OLF1500-St-co-acrylate backbone" copolymer, containing 5.1 mol % of repeat units carrying a pendant acrylate functional group (9.4% by weight) and 5.6 mol % of pendant OLF1500-OCP chains (27% by weight), as measured by $^1H$ NMR, is obtained.

1.2.6.3 Synthesis of a Precursor of Side Chains by Copolymerization of Lauryl Methacrylate, of Styrene and of Methacrylate Carrying a Diol Functional Group (Polydiol Side Chain)

The pendant polydiol polymeric chains of the comb copolymer containing the olefin macromonomer M6-B-OLF1500-St and pendant polydiol polymeric chains (CPDiol-3) are prepared according to the following protocol (Scheme 14 above).

8.00 g (31.4 mmol) of lauryl methacrylate (LMA), 0.54 g (5.24 mmol) of styrene, 1.86 g (9.17 mmol) of methacrylate monomer carrying a diol functional group, 290 mg (1.31 mmol) of RAFT transfer agent PPBD, 10.8 mg (0.066 mmol) of AIBN and 3.6 ml of anisole are introduced into a 50 ml Schlenk tube. The reaction medium is stirred and degassed for 30 min by bubbling nitrogen through, before being brought to 65° C. for a period of 24 hours.

After 24 h of polymerization, the Schlenk tube is placed in an ice bath in order to halt the polymerization. The polymer is subsequently isolated by precipitation from methanol cooled using an ice bath, separation by settling of the supernatant and drying under vacuum at 50° C. overnight. The copolymer thus obtained exhibits a number-average molar mass ($M_n$) of 9850 g/mol, a dispersity (Đ) of 1.27 and a number-average degree of polymerization ($DP_n$) of 27. The first two values are obtained by size exclusion chromatography using THF as eluent and poly(methyl methacrylate) calibration, while the $DP_n$ is obtained by $^1H$ NMR monitoring of the conversion of monomers during polymerization.

A poly(lauryl methacrylate-methacrylate comonomer carrying a diol functional group-co-styrene), "polydiol side chain", copolymer containing 20 mol % of diol repeat units (18% by weight), 67 mol % of lauryl methacrylate repeat units (76% by weight) and 13 mol % of styrene repeat units (6.0% by weight), is thus obtained.

1.2.6.4 Synthesis of the Comb Copolymer Containing the Olefin Macromonomer M6-B-OLF1500-St and Pendant Polydiol Polymeric Chains (CPDiol-3)

1.07 g (0.12 mmol) of "polydiol side chain" copolymer prepared according to the protocol described in 1.2.6.3 are introduced into a 100 ml Schlenk tube and dissolved in 10 ml of a THF:DMF=2:1 by volume mixture. 65 mg (0.88 mmol) of n-butylamine and three drops of tributylphosphine are added to the solution. The reaction medium is degassed for 5 min by bubbling nitrogen through and stirred at ambient temperature for 2 hours. Subsequently, a solution of 1.70 g (0.43 mmol of acrylate functional groups) of "M6-B-OLF1500-St-co-acrylate backbone" copolymer prepared according to the protocol described in 1.2.6.2 in 20 ml of a THF:DMF=2:1 by volume mixture is added to the reaction mixture under a nitrogen atmosphere. The reaction mixture is subsequently brought to 40° C. for a period of 40 hours.

After 40 h of reaction, 125 mg (2.03 mmol) of ethanethiol are added to the reaction medium, which is kept stirred at ambient temperature for 4 hours.

The comb copolymer containing the olefin macromonomer M6-B-OLF1500-St and pendant polydiol polymeric chains (CPDiol-3) is subsequently isolated by 2 successive precipitations from methanol cooled using an ice bath, separation by settling of the supernatant and drying under vacuum at 50° C. overnight.

1.3: Synthesis of the Comparative Copolymers—Methods 1.3.1 Linear Polydiol-1 (Comparative LPDiol-1):

The linear polydiol-1 was synthesized according to the protocol described in the application FR 1 661 400 or WO2018096252A1 (Experimental part § 1.2). This polydiol contains approximately 10 mol % of monomer carrying a diol functional group (8.6% by weight), 37 mol % of lauryl methacrylate (39.8% by weight), 28 mol % of stearyl methacrylate (40.1% by weight) and 26 mol % of styrene (11.5% by weight). The copolymer exhibits an $M_n$ of 53 000 g/mol, a Đ of 1.3 and a $DP_n$ of 250. These values are respectively obtained by size exclusion chromatography, using THF as eluent and PMMA calibration, and by monitoring the conversion of monomers during the copolymerization.

1.3.2 Linear Polydiol-2 (Comparative LPDiol-2):

The linear polydiol-2 was synthesized according to the protocol described in the application FR 1 661 400 or W2018096252A1 (Experimental part § 1.2). This copolymer comprises 7.0 mol % of monomer carrying a diol functional group (6.0% by weight). The mean side chain length is 10.3 carbon atoms. Its number-average molar mass is 40 000 g/mol. Its dispersity is 1.46. Its number-average degree of polymerization ($DP_n$) is 170. The number-average molar mass and the dispersity are obtained by size exclusion chromatography using poly(methyl methacrylate) calibration.

1.4: Synthesis of the Boronic Copolymers—Methods 1.4.1 Linear poly(boronic ester)-1 (LPB1):

A linear poly(boronic ester) was synthesized according to the protocol described in the application WO2016/113229 (Experimental part § 2). This poly(boronic ester) contains approximately 4 mol % of monomer carrying a boronic ester functional group (8.1% by weight), 61 mol % of lauryl methacrylate (69.6% by weight) and 35 mol % of butyl methacrylate (22.3% by weight). The copolymer exhibits an $M_n$ of 41 000 g/mol, a Đ of 1.3 and a $DP_n$ of 210. These values are respectively obtained by size exclusion chromatography, using THF as eluent and PMMA calibration, and by monitoring the conversion of monomers during the copolymerization.

1.4.2 Random Linear Poly(Boronic Ester) Copolymer (LPB2)

This copolymer comprises 6.0 mol % of $B-C_{12}E$ repeat units (10% by weight). The mean side chain length is 12 carbon atoms. Its number-average molar mass is 45 700 g/mol. Its dispersity is 1.39. Its number-average degree of polymerization ($DP_n$) is 175. The number-average molar mass and the dispersity are obtained by size exclusion chromatography using poly(methyl methacrylate) calibration and THF as eluent. This copolymer is obtained according to the protocol described in section 2 of the Experimental part of the application WO2016/113229.

1.4.3 Synthesis of a comb copolymer of butyl methacrylate, of styrene carrying a boronic-$C_{12}$ ester functional group and of the olefin macromonomer M6-B-OLF1500-St (PBB2)

Scheme 15

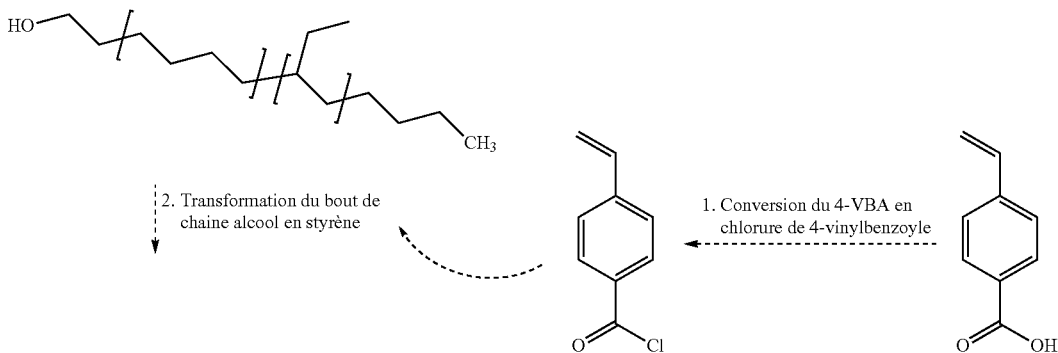

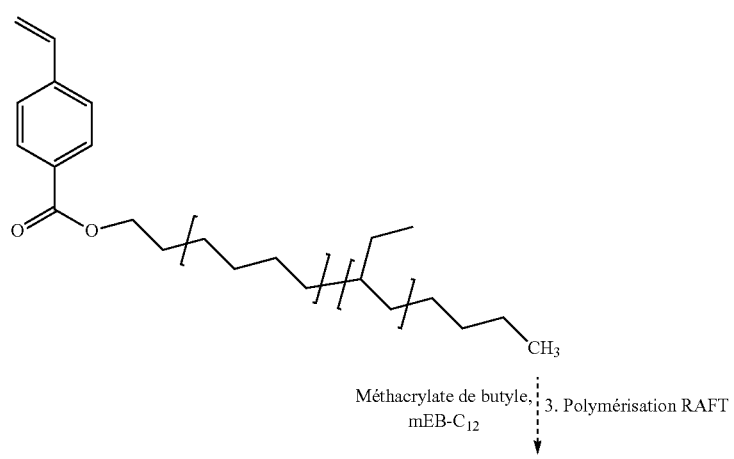

-continued

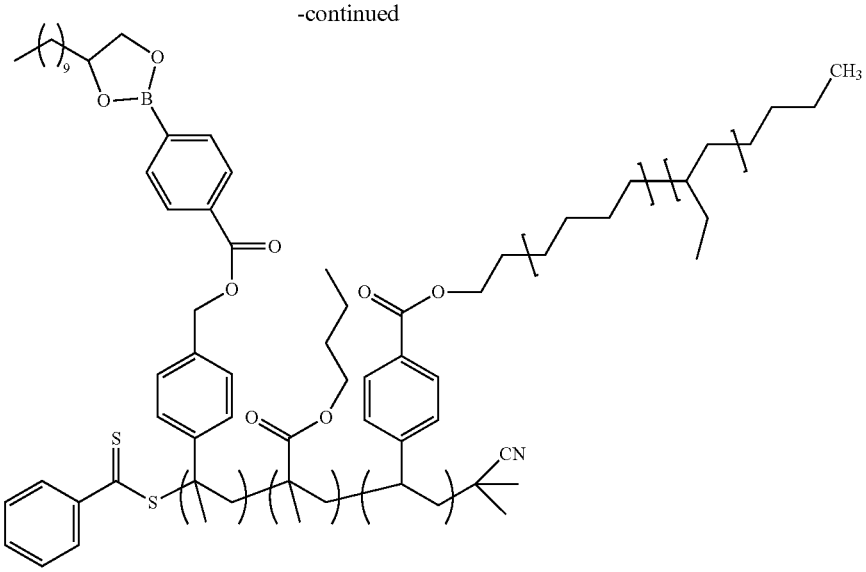

The synthesis of the comb copolymer carrying boronic ester functional groups in the main chain PBB2 is carried out according to the following protocol:

2.50 g (17.5 mmol) of butyl methacrylate (BMA), 0.39 g (0.87 mmol) of the boronic ester condensed with 1,2-dodecanediol monomer (B-$C_{12}$Em) obtained according to the protocol described in the application WO2016/113229 (Experimental part § 2.1), 0.89 g (0.93 mmol) of the olefin macromonomer M6-B-OLF1500-St obtained according to the protocol described in section 1.1.4 above, 9.3 mg (0.04 mmol) of RAFT transfer agent 2-cyano-2-propyl benzodithioate (CPBD), 2.8 mg (0.02 mmol) of AIBN and 3.8 ml of anisole are introduced into a 25 ml Schlenk tube. The reaction medium is stirred and degassed for 30 min by bubbling nitrogen through, before being brought to 65° C. for a period of 19 hours.

After 19 h of polymerization, the Schlenk tube is placed in an ice bath in order to halt the polymerization. The polymer is subsequently isolated by precipitation from acetone cooled using an ice bath, separation by settling of the supernatant and drying the pasty polymer phase under vacuum at 50° C. overnight. The copolymer thus obtained exhibits a number-average molar mass ($M_n$) of 54 800 g/mol, a dispersity (Đ) of 1.23 and a number-average degree of polymerization ($DP_n$) of 280. The first two values are obtained by size exclusion chromatography using THF as eluent and poly(methyl methacrylate) calibration, while the $DP_n$ is obtained by $^1$H NMR monitoring of the conversion of monomers during polymerization.

A poly(butyl methacrylate-co-B-$C_{12}$Em-co-M6-B-OLF1500-St) copolymer PBB2 containing 5.7 mol % of B-$C_{12}$Em repeat units (12% by weight) and 6.8 mol % of M6-B-OLF1500-St repeat units (30% by weight) is obtained.

2. Preparation of the Compositions

Each polymer is dissolved in a Group III base oil in order to obtain a 10% by weight polymer solution. After complete dissolution of the polymer in the oil, these solutions serve as mother solutions for the preparation of the formulations to be studied in rheology.

2.1 Ingredients for the Formulation of Compositions
Lubricating Base Oil

The lubricating base oil used in the compositions to be tested is an oil from Group III of the API classification, sold by SK under the name Yubase 4. It exhibits the following characteristics:

- its kinematic viscosity at 40° C., measured according to the standard ASTM D445, is 19.57 cSt;
- its kinematic viscosity measured at 100° C. according to the standard ASTM D445 is 4.23 cSt;
- its viscosity index, measured according to the standard ASTM D2270, is 122;
- its Noack volatility as percentage by weight, measured according to the standard DIN 51581, is 15;
- its flash point in degrees Celsius, measured according to the standard ASTM D92, is 230° C.;
- its pour point in degrees Celsius, measured according to the standard ASTM D97, is −15° C.

2.2 Formulation of Compositions

Preparation of Composition B 1.60 g of Group III base oil and 0.40 g of the 10% by weight mother solution of comb polydiol CPDiol-1 are introduced into a sample tube and vigorously mixed using a vortex mixer for 30 seconds. This formulation thus contains 2% by weight of comb polydiol CPDiol-1.

Preparation of Composition C 1.60 g of Group III base oil and 0.40 g of the 10% by weight mother solution of comb polydiol BB are introduced into a sample tube and vigorously mixed using a vortex mixer for 30 seconds. This formulation thus contains 2% by weight of comb polydiol BB.

Preparation of the composition D (Comparative)

1.60 g of Group III base oil and 0.40 g of the 10% by weight mother solution of linear polydiol-1 (LPDiol-1) are introduced into a sample tube and vigorously mixed using a vortex mixer for 30 seconds. This formulation thus contains 2% by weight of linear polydiol-1 (LPDiol-1).

Preparation of the Composition F (According to the Invention)

1.20 g of Group III base oil, 0.40 g of the 10% by weight mother solution of comb polydiol CPDiol-1 and 0.40 g of the 10% by weight mother solution of linear poly(boronic ester)-1 (LPB1) are introduced into a sample tube and vigorously mixed using a vortex mixer for 30 seconds. This formulation thus contains 2% by weight of comb polydiol CPDiol-1, TD 4-37, and 2% by weight of linear poly (boronic ester)-1 (LPB1).

Preparation of the Composition G (According to the Invention)

1.20 g of Group III base oil, 0.40 g of the 10% by weight mother solution of comb polydiol BB and 0.40 g of the 10% by weight mother solution of linear poly(boronic ester)-1 (LPB1) are introduced into a sample tube and vigorously mixed using a vortex mixer for 30 seconds. This formulation thus contains 2% by weight of comb polydiol BB and 2% by weight of linear poly(boronic ester)-1 (LPB1).

Preparation of the Composition H (Comparative)

0.53 g of the 39.2% by weight solution of LPB2 in the Group III base oil are mixed with 6.76 g of this same base oil. This mixture is kept stirred in a vortex mixer at ambient temperature for 1 minute. The solution thus obtained of LPB2 is subsequently mixed with 0.71 g of the 25.4% by weight solution of LPDiol-2 in the Group III base oil. The mixture thus obtained is kept stirred in a vortex mixer at ambient temperature for 2 minutes. A solution comprising 2.60% by weight of linear copolymer LPB2 and 2.25% by weight of linear copolymer LPDiol-2 is obtained.

Preparation of the Composition I (According to the Invention)

0.60 g of comb polydiol copolymer CPDiol-2 and 5.40 g of Group III base oil are introduced into a flask. The mixture thus obtained is kept stirred at 100° C. until the comb polydiol copolymer CPDiol-2 has completely dissolved. A 10% by weight solution of comb polydiol copolymer CPDiol-2 is thus obtained.

0.60 g of comb poly(boronic ester) copolymer PBB2 and 5.40 g of Group III base oil are introduced into a flask. The mixture thus obtained is kept stirred at 100° C. until the poly(boronic ester) PBB2 has completely dissolved. A 10% by weight solution of comb poly(boronic ester) copolymer PBB2 is thus obtained.

1.47 g of the 10% by weight solution of polydiol CPDiol-2 in the Group III base oil are mixed with 2.94 g of this same base oil. This mixture is kept stirred in a vortex mixer at ambient temperature for 1 minute. The solution thus obtained of CPDiol-2 is subsequently mixed with 1.47 g of the 10% by weight solution of poly(boronic ester) PBB2 in the Group III base oil and kept stirred in a vortex mixer at ambient temperature for 2 minutes. Composition I, containing 2.50% by weight of comb polydiol copolymer CPDiol-2 and 2.50% by weight of comb poly(boronic ester) copolymer PBB2, is thus obtained.

Preparation of the Composition J (According to the Invention)

1.47 g of the 10% by weight solution of comb polydiol CPDiol-2 prepared above are mixed with 4.03 g of Group III base oil. This mixture is kept stirred in a vortex mixer at ambient temperature for 1 minute. The solution thus obtained of CPDiol-2 is subsequently mixed with 0.38 g of the 39.2% by weight solution of LPB2 in the Group III base oil and kept stirred in a vortex mixer at ambient temperature for 2 minutes. A solution comprising 2.50% by weight of comb polydiol copolymer CPDiol-2 and 2.50% by weight of linear poly(boronic ester) copolymer LPB2 is thus obtained.

3. Rheology of the Solutions of Polymers

The relative viscosity, calculated according to the following formula $$\left(\eta_{relative} = \frac{\eta_{solution}}{\eta_{huile\ de\ base}}\right)$$

was chosen to represent the change in the viscosity of the system as a function of the temperature because this quantity directly reflects the compensation for the loss of natural viscosity of a Group III base oil of the polymer systems studied.

3.1 Appliances and Protocols for Measuring the Viscosity (Compositions Q to G)

The rheological studies were carried out using a Lovis 2000 rolling ball viscometer from Anton Paar.

In the case of the formulations of polymers which do not form gels in a base oil of Group III over the temperature range of the study, the rheology measurements were carried out using a reference cylindrical geometry DG 26.7. The viscosity was measured as a function of the shear rate for a temperature range varying from 10° C. to 90° C. For each temperature, the viscosity of the system was measured as a function of the shear rate from 1 to 100 s$^{-1}$. The measurements of viscosity as a function of the shear rate at T=10° C., 50° C. and 90° C. were carried out. A mean viscosity was then calculated for each temperature using the measurement points located on the same plate.

3.2 Results Obtained in Rheology

Figure 9:
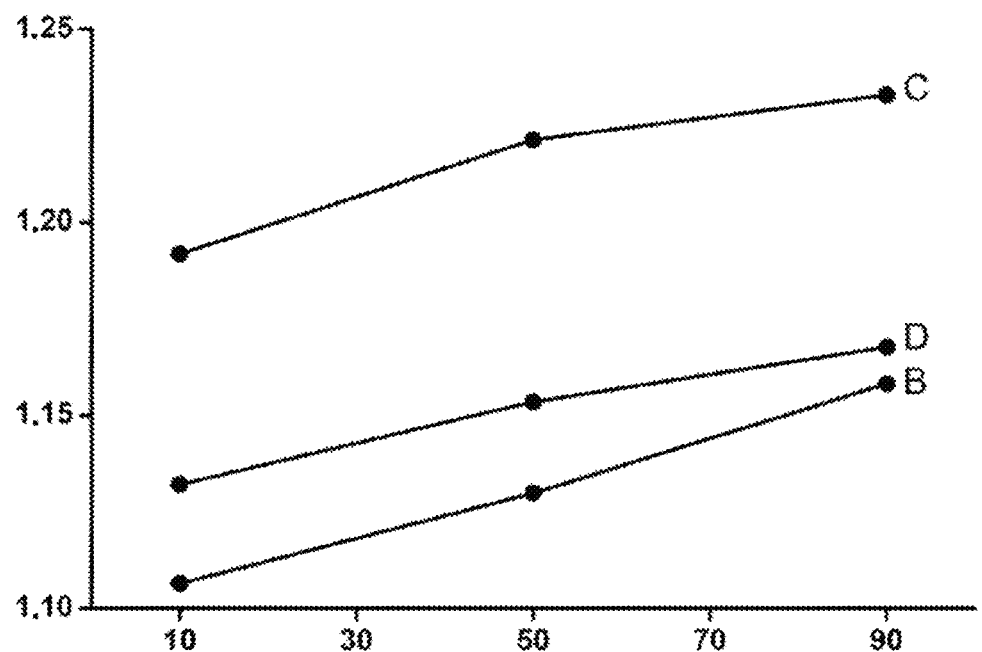
FIG. 9 represents a graph which reports the relative viscosity of the compositions B, C and D (ordinate) as a function of the temperature (abscissa) from 10° C. to 90° C.

The relative viscosity of the compositions B, C and D was measured at 90° C., 50° C. and then 10° C. (FIG. 9). All the compositions contain 2% by weight of polymer. Although the two comb polydiols exhibit similar architectures, the relative viscosity of the composition B (diol functional groups on the pendant chains) is significantly lower than the relative viscosity of the composition C (functional groups on the backbone). The composition D is formed of a polydiol exhibiting a mean degree of polymerization of approximately 250 monomer units. This polymer is thus significantly shorter than the polymer of the composition B (backbone having a mean degree of polymerization of approximately 300). Nevertheless, the relative viscosity of the composition D is significantly greater than the relative viscosity of the composition B over the entire range of temperatures. This means that brush diol polymers have a lower impact on the viscosity of the oil than linear diol polymers, notably when the pendant chains of the brushes contain the diol functional groups. In addition, the composition B exhibits a greater increase in its relative viscosity with the temperature than the compositions C and D.

Figure 10:
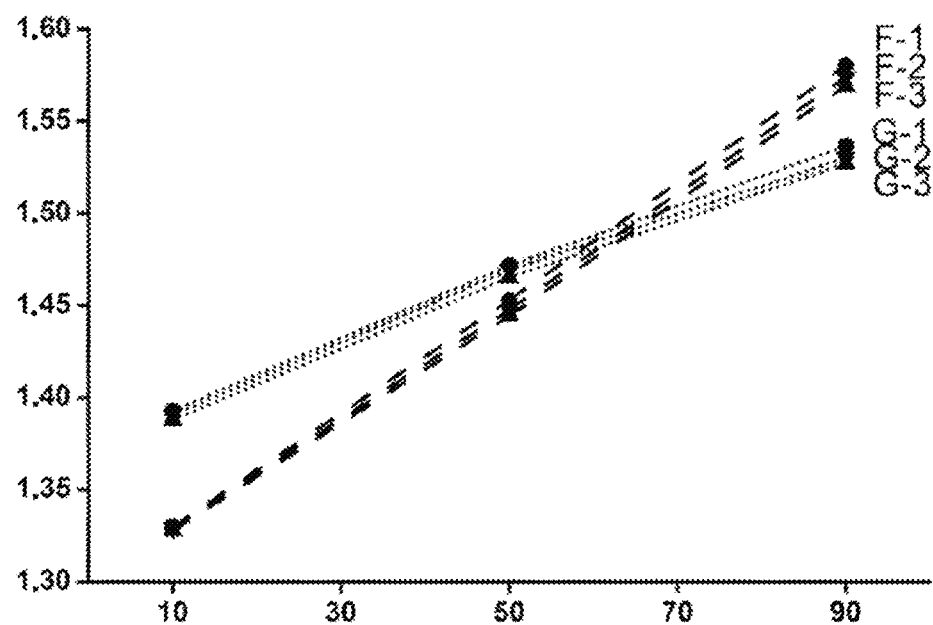
FIG. 10 represents a graph which reports the relative viscosity of the compositions F and G (ordinate) as a function of the temperature (abscissa) from 10° C. to 90° C. over three cycles.

The relative viscosity of the compositions F and G was measured at 90° C., 50° C. and then 10° C. (FIG. 10). These two compositions were studied over 3 cycles of cooling and then heating from 90° C. to 10° C. Whatever the composition, the relative viscosities are very close at each temperature from one cycle to another. This means that the rheological behavior of the formulation is reproducible over at least 3 cycles. These two compositions show a strong increase in their relative viscosity when the temperature increases. The compositions F and G exhibit approximately the same relative viscosity at 50° C. On the other hand, the composition F is less viscous at 10° C. and more viscous at 90° C. This means that the formulation notably formed of the comb polydiol CPDiol-1 makes it possible to obtain a stronger viscosification of nonpolar oils than the formulation notably formed of the comb polydiol BB.

3.3 Appliances and Protocols for Measuring the Viscosity (Compositions H, I and

The rheological studies were carried out using a rheometer of the stress-controlled Couette MCR 501 type from Anton Paar.

The rheology measurements were carried out using a cylindrical geometry of DG 26.7 reference. The viscosity was measured as a function of the shear rate for a temperature range varying from 10° C. to 150° C. For each temperature, the viscosity of the system was measured as a function of the shear rate from 1 to 100 s$^{-1}$. The measurements of viscosity as a function of the shear rate at T=10° C., 40° C., 70° C., 100° C., 130° C. and 150° C. were carried out (ranging from 10° C. to 150° C.). A mean viscosity was then calculated for each temperature using the measurement points located on the same plate (from 15 to 100$^{s-1}$).

Table 1 below shows the change in the absolute viscosities of the compositions H to J as a function of temperature.

3.4 Results Obtained in Rheology (Compositions H, I and J)

Figure 11:
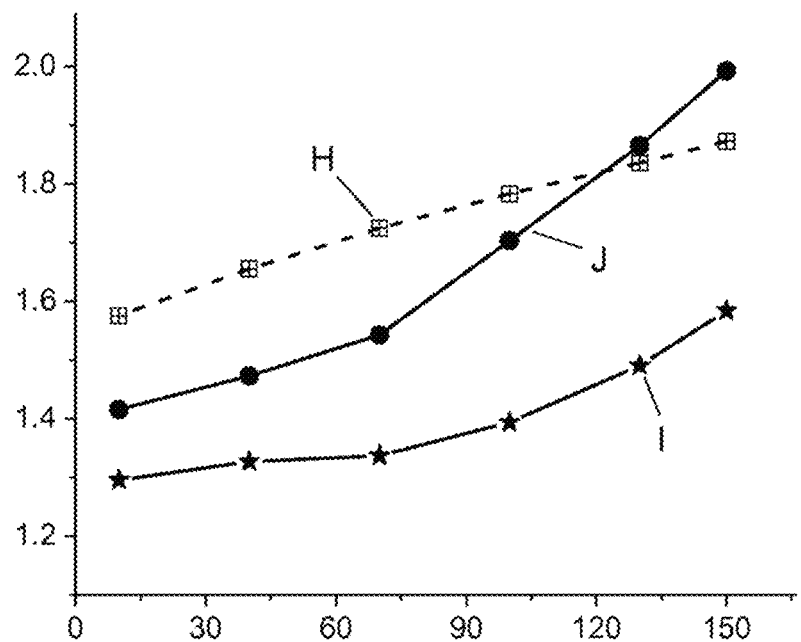
FIG. 11 represents a graph which reports the relative viscosity of the compositions H, I and J (ordinate) as a function of the temperature (abscissa) from 10° C. to 150° C.

The relative viscosities of the compositions I and J were studied over a range of temperatures extending from 10° C. to 150° C. and compared with that of the composition H. The viscosity of the solution was calculated by taking the mean of the absolute viscosities obtained for the shear rates between 15 and 100 s$^{-1}$. The relative viscosity of these compositions is shown in FIG. 11.

TABLE 1

| Temperature [° C.] | η [mPa · s] Yubase 4 | η [mPa · s] Composition H | η [mPa · s] Composition I | η [mPa · s] Composition J |
|---|---|---|---|---|
| 10 | 63.4 | 99.9 | 82.1 | 89.7 |
| 40 | 16.4 | 27.2 | 21.8 | 24.2 |
| 70 | 6.61 | 11.4 | 8.84 | 10.2 |
| 100 | 3.45 | 6.18 | 4.80 | 5.87 |
| 130 | 2.10 | 3.89 | 3.14 | 3.92 |
| 150 | 1.60 | 2.98 | 2.53 | 3.18 |

When the linear polydiol LPDiol-2 and the linear poly(boronic ester) LPB2 are present together in the same lubricating composition (composition H), a significant compensation for the loss of natural viscosity of the Group III base oil over the entire range of the temperatures studied is observed. This is reflected by a virtually linear increase in the relative viscosity between 10° C. and 150° C. (FIG. 11, dashed line-hollow squares). However, the composition H also impacts the cold viscosity of the formulation, with a relative viscosity at 10° C. of 1.58.

The presence of the comb polydiol copolymer CPDiol-2 and of the brush poly(boronic ester) copolymer PBB2 in the same lubricating composition (composition I) makes possible a significant reduction in the relative viscosity at low temperature, down to $\eta_{rel}$=1.30 at 10° C. At the same time, a lower compensation of this formulation for the loss of natural viscosity of the Group III base oil at high temperatures is observed, compared to the formulation H (FIG. 11, dashed/continuous line-stars).

Figure 12:
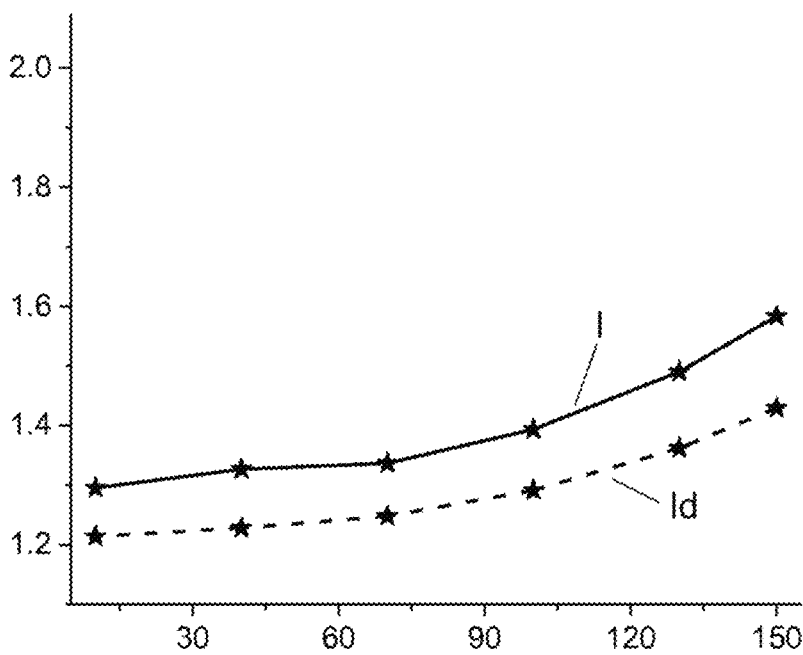
FIG. 12 represents a graph which reports the relative viscosity (ordinate) of the compositions I and Id (obtained from the composition I by dilution of the composition I down to 2.10% by weight of copolymer) as a function of the temperature (abscissa) from 10 to 150° C.
Figure 13:
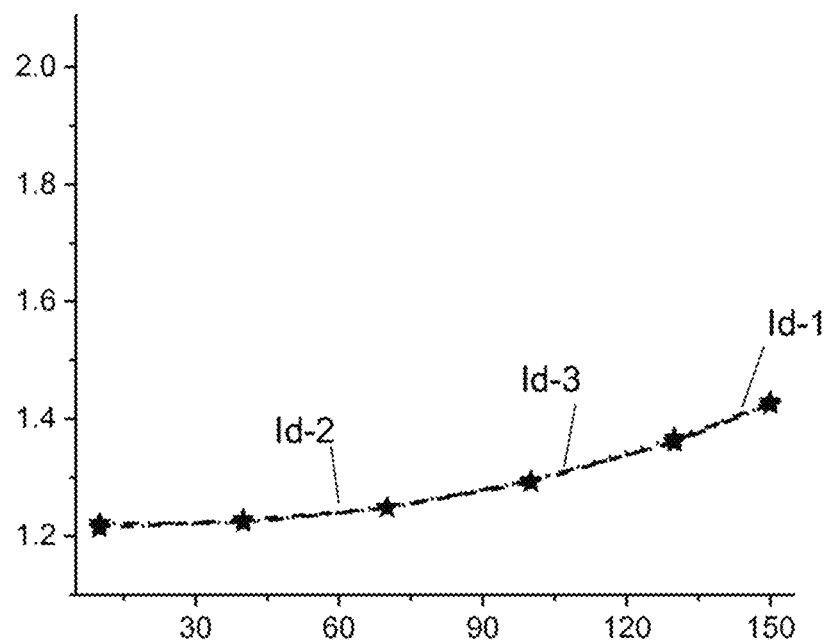
FIG. 13 represents a graph which reports the relative viscosity (ordinate) as a function of the temperature (abscissa) of the composition Id during three successive heating-cooling cycles between 10° C. and 150° C. (Id-1, Id-2 and Id-3).

The dilution of the composition I down to 2.10% by weight of brush polydiol copolymer CPDiol-2 and 2.10% by weight of brush poly(boronic ester) copolymer PBB2 makes it possible to further reduce the relative viscosity at 10° C. down to $\eta_{rel}$=1.21 (FIG. 12-Id, dotted line-stars). However, unlike the compositions containing linear copolymers, even having this low relative viscosity under cold conditions, the composition Id preserves its viscosifying behavior at high temperatures ($\eta_{rel}$=1.43 at 150° C.). The relative viscosity values are represented for three successive heating-cooling cycles between 10° C. and 150° C. (Id-1, Id-2 and Id-3). These change in a negligible way during the 3 cycles and always give an increase in the relative viscosity between 10° C. and 150° C. (FIG. 13).

When the comb polydiol copolymer CPDiol-2 and the linear poly(boronic ester) copolymer LPB2 are present together in the same lubricating composition (composition J), the advantages of the two systems are combined. On this intersecting of the types of structure of associative copolymers, a strong compensation for the loss of natural viscosity of the base oil over the temperature range from 100° C. to 150° C. is observed (FIG. 11, continuous line-solid circles), which occurs in combination with a significant decrease in the relative viscosity at low temperature, in comparison with the formulation containing only linear copolymers.

Figure 14:
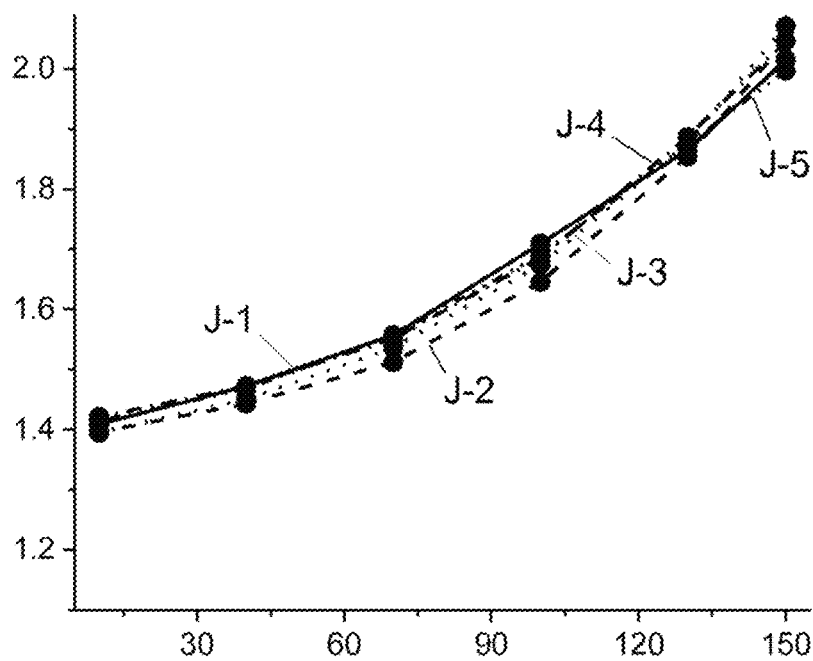
FIG. 14 represents a graph which reports the relative viscosity (ordinate) as a function of the temperature (abscissa) of the composition J during five successive heating-cooling cycles between 10° C. and 150° C. (J-1, J-2, J-3, J-4 and J-5).

The relative viscosity values are also represented for five successive heating-cooling cycles between 10° C. and 150° C. (J-1, J-2, J-3, J-4 and J-5). They change very slightly during the 5 cycles and always give an increase in the relative viscosity of approximately 0.65 between 10° C. and 150° C., reflecting the good compensation for the natural loss of viscosity of the Group III base oil over this range of temperatures (FIG. 14).

The invention claimed is:

1. A composition resulting from the mixing of at least:
   a comb polydiol copolymer A1
   and
   a compound A2 comprising at least two boronic ester functional groups,
   the comb polydiol copolymer A1 comprising a main chain and side chains, at least a portion of the side chains of the copolymer A1 being composed of oligomers comprising more than 30 carbon atoms.

2. The composition as claimed in claim 1, in which at least a portion of the side chains of the copolymer A1 are composed of oligomers comprising at least 50 carbon atoms.

3. The composition as claimed in claim 1, in which at least a portion of the side chains of the copolymer A1 are composed of oligomers which exhibit a degree of polymerization ranging from 5 to 1000.

4. The composition as claimed in claim 1, in which the side chains composed of oligomers represent from 3% to 95% by weight, with respect to the total weight of the copolymer A1.

5. The composition as claimed in claim 1, in which at least a portion of the side chains of the copolymer A1 are composed of oligomers O1 comprising a polyolefin fragment.

6. The composition as claimed in claim 5, in which the side chains of the copolymer A1 composed of oligomers O1 comprise a polyolefin fragment having from 30 to 500 carbon atoms.

7. The composition as claimed in claim 5, in which the side chains comprising a polyolefin fragment represent from 3% to 85% by weight, with respect to the total weight of the copolymer A1.

8. The composition as claimed in claim 5, in which the oligomers O1 are present in the copolymer A1 in the form of repeat units corresponding to one or more monomers M6 of general formula (IX):

(IX)

in which:
Q$_1$ is chosen from the group consisting of —H, —CH$_3$ and —CH$_2$—CH$_3$;
Q$_2$ is chosen from the group consisting of -Q', —O-Q', —C(O)—O-Q', —O—C(O)-Q', —S—(CH$_2$)$_2$—C(O)—O-Q', —S-Q', —N(H)—C(O)-Q' and —C(O)—N(H)-Q' group, with Q' is a polyolefin,
n represents an integer chosen from 0 and 1,
A represents a divalent group chosen from the group consisting of -A$_1$-, —O-(-A$_2$-O—)$_n$-A$_1$-, —C(O)—O-(-A$_2$-O—)$_n$-A$_1$-, —O—C(O)-(-A$_2$-O—)$_n$'-A$_1$-, —S—(-A$_2$-O—)$_n$-A$_1$-, —N(H)—C(O)-(-A$_2$-O—)$_n$-A$_1$- and —C(O)—N(H)-(-A$_2$-O—)$_n$-A$_1$- with:
A$_1$ is a divalent radical chosen from the group consisting of a C$_1$-C$_{30}$ alkyl, a C$_6$-C$_{30}$ aryl and a C$_6$-C$_{30}$ aralkyl,
A$_2$ is a divalent radical chosen from C$_2$-C$_4$ alkyls,
n' is an integer, n' represents 0 or 1.

9. The composition as claimed in claim 1, in which at least a portion of the side chains of the copolymer A1 are composed of oligomers O2 comprising repeat units corresponding to monomers M2 of general formula (II):

(II)

in which:
R$_2$ is chosen from the group consisting of —H, —CH$_3$ and —CH$_2$—CH$_3$,
R$_3$ is chosen from the group consisting of —C(O)—O—R'$_3$, —O—R'$_3$, —S—R'$_3$ and —C(O)—N(H)—R'$_3$, with R'$_3$ is a C$_1$-C$_{30}$ alkyl group.

10. The composition as claimed in claim 9, in which at least a portion of the oligomers O2 comprise repeat units corresponding to monomers M1 of general formula (I):

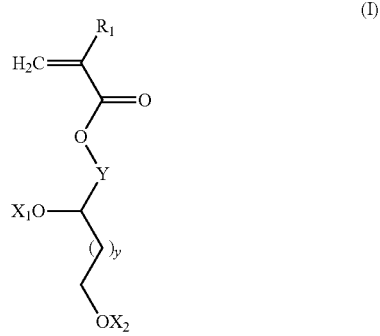

(I)

in which:
R$_1$ is chosen from the group consisting of —H, —CH$_3$ and —CH$_2$—CH$_3$;
y is an integer equal to 0 or 1;
Y represents a divalent linking group chosen from C$_1$-C$_{20}$ alkyl chains, optionally comprising one or more ether —O— bridges;
X$_1$ and X$_2$, which are identical or different, are chosen from the group consisting of hydrogen, tetrahydropyranyl, methyloxymethyl, tert-butyl, benzyl, trimethylsilyl and t-butyldimethylsilyl;
or else
X$_1$ and X$_2$ form, with the oxygen atoms, a bridge of formula:

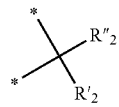

in which:
the stars (*) symbolize the bonds to the oxygen atoms,
R'$_2$ and R''$_2$, which are identical or different, are chosen from the group consisting of hydrogen and a C$_1$-C$_{11}$ alkyl;
or else
X$_1$ and X$_2$ form, with the oxygen atoms, a boronic ester of formula:

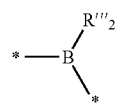

in which:
the stars (*) symbolize the bonds to the oxygen atoms,
R'''$_2$ is chosen from the group consisting of a C$_6$-C$_{30}$ aryl, a C$_7$-C$_{30}$ aralkyl and a C$_2$-C$_{30}$ alkyl.

11. The composition as claimed in claim 1, in which the copolymer A1 comprises repeat units corresponding to at least one monomer M3 of general formula (X):

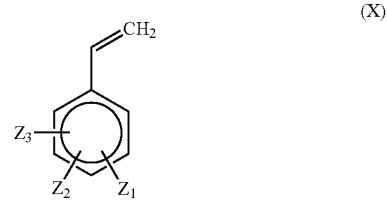

(X)

in which:
Z$_1$, Z$_2$ and Z$_3$, which are identical or different, represent groups chosen from the group consisting of a hydrogen atom, a C$_1$-C$_{12}$ alkyl or a —OZ' or —C(O)—O—Z' group, with Z' a C$_1$-C$_{12}$ alkyl.

12. The composition as claimed in claim 11, in which the monomer M3 is styrene.

13. The composition as claimed in claim 11, in which the repeat units corresponding to monomers of formula (X) represent from 2 mol % to 50 mol %, with respect to the total number of moles of the repeat units of which the copolymer A1 is composed.

14. The composition as claimed in claim 1, in which the copolymer A1 exhibits a degree of branching ranging from 0.1 mol % to 10 mol %.

15. The composition as claimed in claim 1, in which the comb copolymer A1 comprises nonoligomeric pendant chains which have a mean length ranging from 1 to 10 carbon atoms.

16. The composition as claimed in claim 1, in which the main chain of the comb copolymer A1 has a number-average degree of polymerization ranging from 40 to 2000.

17. The composition as claimed in claim 1, in which the oligomeric pendant chains of the comb copolymer A1 have a number-average degree of polymerization ranging from 8 to 1000.

18. The composition as claimed in claim 1, in which the compound A2 is chosen from:
a compound of formula (III):

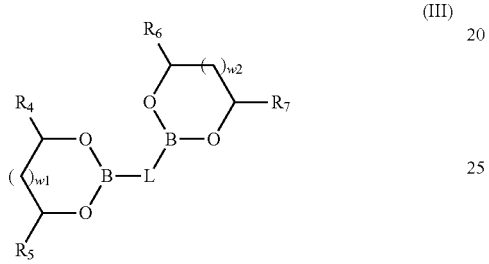

in which:
w$_1$ and w$_2$, which are identical or different, are integers chosen between 0 and 1;
R$_4$, R$_5$, R$_6$ and R$_7$, which are identical or different, represent a group chosen from the group consisting of a hydrogen atom and a hydrocarbon group comprising from 1 to 30 carbon atoms, optionally substituted by one or more groups chosen from the group consisting of a hydroxyl and an —OJ or —C(O)—O-J group, with J a hydrocarbon group comprising from 1 to 24 carbon atoms;
L is a divalent linking group chosen from the group consisting of a C$_6$-C$_{18}$ aryl, a C$_6$-C$_{15}$ aralkyl and a C$_2$-C$_{24}$ hydrocarbon chain;
a copolymer comprising at least
repeat units corresponding to monomers M4 of formula (IV):

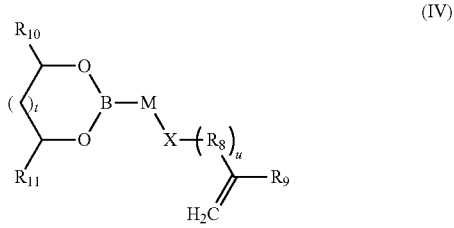

in which:
t is an integer equal to 0 or 1;
u is an integer equal to 0 or 1;
M and R$_s$ are divalent linking groups, which are identical or different, chosen from the group consisting of a C$_6$-C$_{18}$ aryl, a C$_7$-C$_{24}$ aralkyl and a C$_2$-C$_{24}$ alkyl;
X is a functional group chosen from the group consisting of —O—C(O)—, —C(O)—O—, —C(O)—N(H)—, —N(H)—C(O)—, —S—, —N(H)—, —N(R'$_4$)— and —O—, with R'$_4$ a hydrocarbon chain comprising from 1 to 15 carbon atoms;
R$_9$ is chosen from the group consisting of —H, —CH$_3$ and —CH$_2$—CH$_3$;
R$_{10}$ and R$_{11}$, which are identical or different, represent a group chosen from the group consisting of a hydrogen atom and a hydrocarbon group comprising from 1 to 30 carbon atoms, optionally substituted by one or more groups chosen from: a hydroxyl or an —OJ or —C(O)—O-J group, with J a hydrocarbon group comprising from 1 to 24 carbon atoms;
repeat units corresponding to monomers M5 of general formula (V):

in which:
R$_{12}$ is chosen from the group consisting of —H, —CH$_3$ and —CH$_2$—CH$_3$,
R$_{13}$ is chosen from the group consisting of a C$_6$-C$_{18}$ aryl and a C$_6$-C$_{15}$ aryl substituted by a R'$_{13}$, —C(O)—O—R'$_{13}$, —O—R'$_{13}$, —S—R'$_{13}$ and —C(O)—N(H)—R'$_{13}$ group, with R'$_{13}$ is a C$_1$-C$_{30}$ alkyl group.

19. The composition as claimed in claim 18, in which the compound A2 is a copolymer, and A2 is a comb copolymer comprising a main chain and side chains, at least a portion of the side chains of the copolymer A2 being composed of oligomers.

20. A lubricating composition resulting from the mixing of at least:
a lubricating oil; and
a composition as claimed in claim 1.

* * * * *